US012532009B2

United States Patent
Ikonin et al.

(10) Patent No.: US 12,532,009 B2
(45) Date of Patent: Jan. 20, 2026

(54) FEATURE MAP ENCODING AND DECODING BASED ON PRESENCE INDICATOR

(71) Applicant: HUAWEI TECHNOLOGIES CO., LTD., Shenzhen (CN)

(72) Inventors: Sergey Yurievich Ikonin, Moscow (RU); Alexander Alexandrovich Karabutov, Munich (DE); Mikhail Vyacheslavovich Sosulnikov, Munich (DE); Victor Alexeevich Stepin, Munich (DE); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 18/304,214

(22) Filed: Apr. 20, 2023

(65) Prior Publication Data
US 2023/0262243 A1 Aug. 17, 2023

Related U.S. Application Data

(63) Continuation of application No. PCT/RU2021/050347, filed on Oct. 20, 2021.

(30) Foreign Application Priority Data

Oct. 20, 2020 (WO) ................ PCT/RU2020/000559

(51) Int. Cl.
*H04N 19/42* (2014.01)
*H04N 19/13* (2014.01)
(Continued)

(52) U.S. Cl.
CPC ............. *H04N 19/42* (2014.11); *H04N 19/13* (2014.11); *H04N 19/136* (2014.11);
(Continued)

(58) Field of Classification Search
CPC ...... H04N 19/42; H04N 19/13; H04N 19/136; H04N 19/154; H04N 19/167; H04N 19/17;
(Continued)

(56) References Cited

U.S. PATENT DOCUMENTS

2016/0358069 A1 12/2016 Brothers et al.
2018/0027243 A1 1/2018 Haghani et al.
(Continued)

FOREIGN PATENT DOCUMENTS

CN 110971901 A 4/2020
EP 3621304 A1 3/2020
(Continued)

OTHER PUBLICATIONS

Hu et al., "Learning End-to-End Lossy Image Compression: A Benchmark," arXiv:2002.03711v2 [eess.IV]0, Total 18 pages (Feb. 2020).
(Continued)

*Primary Examiner* — Juan M Guillermety
(74) *Attorney, Agent, or Firm* — Leydig, Voit & Mayer, Ltd.

(57) ABSTRACT

The present disclosure relates to efficient signaling of feature map information for a system employing a neural network. In particular, at the decoder side, a presence indicator is obtained based on information parsed from a bitstream. Based on the value of the obtained presence indicator, further data related to a feature map region are parsed or the parsing is bypassed. The presence indicator may be, for instance, a region presence indicator indicating whether feature map data is included in the bitstream or may be a side information presence indicator indicating whether a side information related to the feature map data is included in the bitstream. Similarly, an encoding method, as well as encod-
(Continued)

ing and decoding devices, are provided. Accordingly, feature map data may be processed more efficiently, by reducing decoding complexity, and the amount of transmitted data can be reduced by applying the bypassing.

47 Claims, 23 Drawing Sheets

(51) Int. Cl.
   *H04N 19/136* (2014.01)
   *H04N 19/154* (2014.01)
   *H04N 19/167* (2014.01)
   *H04N 19/17* (2014.01)
   *H04N 19/184* (2014.01)
   *H04N 19/60* (2014.01)
   *H04N 19/70* (2014.01)

(52) U.S. Cl.
   CPC ......... *H04N 19/154* (2014.11); *H04N 19/167* (2014.11); *H04N 19/17* (2014.11); *H04N 19/184* (2014.11); *H04N 19/60* (2014.11); *H04N 19/70* (2014.11)

(58) Field of Classification Search
   CPC ...... H04N 19/184; H04N 19/60; H04N 19/70; H04N 19/176; H04N 19/36; H04N 19/46; H04N 19/59; H04N 19/96; H04N 19/119; H04N 19/463; G06V 10/82; G06V 20/40; G06N 3/0464; G06T 9/002; G06T 2207/20084
   See application file for complete search history.

(56) References Cited

U.S. PATENT DOCUMENTS

| | | | |
|---|---|---|---|
| 2018/0270502 A1* | 9/2018 | Mukherjee | H04N 19/11 |
| 2019/0238893 A1* | 8/2019 | Covell | H04N 19/14 |
| 2020/0021813 A1 | 1/2020 | Tanner et al. | |
| 2020/0092552 A1 | 3/2020 | Coelho et al. | |
| 2020/0162736 A1* | 5/2020 | Seok | H04N 19/18 |
| 2020/0304832 A1 | 9/2020 | Ramasubramonian et al. | |
| 2021/0004993 A1* | 1/2021 | Sugio | G06T 9/40 |
| 2021/0021823 A1* | 1/2021 | Na | G06N 3/08 |
| 2021/0027505 A1* | 1/2021 | Yano | G06T 11/60 |
| 2023/0085554 A1 | 3/2023 | Kim et al. | |

FOREIGN PATENT DOCUMENTS

| | | |
|---|---|---|
| EP | 3672241 A1 | 6/2020 |
| JP | 2010515300 A | 5/2010 |
| JP | 2020191077 A | 11/2020 |
| TW | 200910987 A | 3/2009 |
| WO | 2021172956 A1 | 9/2021 |

OTHER PUBLICATIONS

C. E. Shannon, "A Mathematical Theory of Communication," Reprinted with corrections from The Bell System Technical Journal, vol. 27, pp. 379-423, 623-656, Total 55 pages (Jul. and Oct. 1948).
Gersho et al., "Vector Quantization and Signal Compression," Springer Link, Total 7 pages (Nov. 1992). With an English Abstract.
Wintz et al., "Transform Picture Coding," Proceedings of the IEEE, vol. 60, No. 7, Total 18 pages, Institute of Electrical and Electronics Engineers, New York, New York (Jul. 1972).
Netravali et al., "Picture Coding: A Review," Proceedings of the IEEE, vol. 68, No. 3, Total 48 pages Institute of Electrical and Electronics Engineers, New York, New York (Mar. 1980).
Balle et al., "End-To-End Optimized Image Compression," Published as a conference paper at ICLR 2017, Total 27 pages (Mar. 3, 2017).
Balle et al, "Density Modeling of Images Using a Generalized Normalization Transformation," Published a.s a conference paper at ICLR 2016, Total 15 pages (Feb. 29, 2016).
Kingma et al., "Auto-Encoding Variational Bayes," arXiv:1312.6114v10 [stat.ML], Total 14 pages (May 1, 2014).
Rezende et al., "Stochastic Backpropagation and Approximate Inference in Deep Generative Models," arXiv:1401.4082v3 [stat.ML], Total 14 pages (May 30, 2014).
Wiegand et al., "Overview of the H.264/AVC Video Coding Standard," 560 IEEE Transactions on Circuits and Systems for Video Technology, vol. 13, No. 7, Total 17 pages Institute of Electrical and Electronics Engineers, New York, New York (Jul. 2003).
Sullivan et al., Overview of the High Efficiency Video Coding (HEVC) Standard, IEEE Transactions on Circuits and Systems for Video Technology, vol. 22, No. 12, Total 20 pages Institute of Electrical and Electronics Engineers, New York, New York (Dec. 2012).
Bross et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Document: JVET-P2001-vE, Total 492 pages,International Union of Telecommunication, Geneva, Switzerland (Oct. 1-11, 2019).
Choi et al., "Near-Lossless Deep Feature Compression for Collaborative Intelligence," arXiv:1804.09963v1 [eess.IV], Total 7 pages (Apr. 26, 2018).
Kang et al., "Neurosurgeon: Collaborative Intelligence Between the Cloud and Mobile Edge," ASPLOS "17, Xi"an, China, Total 15 pages (Apr. 8-12, 2017).
Eshratifar et al., "JointDNN: An Efficient Training and Inference Engine for Intelligent Mobile Cloud Computing Services," arXiv:1801.08618v1 [cs.DC], Total 13 pages (Jan. 25, 2013).
Choi et al., "Deep Feature Compression for Collaborative Object Detection," ICIP 2018, Total 5 pages (Sep. 2018).
Redmon et al., "YOLO9000: Better, Faster, Stronger," CVPR 2017 paper, Total 9 pages (Submitted Dec. 2016).
Bossen et al., "HEVC Complexity and Implementation Analysis," IEEE Transactions on Circuits and Systems for Video Technology, vol. 22, No. 12, Total 12 pages Institute of Electrical and Electronics Engineers, New York, New York (Dec. 2012).
Luo et al., "DeepSIC: Deep Semantic Image Compression," arXiv:1801.09468v1 [cs.CV], Total 9 pages (Jan. 29, 2018).
Marpe et al., "Context-Based Adaptive Binary Arithmetic Coding in the H.264/AVC Video Compression Standard," IEEE Transactions on Circuits and Systems for Video Technology, vol. 13, No. 7, Total 17 pages Institute of Electrical and Electronics Engineers, New York, New York (Jul. 2003).
"Cisco Visual Networking Index: Forecast and Methodology, 2016-2021," White paper, Cisco public, Total 17 pages (Jun. 6, 2017).
Wu et al., "Compressed Video Action Recognition," arXiv:1712.00636v2 [cs.CV], Total 14 pages (Mar. 29, 2018).
Han et al., "Deep Compression: Compressing Deep Neural Networks With Pruning, Trained Quantization and Huffman Coding," Published as a conference paper at ICLR 2016, Total 14 pages (Feb. 15, 2016).
Choi et al., "Near-Lossless Deep Feature Compression for Collaborative Intelligence," arXiv:1804.09963v2 [eess.IV], Total 7 pages (Jun. 15, 2018).
Toderici et al., "Variable Rate Image Compression With Recurrent Neural Networks," Published as a conference paper at ICLR 2016, Total 12 pages (Mar. 1, 2016).
Toderici et al., "Full Resolution Image Compression with Recurrent Neural Networks," CVPR 2017 paper, Total 9 pages (Nov. 2017).
Agustsson et al., "Soft-to-Hard Vector Quantization for End-to-End Learning Compressible Representations," 31st Conference on Neural Information Processing Systems (NIPS 2017), Long Beach, CA, USA, Total 11 pages (Apr. 2017).
Balle et al., Variational Image Compression With a Scale Hyperprior, arXiv:1802.01436v2 [eess.IV] Total 23 pages (May 1, 2018).
Johnston et al., "Improved Lossy Image Compression with Priming and Spatially Adaptive Bit Rates for Recurrent Networks," 2018 IEEE/CVF Conference on Computer Vision and Pattern Recognition, Total 9 pages (Jun. 2018).

(56) References Cited

OTHER PUBLICATIONS

Theis et al., "Lossy Image Compression With Compressive Autoencoders," arXiv:1703.00395v1 [stat.ML], Total 19 pages (Mar. 1, 2017).
Li et al., "Learning Convolutional Networks for Content-weighted Image Compression," 2018 IEEE/CVF Conference on Computer Vision and Pattern Recognition, Jun. 18-23, 2018, Total 10 pages (Dec. 2018).
Rippel et al., "Real-Time Adaptive Image Compression," Proceedings of the 3th International Conference on Machine, Learning, Sydney, Australia, PMLR 70, Total 9 pages (May 2017).
Agustsson et al., "Generative Adversarial Networks for Extreme Learned Image Compression," arXiv:1804.02958v3 [cs.CV], Total 26 pages (Aug. 18, 2019).
Wallace, "The JPEG Still Picture Compression Standard," IEEE Transactions on Consumer Electronics, vol. 38, No. 1, Total 17 pages Institute of Electrical and Electronics Engineers, New York, New York (Feb. 1, 1992).
Skodras et al., "The JPEG 2000 Still Image Compression Standard," IEEE, Total 23 pages Institute of Electrical and Electronics Engineers, New York, New York (Sep. 2001).
F. Bellard, "BPG image format," http://bellard.org/bpg/, Release 0.9.8 is available, Total 2 pages (Apr. 21, 2018).
Xue et al., "Video Enhancement with Task-Oriented Flow," arXiv:1711.09078v3 [cs.CV], Total 20 pages (Nov. 10, 2019).
Lu et al., "DVC: An End-to-end Deep Video Compression Framework," CVPR 2019 paper, Total 10 pages (Jan. 2019).
Bross et al., "Versatile Video Coding (Draft 10)," Joint Video Experts Team (JVET) of ITU-T SG 16 WP 3 and ISO/IEC JTC 1/SC 29/WG 11, 19th Meeting: by teleconference, JVET-S2001-v, Total 551 pages, International Union of Telecommunication, Geneva, Switzerland (Jun. 22-Jul. 1, 2020).
Choi et al., "Text of ISO/IEC CD 23094-1, Essential Video Coding," Information technology—General Video Coding—Part 1: Essential Video Coding, International Organisation for Standardisation Organisation Internationale de Normalisation ISO/IEC JTC1/SC29/WG11, Coding of Moving Pictures and Audio, ISO/IEC JTC1/SC29/WG11 N18568, Gothenburg, Sweden, Total 292 pages (Jul. 2019).
"Artificial neural network," Wikipedia, Total 38 pages (Date of page creation 12:50, Oct. 2, 2001).
"Autoencoder," Wikipedia, Total 14 pages (Date of page creation 09:11, Sep. 4, 2006).
"Convolutional neural network," Wikipedia, Total 36 pages (Date of page creation 15:20, Aug. 31, 2013).
"Lagrange multiplier," Wikipedia, Total 15 pages (Date of page creation 19:32, Dec. 20, 2002).
"Quadtree," Wikipedia, Total 12 pages (Date of page creation 04:22, Apr. 5, 2004).
Liu et al., "PiCANet: Learning Pixel-wise Contextual Attention for Saliency Detection," CVPR 2018 paper, Total 10 pages (Apr. 2018).
Ma et al., "Convolutional Neural Network-Based Arithmetic Coding for HEVC Intra-Predicted Residues," IEEE Transactions on Circuits and Systems for Video Technology, vol. 30, No. 7, total 16 pages, Institute of Electrical and Electronics Engineers, New York, New York (Jul. 2019).

\* cited by examiner

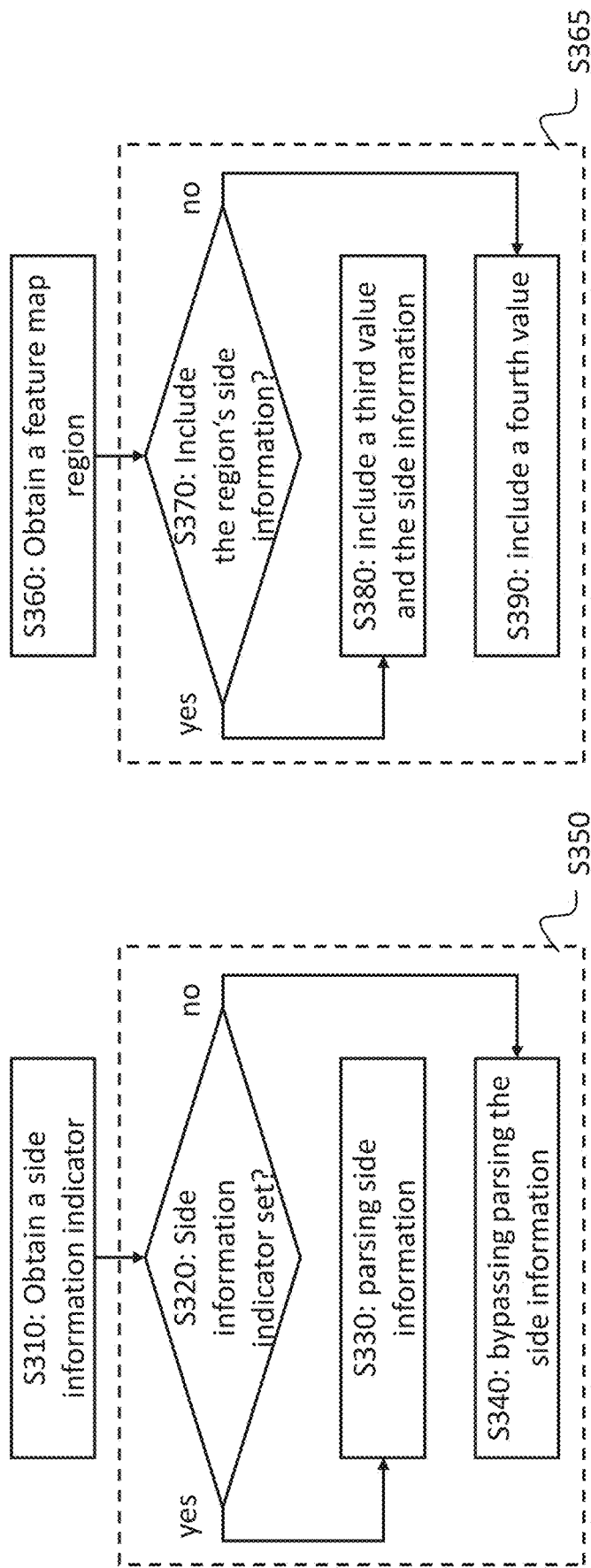

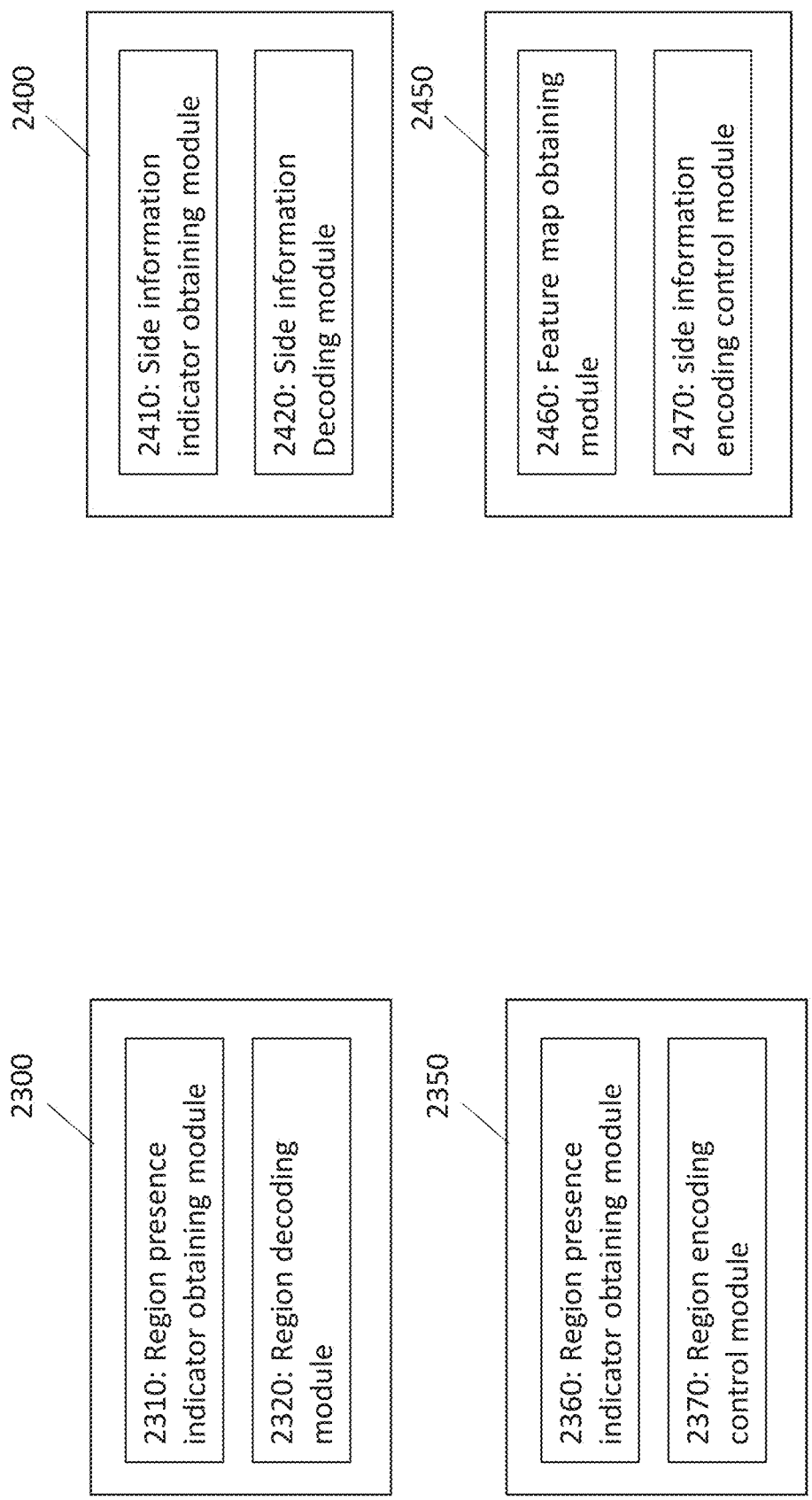

FEATURE MAP ENCODING AND DECODING BASED ON PRESENCE INDICATOR

CROSS-REFERENCE TO RELATED APPLICATIONS

This application is a continuation of International Application No. PCT/RU2021/050347, filed on Oct. 20, 2021, which claims priority to International Patent Application No. PCT/RU2020/000559, filed on Oct. 20, 2020. The disclosures of the aforementioned applications are hereby incorporated by reference in their entireties.

TECHNICAL FIELD

Embodiments of the present disclosure generally relate to the field of signaling information relating to neural network processing, such as feature maps or other side information.

BACKGROUND

Hybrid image and video codecs have been used for decades to compress image and video data. In such codecs, a signal is typically encoded block-wisely by predicting a block and by further coding only the difference between the original bock and its prediction. In particular, such coding may include transformation, quantization and generating the bitstream, usually including some entropy coding. Typically, the three components of hybrid coding methods—transformation, quantization, and entropy coding—are optimized separately. Modern video compression standards like High-Efficiency Video Coding (HEVC), Versatile Video Coding (VVC) and Essential Video Coding (EVC) also use transformed representation to code residual signal after prediction.

Recently, machine learning has been applied to image and video coding. In general, machine learning can be applied in various different ways to the image and video coding. For example, some end-to-end optimized image or video coding schemes have been discussed. Moreover, machine learning has been used to determine or optimize some parts of the end-to-end coding such as selection or compression of prediction parameters or the like. These applications have in common that they produce some feature map data, which is to be conveyed between encoder and decoder. An efficient structure of the bitstream may greatly contribute to reduction of the number of bits that encode the image/video source signal.

Efficient signaling of feature map data is also beneficial for other machine learning applications or for conveying the feature map data or related information between layers of a machine learning system, which may be distributed.

Collaborative intelligence has been one of several new paradigms for efficient deployment of deep neural networks across the mobile-cloud infrastructure. By dividing the network, e.g. between a (mobile) device and the cloud, it is possible to distribute the computational workload such that the overall energy and/or latency of the system is minimized. In general, distributing the computational workload allows resource-limited devices to be used in a neural network deployment. Moreover, computer vision tasks or image/video coding for machines are applications, which may also operate in a distributed manner and may make use of the collaborative intelligence.

A neural network usually comprises two or more layers. A feature map is an output of a layer. In a neural network that is split between devices, e.g. between a device and a cloud or between different devices, a feature map at the output of the place of splitting (e.g. a first device) is compressed and transmitted to the remaining layers of the neural network (e.g. to a second device).

Transmission resources are typically limited so that reducing the amount of the transferred data is desirable, while still providing configurability supporting diverse requirements regarding quality.

SUMMARY

The present disclosure relates to methods and apparatuses for compressing data used in a neural network. Such data may include but is not limited to features (e.g. feature maps).

In particular, some embodiments of the present disclosure relate to signaling of data of a feature map usable by a neural network. The efficiency may be improved by careful design of the bitstream structure. In particular, a presence indicator is signaled to indicate presence or absence of feature map data or, in general, side information. Depending on the presence indicator, the encoding and/or decoding of the feature map or its region is performed or skipped.

According to an aspect, a method is provided for decoding a feature map for processing by a neural network based on a bitstream, the method comprising: obtaining, for a region of the feature map, a region presence indicator based on information from the bitstream, decoding the region including: parsing data from the bitstream for decoding the region when the region presence indicator has a first value, and bypassing parsing data from the bitstream for decoding the region when the region presence indicator has a second value. Accordingly, the feature map data may be coded efficiently into a bitstream. In particular, the skipping of the parsing may reduce complexity of entropy decoding as well as reduce rate (reduce amount of data to be included into the bitstream).

In some embodiment, the region presence indicator is decoded from the bistream.

In some embodiment, the region presence indicator is derived based on information signaled in the bitstream. For example, when the region presence indicator has a second value, the decoding the region further includes setting of the region according to a predetermined rule. Possibility of having a rule how to fill the parts of feature map data in their absence enables the decoder to appropriately compensate for the non-signaled data.

For instance, the predetermined rule specifies the setting of the features of the region to a constant. Constant filling is a computationally simple and efficient way of filling the missing parts also not involving entropy decoding of every features element. In some embodiments, the constant is zero.

The method may comprise a step of decoding said constant from the bitstream. Signaling the constant provides the flexibility and may improve the reconstructed result.

In an exemplary implementation, the method comprises obtaining from the bitstream a side information presence indicator, parsing the side information from the bitstream when the side information presence indicator has a third value, and bypassing parsing the side information from the bitstream when the side information presence indicator has a fourth value; the side information may further include at least one of the region presence indicator, and information for being processed by a neural network to obtain an estimated probability model for use in an entropy decoding of the region. Additional side information may enable for more sophisticated settings. A presence indicator for the side information may make its coding mode efficient.

For example, when the side information presence indicator has the fourth value, the method includes setting of the side information to a predetermined side information value. Provision of filling the side information enables coping with the missing (non-signaled) data.

In some embodiments, the region presence indicator is a flag capable of taking one of only two values formed by the first value and the second value. A binary flag provides a particularly rate-efficient indication.

In some embodiments, the region is a channel of the feature map. Channel level is a natural layer granularity. As channels are already separately (separable) available, no further partitioning is necessary. Thus, exploiting the channel-wise granularity is an efficient way to scale rate and distortion. However, it is understood that region of the channel may have any other granularity, e.g. a sub-region or unit of the channel, values of a different channels corresponding to same spatial location of the sub-region or unit; single value of a feature map, values at the same spatial location in a different channels.

The method may further comprise obtaining a significance order which indicates significance of a plurality of channels of the feature map, obtaining a last significant channel indicator, and obtaining the region presence indicator based on the last significant channel indicator. Ordering the channels, or in general regions of a feature map may help simplifying the signaling of the region presence. In some embodiments, the indication of a last significant channel corresponds to index of the last significant channel within the significance order. Instead of signaling flag per region, signaling of last significant region transmitted as a side information in the bitstream may be more efficient.

The indication of a last significant channel may correspond to a quality indicator decoded from the bitstream and indicate quality of the coded feature map resulting from compression of the region of the feature map. Accordingly, the region channel presence may be derived without additional signaling, as the quality is usually indicated as a side information in the bitstream also for other purposes.

For example, the obtaining of the significance order comprises decoding of an indication of the significance order from the bitstream. Explicit signaling may provide for full flexibility of setting/configuring the order. However, the disclosure is not limited to explicit signaling of the significance order.

In an exemplary implementation, the obtaining of the significance order comprises deriving the significance order based on previously decoded information (or side information) regarding the source data from which the feature map has been generated. One of the advantages of this implementation is low additional signaling overhead.

For instance, the obtaining of the significance order comprises deriving the significance order based on previously decoded information regarding the type of source data from which the feature map has been generated. Type of source data may provide a good indication of the purpose and characteristic of the data and thus also for the quality required in their reconstruction.

For example, comprising decoding, from the bitstream, channels sorted within the bitstream according to the significance order from most significant until the last significant channel. That would enable bitrate scalability feature allowing to decrease bitrate without re-encoding by dropping (cutting) least significant channels according to desired quality level.

In an exemplary implementation, the method further comprises a step of decoding, from the bitstream, a region splitting information indicating splitting of the region of a feature map into units, and depending on the splitting information, decoding or not decoding unit presence indication indicating whether feature map data is to be parsed from the bitstream or not for decoding a unit of the region. Further splitting (partitioning) of a region such as channel to units (partitions) may provide finer granularity in indicating presence of these units and thus, scale the overhead more flexibly.

For example, the region splitting information for the region includes a flag indicating whether or not the bitstream comprises unit information specifying dimensions and/or position of the units of the region; the method comprises decoding from the bitstream the unit presence indication per unit of the region; and depending on the value of the unit presence indication for a unit, parsing or not parsing from the bitstream feature map data for the unit. By signaling the parameters of the splitting, the rate and distortion relation may be controlled with an additional degree of freedom.

In some embodiments, the unit information specifies hierarchic splitting of the region including at least one of quad-tree, binary-tree, ternary-tree, or triangular splitting. These splitting provide the advantage of efficient signaling developed, e.g. as developed for the hybrid codecs.

In some exemplary implementations, the decoding of the region from the bitstream includes: extracting from the bitstream a last significant coefficient indicator indicating position of last coefficient among coefficients of the region, decoding from the bitstream significant coefficients of the region, setting the coefficients following the last significant coefficient indicator according to a predefined rule, and obtaining feature data of the region by inverse transformation of the coefficients of the region. Application of transformation and coding of coefficients after transformation enables identifying the significant coefficients easily, as they would be typically located in the lower-index coefficient region. This may further increase the signaling efficiency.

For instance, the inverse transformation is an inverse discrete cosine transformation, inverse discrete sine transformation, or an inverse transformation obtained by modifying the inverse discrete cosine transformation or inverse discrete cosine transformation, or a convolutional neural network transform. These exemplary transformations have been already used for residual coding purposes and may be implemented efficiently, e.g. with preexisting hardware/software/algorithm approaches.

The method may further comprise decoding from the bitstream a side information presence flag indicating whether or not the bitstream includes any side information for said feature map, wherein the side information includes information for being processed by a neural network to obtain an estimated probability model for use in an entropy decoding of the feature map. Presence indication for side information may provide more efficient signaling, similarly to the feature map region presence indication.

For example, the decoding of the region presence indicator includes decoding by a context adaptive entropy decoder. Further encoding/decoding with an adaptive entropy coding further compacts the bitstream.

According to an aspect, a method is provided for decoding a feature map for processing by a neural network from a bitstream, the method comprising: obtaining, from the bitstream, a side information indicator concerning the feature map; decoding the feature map including: when the side information indicator has a fifth value, parsing, from the bitstream, the side information for decoding the feature map, and when the side information indicator has a sixth value, bypassing parsing, from the bitstream, the side information for decoding the feature map. Presence indication for side information may provide for more efficient signaling, similarly to the feature map region presence indication.

The method may comprise an entropy decoding, wherein the entropy decoding is based on the decoded feature map processed by neural network. This enables for an efficient adaption of the entropy coder to the content.

For example, when the side information indicator has the sixth value, the method includes setting of the side information to a predetermined side information value. Accordingly, the signaling of side information values may be omitted, leading to a rate improvement. For instance, the predetermined side information value is zero.

In some embodiments, the method comprises a step of decoding said predetermined side information value from the bitstream. Provision of the value to be used as a default increases flexibility of its setting.

According to an aspect, a method is provided for decoding an image including: the method according to any of the above described methods for decoding a feature map for processing by a neural network from a bitstream; and a step of obtaining decoded image comprising processing the decoded feature map with the neural network. Application of the above methods for machine learning based image or video coding may considerably improve efficiency of such coding. For example, the feature map represents: coded image data, and/or coded side information for decoding the image data.

In another aspect, a method is provided for computer vision comprising: the method according to any of the above described methods for decoding a feature map for processing by a neural network from a bitstream; and a step of performing a computer vision task comprising processing the decoded feature map with the neural network. Application of the above methods for machine vision tasks may help reduce the rate required by the transfer of information within the machine learning based model such as neural network, especially in cases when it is implemented in a distributed manner. For instance, the computer vision task is object detection, object classification, and/or object recognition.

According to an aspect, a method is provided for encoding a feature map for processing by a neural network into a bitstream, the method comprising: obtaining for a region of the feature map, a region presence indicator, based on the obtained region presence indicator of the feature map, deciding: when the region presence indicator has a first value, encoding the region of the feature map; when the region presence indicator has a second value, bypassing encoding the region of the feature map.

In some embodiment, the region presence indicator is indicated in the bitstream.

In some embodiment, the region presence indicator is derived based on information already signaled in the bistream.

The encoding methods mentioned herein provide the bitstream with a particular structure, which enables the advantages mentioned above for the corresponding decoding methods.

For example, the deciding (or obtaining region presence indicator) includes evaluating values of the features of the region. Context/content based adaption of signaling enables exploiting the particular correlations and reduce rate of the coded stream accordingly. In such a way, the deciding (or obtaining region presence indicator) may include evaluating values in the context of the region, in other words, evaluating the values spatially neighboring to the region of the feature map.

In some embodiments, the deciding is based on an impact of the region on quality of a result of the said neural network processing. Such decision leads to reduction of rate sensitive to the distortion resulting from cutting of information.

According to an exemplary implementation, the deciding comprises: determining incrementally a sum of bits required for transmission of the feature map starting from bits of most significant regions and continuing with regions with decreasing significance until the sum exceeds a pre-configured threshold, encoding the regions for which the sum did not exceed the pre-configured threshold and the region presence indicator having the first value for the encoded regions, and encoding the region presence indicator having the second value for non encoded regions (also referred to as unencoded regions). This approach provides for computationally efficient approach to meet the constraints posed on the rate and distortion of the resulting stream.

According to an aspect, a method is provided for encoding a feature map for processing by a neural network into a bitstream, the method comprising: obtaining the feature map; decide whether to indicate side information concerning the feature map and indicating in the bitstream: either a side information indicator indicating a third value and the side information; or the side information indicator indicating a fourth value without the side information. Thus, the encoding may be capable to signal only information effectively needed for achieving the required quality/rate.

In some embodiments, the region presence indicator and/or the side information indicator is a flag capable of taking one of only two values formed by the first value and the second value. A binary flag provides a particularly rate-efficient indication. In some embodiments, the region is a channel of the feature map.

It is understood, that the region of the feature map may have different granularity, e.g. a sub-region or unit of the channel, values of a different channels corresponding to same spatial location of the sub-region or unit; single value of a feature map, values at the same spatial location in a different channels.

The method may further comprise obtaining a significance order which indicates significance of a plurality of channels of the feature map, obtaining a last significant channel indicator, and obtaining the region presence indicator based on the last significant channel indicator. In some embodiments, the indication of a last significant channel corresponds to index of the last significant channel within the significance order.

The indication of a last significant channel may correspond to a quality indicator encoded (inserted) into the bitstream as a side information and indicate quality of the coded feature map resulting from compression of the region of the feature map.

For example, a significance order indication is inserted (encoded) into the bitstream as a side information.

In an exemplary implementation, the obtaining of the significance order comprises deriving the significance order based on previously encoded information regarding the source data from which the feature map has been generated. For instance, the obtaining of the significance order comprises deriving the significance order based on previously encoded information regarding the type of source data from which the feature map has been generated.

For example, comprising encoding, into the bitstream, channels sorted within the bitstream according to the significance order from most significant until the last significant channel.

In an exemplary implementation, the method further comprises a step of encoding, into the bitstream, a region splitting information indicating splitting of the region of a feature map into units, and depending on the splitting, encoding (inserting into the bitstream) or not encoding (insert into the bitstream) a unit presence indication indicating, whether feature map data is included in the bitstream or not for decoding a unit of the region.

For example, the region splitting information for the region includes a flag indicating whether or not the bitstream comprises unit information specifying dimensions and/or position of the units of the region; the method comprises decoding from the bitstream the unit presence indication per unit of the region; and depending on the value of the unit presence indication for a unit, parsing or not parsing from the bitstream feature map data for the unit. By signaling the parameters of the splitting, the rate and distortion relation may be controlled with an additional degree of freedom.

In some embodiments, the unit information specifies hierarchic splitting of the region including at least one of quad-tree, binary-tree, ternary-tree, or triangular splitting.

In some exemplary implementations, the encoding of the region into the bitstream includes: including into the bitstream a last significant coefficient indicator indicating position of a last coefficient among coefficients of the region, encoding into the bitstream significant coefficients of the region, and transforming feature data of the region by a transformation thereby obtaining the coefficients of the region.

For instance, the inverse transformation is an inverse discrete cosine transformation, inverse discrete sine transformation, or an inverse transformation obtained by modifying the inverse discrete cosine transformation or inverse discrete cosine transformation, or a convolutional neural network transform.

The method may further comprise encoding into the bitstream a side information presence flag indicating whether or not the bitstream includes any side information for said feature map, wherein the side information includes information for being processed by a neural network to obtain an estimated probability model for use in an entropy decoding of the feature map.

For example, the encoding of the region presence indicator and/or the side information indicator includes encoding by a context adaptive entropy encoder.

According to an aspect, a method is provided for encoding a feature map for processing by a neural network into a bitstream, the method comprising: including, into the bitstream, a side information indicator concerning the feature map; encoding the feature map including: inserting into the bitstream a fifth value of the side information indicator, the side information being for decoding the feature map and include the side information into the bitstream; or include into the bitstream a sixth value of the side information indicator and not inserting into the bitstream the side information for the feature map region.

The method may comprise an entropy encoding, wherein the entropy encoding is based on the encoded feature map processed by neural network.

For example, when the side information indicator has the sixth value, the encoder controls thereby the setting of the side information to a predetermined side information value at the decoder. In some embodiments, the method comprises a step of encoding said predetermined side information value into the bitstream.

According to an aspect, a method is provided for encoding an image including: obtaining encoded image by processing an input image with the neural network, thereby obtaining a feature map; and the method according to any of the above described methods for encoding the feature map into a bitstream. For example, the feature map represents: coded image data, and/or coded side information for decoding the image data.

In another aspect, a method is provided for computer vision comprising: the method according to any of the above described methods for encoding a feature map processed by a neural network into a bitstream; and a step of processing an image thereby obtaining feature map with the neural network, to provide to a decoder the feature map for performing based thereon the computer vision task. For instance, the computer vision task is object detection, object classification, and/or object recognition.

According to an aspect, a computer program stored on a non-transitory medium comprising code which when executed on one or more processors performed steps of any of methods presented above.

According to an aspect, a device is provided for decoding a feature map for processing by a neural network based on a bitstream, the device comprising: a region presence indicator obtaining module configured to obtain, for a region of the feature map, a region presence indicator based on information from the bitstream, a decoding module configured to decode the region including: parsing data from the bitstream for decoding the region when the region presence indicator has a first value, and bypassing parsing data from the bitstream for decoding the region when the region presence indicator has a second value.

According to an aspect, a device is provided for decoding a feature map for processing by a neural network from a bitstream, the device comprising: a side information indicator obtaining module configured to obtain, from the bitstream, a side information indicator concerning the feature map; a decoding module configured to decode the feature map including: when the side information indicator has a fifth value, parsing, from the bitstream, the side information for decoding the feature map, and when the side information indicator has a sixth value, bypassing parsing, from the bitstream, the side information for decoding the feature map.

According to an aspect, a device is provided for encoding a feature map for processing by a neural network into a bitstream, the device comprising: a feature map obtaining module configured to obtain the feature map, an encoding control module configured to, based on the obtained feature map, obtaining a region presence indicator, and decide based on the obtained region presence indicator: when the region presence indicator has a first value encoding a region of the feature map; or when region presence indicator has a second value bypassing encoding the region of the feature map.

According to an aspect, a device is provided for encoding a feature map for processing by a neural network into a bitstream, the device comprising: a feature map obtaining module configured to obtain the feature map; an encoding control module configured to decide whether to indicate side information concerning the feature map and indicating in the bitstream: either a side information indicator indicating a third value and the side information; or the side information indicator indicating a fourth value without the side information.

According to an aspect, a device is provided for decoding a feature map for processing by a neural network based on a bitstream, the device comprising a processing circuitry configured to perform steps of the method according to any of the methods referred to above.

According to an aspect, a device is provided for encoding a feature map for processing by a neural network into a bitstream, the device comprising a processing circuitry configured to perform steps of the method according to any of the methods referred to above.

According to an aspect, the decoder device is implemented by a cloud. In such scenario, some embodiments may provide a good tradeoff between the rate necessary for transmission and the neural network accuracy.

Any of the above mentioned apparatuses may be embodied on an integrated chip.

Any of the above mentioned embodiments and exemplary implementations may be combined.

BRIEF DESCRIPTION OF THE DRAWINGS

In the following, embodiments are described in more detail with reference to the attached figures and drawings, in which

FIG. 13 is a flow chart illustrating an exemplary method for decoding feature map data for an image region including side information;

FIG. 14 is a flow chart illustrating an exemplary method for encoding feature map data for an image region including side information;

FIG. 23 is a block diagram illustrating an exemplary apparatus for decoding and encoding feature map data;

FIG. 24 is a block diagram illustrating an exemplary apparatus for decoding and encoding side information data;

DESCRIPTION

Figure 1:
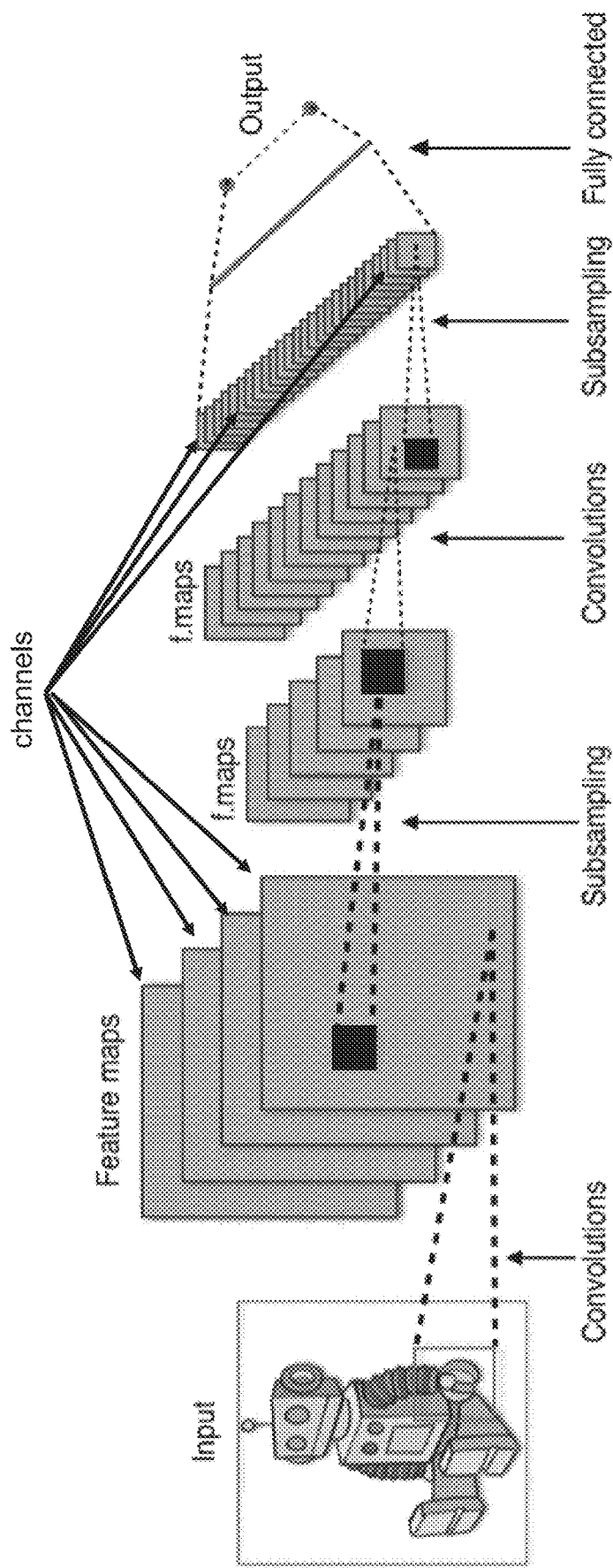
FIG. 1 is a schematic drawing illustrating channels processed by layers of a neural network.

In the following description, reference is made to the accompanying figures, which form part of the disclosure, and which show, by way of illustration, specific aspects of embodiments or specific aspects in which embodiments of the present disclosure may be used. It is understood that embodiments may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Some embodiments aim at providing a low-complexity compression of data for neural networks. For example, the data may include feature maps, or other data used in neural networks such as weights or other parameters. In some exemplary implementations, signaling is provided which may be capable of producing an efficient bitstream for neural network. According to a collaborative intelligence paradigm, mobile or edge device may have a feedback from the cloud, if it is needed. However, it is noted that the present disclosure is not limited to the framework of collaborative networks including cloud. It may be employed in any distributed neural network system. Moreover, it may be employed for storing feature maps also in neural networks, which are not necessarily distributed.

In the following, an overview over some of the used technical terms is provided.

Artificial Neural Networks

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

Convolutional Neural Networks

The name "convolutional neural network" (CNN) indicates that the network employs a mathematical operation called convolution. Convolution is a specialized kind of linear operation. Convolutional networks are simply neural networks that use convolution in place of general matrix multiplication in at least one of their layers.

FIG. 1 schematically illustrates a general concept of processing by a neural network such as the CNN. A convolutional neural network consists of an input and an output layer, as well as multiple hidden layers. Input layer is the layer to which the input (such as a portion of an image as shown in FIG. 1) is provided for processing. The hidden layers of a CNN typically consist of a series of convolutional layers that convolve with a multiplication or other dot product. The result of a layer is one or more feature maps (f maps in FIG. 1), sometimes also referred to as channels. There may be a subsampling involved in some or all of the layers. As a consequence, the feature maps may become smaller, as illustrated in FIG. 1. The activation function in a CNN is usually a RELU (Rectified Linear Unit) layer, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how weight is determined at a specific index point.

When programming a CNN for processing images, as shown in FIG. 1, the input is a tensor with shape (number of images)×(image width)×(image height)×(image depth). Then after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. Also, such network architecture does not take into account the spatial structure of data, treating input pixels which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. These models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 downsamples at every depth slice in the input by 2 along both width and height, discarding 75% of the activations. In this case, every max operation is over 4 numbers. The depth dimension remains unchanged.

In addition to max pooling, pooling units can use other functions, such as average pooling or l2-norm pooling. Average pooling was often used historically but has recently fallen out of favour compared to max pooling, which performs better in practice. Due to the aggressive reduction in the size of the representation, there is a recent trend towards using smaller filters or discarding pooling layers altogether. "Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

In summary, FIG. 1 shows the data flow in a typical convolutional neural network. First, the input image is passed through a convolutional layer and becomes abstracted to a feature map comprising several channels, corresponding to number of filters (e.g. each filter one channel) in a set of learnable filters of this layer. Then the feature map is subsampled using e.g. pooling layer, which reduces dimension of each channel in feature map. Next data comes to another convolutional layer, which may have different numbers of output channels leading to different number of channels in feature map. As was mentioned above, the number of input channels and output channels are hyper-parameters of the layer. To establish connectivity of the network those parameters needs to be synchronized between two connected layers, such as number of input channels for the current layers should be equal to number of output channels of previous layer. For the first layer which process input data, e.g. image, the number of input channels is normally equal to number of channels of data representation, for instance 3 channels for RGB or YUV representation of images or video, or 1 channel for grayscale image or video representation.

Autoencoders and Unsupervised Learning

Figure 2:
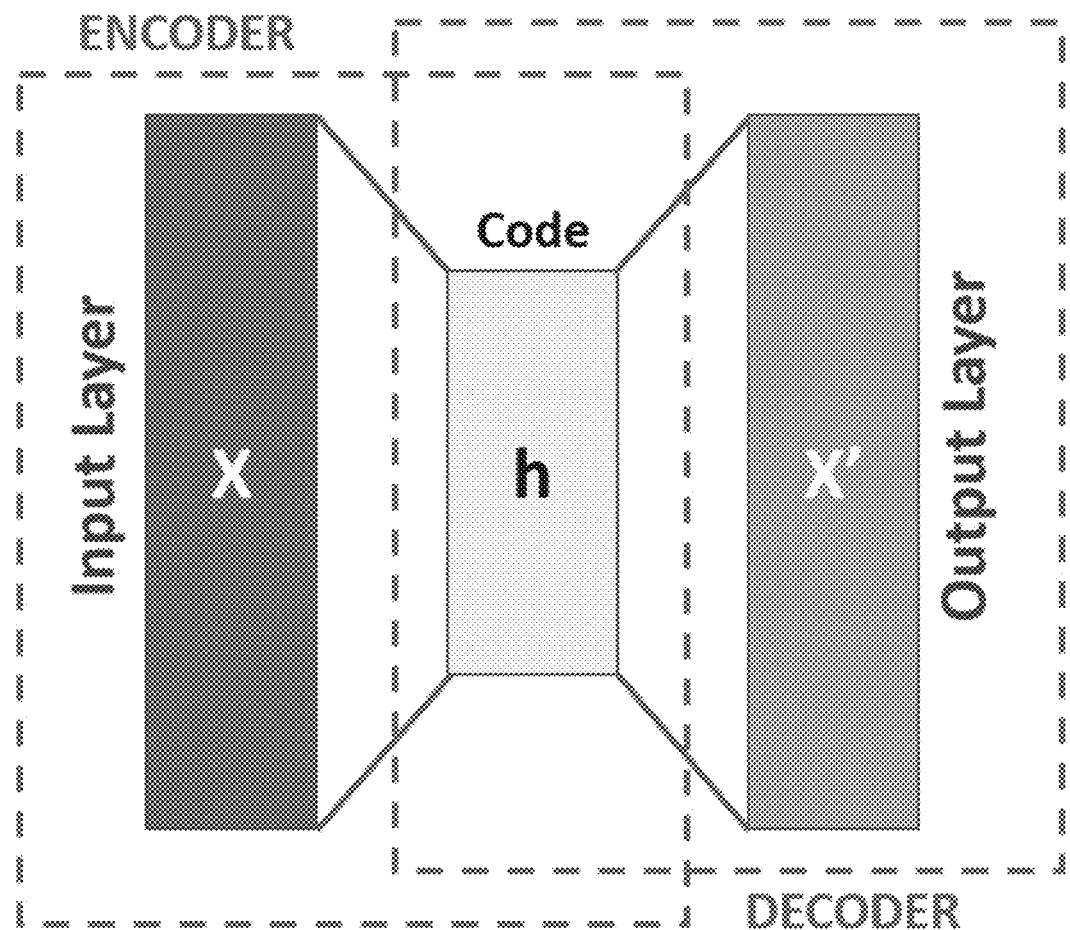
FIG. 2 is a schematic drawing illustrating an autoencoder type of a neural network.

An autoencoder is a type of artificial neural network used to learn efficient data codings in an unsupervised manner. A schematic drawing thereof is shown in FIG. 2. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name. In the simplest case, given one hidden layer, the encoder stage of an autoencoder takes the input x and maps it to h $$h=\sigma(Wx+b).$$

This image h is usually referred to as code, latent variables, or latent representation. Here, σ is an element-wise activation function such as a sigmoid function or a rectified linear unit. W is a weight matrix b is a bias vector. Weights and biases are usually initialized randomly, and then updated iteratively during training through Backpropagation. After that, the decoder stage of the autoencoder maps h to the reconstruction x' of the same shape as x:

$$x'=\sigma'(W'h'+b')$$

where σ', W' and b' for the decoder may be unrelated to the corresponding σ, W and b for the encoder.

Variational autoencoder (VAE) models make strong assumptions concerning the distribution of latent variables. They use a variational approach for latent representation learning, which results in an additional loss component and a specific estimator for the training algorithm called the Stochastic Gradient Variational Bayes (SGVB) estimator. It assumes that the data are generated by a directed graphical model $p_\theta(x|h)$ and that the encoder is learning an approximation $q_\phi(h|x)$ to the posterior distribution $p_\theta(h|x)$ where φ and θ denote the parameters of the encoder (recognition model) and decoder (generative model) respectively. The probability distribution of the latent vector of a VAE typically matches that of the training data much closer than a standard autoencoder. The objective of VAE has the following form:

$$\mathcal{L}(\phi,\theta,x) = D_{KL}(q_\phi(h|x)\|p_\theta(h)) - E_{q_\phi(h|x)}(\log p_\theta(x|h))$$

Here, $D_{KL}$ stands for the Kullback-Leibler divergence. The prior over the latent variables is usually set to be the centered isotropic multivariate Gaussian $p_\theta(h) = \mathcal{N}(0,1)$. Commonly, the shape of the variational and the likelihood distributions are chosen such that they are factorized Gaussians:

$$q_\phi(h|x) = \mathcal{N}(\rho(x), \omega^2(x)I)$$

$$p_\phi(x|h) = \mathcal{N}(\mu(h), \sigma^2(h)I)$$

where $\rho(x)$ and $\omega^2(x)$ are the encoder output, while $\mu(h)$ and $\sigma^2(h)$ are the decoder outputs.

Recent progress in artificial neural networks area and especially in convolutional neural networks enables researchers' interest of applying neural networks based technologies to the task of image and video compression. For example, End-to-end Optimized Image Compression has been proposed, which uses a network based on variational autoencoder. Accordingly, data compression is considered as a fundamental and well-studied problem in engineering, and is commonly formulated with the goal of designing codes for a given discrete data ensemble with minimal entropy. The solution relies heavily on knowledge of the probabilistic structure of the data, and thus the problem is closely related to probabilistic source modeling. However, since all practical codes must have finite entropy, continuous-valued data (such as vectors of image pixel intensities) must be quantized to a finite set of discrete values, which introduces error. In this context, known as the lossy compression problem, one must trade off two competing costs: the entropy of the discretized representation (rate) and the error arising from the quantization (distortion). Different compression applications, such as data storage or transmission over limited-capacity channels, demand different rate-distortion trade-offs. Joint optimization of rate and distortion is difficult. Without further constraints, the general problem of optimal quantization in high-dimensional spaces is intractable. For this reason, most existing image compression methods operate by linearly transforming the data vector into a suitable continuous-valued representation, quantizing its elements independently, and then encoding the resulting discrete representation using a lossless entropy code. This scheme is called transform coding due to the central role of the transformation. For example, JPEG uses a discrete cosine transform on blocks of pixels, and JPEG 2000 uses a multi-scale orthogonal wavelet decomposition. Typically, the three components of transform coding methods—transform, quantizer, and entropy code—are separately optimized (often through manual parameter adjustment). Modern video compression standards like HEVC, VVC and EVC also use transformed representation to code residual signal after prediction. The several transforms are used for that purpose such as discrete cosine and sine transforms (DCT, DST), as well as low frequency non-separable manually optimized transforms (LFNST).

Variational Image Compression

In J. Balle, L. Valero Laparra, and E. P. Simoncelli (2015). *"Density Modeling of Images Using a Generalized Normalization Transformation". In: arXiv e-prints.* Presented at the 4th Int. Conf for Learning Representations, 2016 (referred to in the following as "Balle") the authors proposed a framework for end-to-end optimization of an image compression model based on nonlinear transforms. Previously, authors demonstrated that a model consisting of linear-nonlinear block transformations, optimized for a measure of perceptual distortion, exhibited visually superior performance compared to a model optimized for mean squared error (MSE). Here, authors optimize for MSE, but use a more flexible transforms built from cascades of linear convolutions and nonlinearities. Specifically, authors use a generalized divisive normalization (GDN) joint nonlinearity that is inspired by models of neurons in biological visual systems, and has proven effective in Gaussianizing image densities. This cascaded transformation is followed by uniform scalar quantization (i.e., each element is rounded to the nearest integer), which effectively implements a parametric form of vector quantization on the original image space. The compressed image is reconstructed from these quantized values using an approximate parametric nonlinear inverse transform.

For any desired point along the rate-distortion curve, the parameters of both analysis and synthesis transforms are jointly optimized using stochastic gradient descent. To achieve this in the presence of quantization (which produces zero gradients almost everywhere), authors use a proxy loss function based on a continuous relaxation of the probability model, replacing the quantization step with additive uniform noise. The relaxed rate-distortion optimization problem bears some resemblance to those used to fit generative image models, and in particular variational autoencoders, but differs in the constraints authors impose to ensure that it approximates the discrete problem all along the rate-distortion curve. Finally, rather than reporting differential or discrete entropy estimates, authors implement an entropy code and report performance using actual bit rates, thus demonstrating the feasibility of the solution as a complete lossy compression method.

In J. Balle, an end-to-end trainable model for image compression based on variational autoencoders is described. The model incorporates a hyperprior to effectively capture spatial dependencies in the latent representation. This hyperprior relates to side information also transmitted to decoding side, a concept universal to virtually all modern image codecs, but largely unexplored in image compression using ANNs. Unlike existing autoencoder compression methods, this model trains a complex prior jointly with the underlying autoencoder. Authors demonstrate that this model leads to state-of-the-art image compression when measuring visual quality using the popular MS-SSIM index, and yields rate-distortion performance surpassing published ANN-based methods when evaluated using a more traditional metric based on squared error (PSNR).

Figure 3:
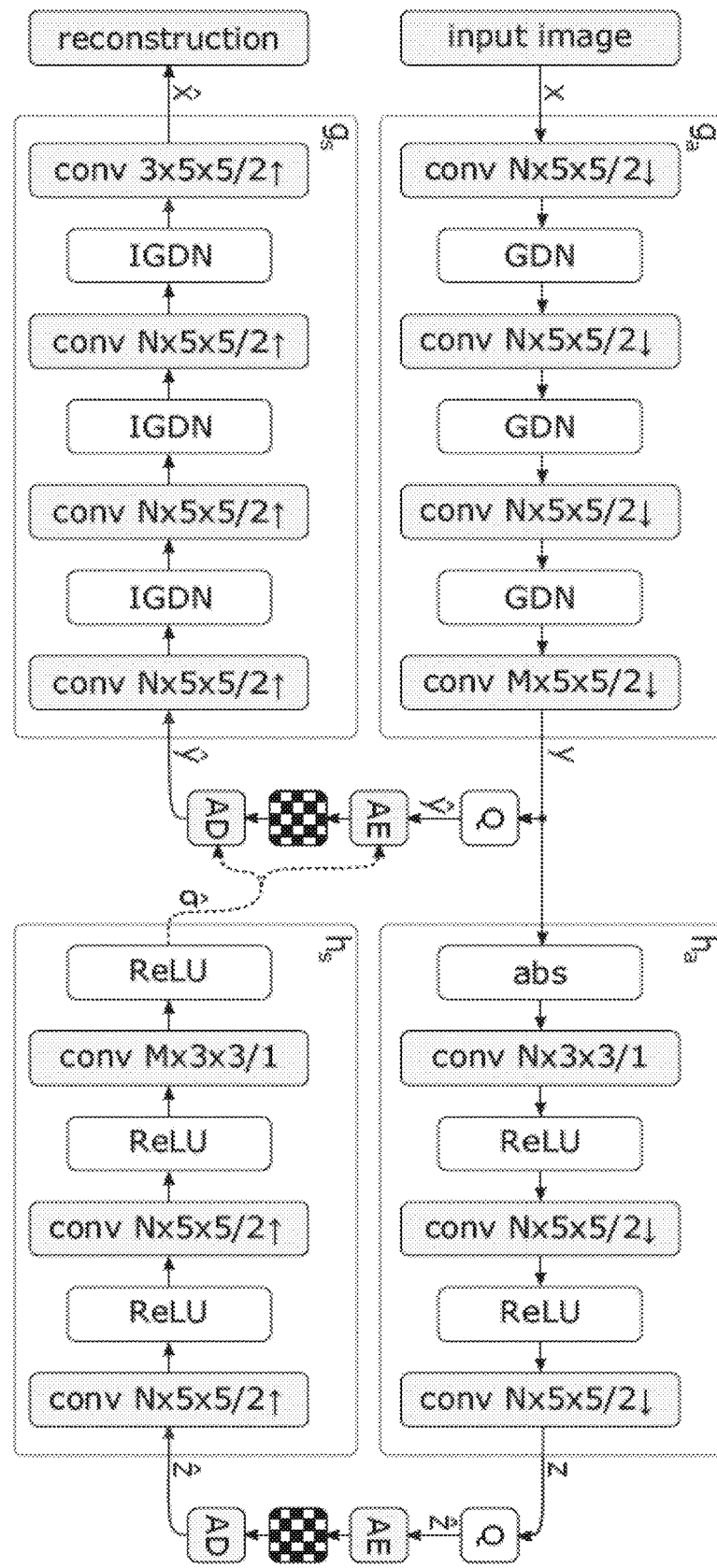
FIG. 3 is a schematic drawing illustrating network architecture including a hyperprior model.

FIG. 3 shows a network architecture including a hyperprior model. The left side ($g_a$, $g_s$) shows an image autoencoder architecture, the right side ($h_a$, $h_s$) corresponds to the autoencoder implementing the hyperprior. The factorized-prior model uses the identical architecture for the analysis and synthesis transforms $g_a$ and $g_s$. Q represents quantization, and AE, AD represent arithmetic encoder and arithmetic decoder, respectively. The encoder subjects the input image x to $g_a$, yielding the responses y (latent representation) with spatially varying standard deviations. The encoding $g_a$ includes a plurality of convolution layers with sub-sampling and, as an activation function, generalized divisive normalization (GDN).

The responses are fed into $h_a$, summarizing the distribution of standard deviations in z. z is then quantized, compressed, and transmitted as side information. The encoder then uses the quantized vector $\hat{z}$ to estimate $\hat{\sigma}$, the spatial distribution of standard deviations which is used for obtaining probability values (or frequency values) for arithmetic coding (AE), and uses it to compress and transmit the quantized image representation $\hat{y}$ (or latent representation). The decoder first recovers $\hat{z}$ from the compressed signal. It then uses $h_s$ to obtain $\hat{y}$, which provides it with the correct probability estimates to successfully recover $\hat{y}$ as well. It then feeds $\hat{y}$ into $g_s$ to obtain the reconstructed image.

In further works the probability modelling by hyperprior was further improved by introducing autoregressive model e.g. based on PixelCNN++ architecture, which allows to utilize context of already decoded symbols of latent space for better probabilities estimation of further symbols to be decoded, e.g. like it is illustrated on FIG. 2 of L. Zhou, Zh. Sun, X Wu, J. Wu, *End-to-end Optimized Image Compression with Attention Mechanism, CVPR* 2019 (referred to in the following as "Zhou").

Cloud Solutions for Machine Tasks

Figure 4:
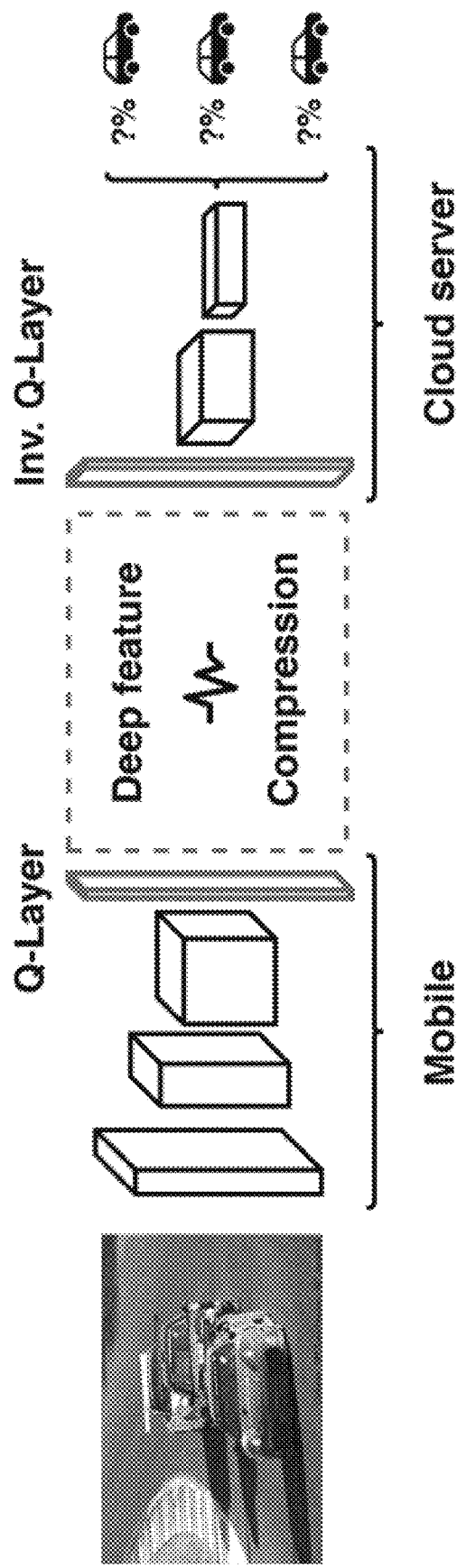
FIG. 4 is a block diagram illustrating a structure of a cloud-based solution for machine based tasks such as machine vision tasks.

The Video Coding for Machines (VCM) is another computer science direction being popular nowadays. The main idea behind this approach is to transmit the coded representation of image or video information targeted to further processing by computer vision (CV) algorithms, like object segmentation, detection and recognition. In contrast to traditional image and video coding targeted to human perception the quality characteristic is the performance of computer vision task, e.g. object detection accuracy, rather than reconstructed quality. This is illustrated in FIG. 4.

Video Coding for Machines is also referred to as collaborative intelligence and it is a relatively new paradigm for efficient deployment of deep neural networks across the mobile-cloud infrastructure. By dividing the network between the mobile and the cloud, it is possible to distribute the computational workload such that the overall energy and/or latency of the system is minimized. In general, the collaborative intelligence is a paradigm where processing of a neural network is distributed between two or more different computation nodes; for example devices, but in general, any functionally defined nodes. Here, the term "node" does not refer to the above-mentioned neural network nodes. Rather the (computation) nodes here refer to (physically or at least logically) separate devices/modules, which implement parts of the neural network. Such devices may be different servers, different end user devices, a mixture of servers and/or user devices and/or cloud and/or processor or the like. In other words, the computation nodes may be considered as nodes belonging to the same neural network and communicating with each other to convey coded data within/for the neural network. For example, in order to be able to perform complex computations, one or more layers may be executed on a first device and one or more layers may be executed in another device. However, the distribution may also be finer and a single layer may be executed on a plurality of devices. In this disclosure, the term "plurality" refers to two or more. In some existing solution, a part of a neural network functionality is executed in a device (user device or edge device or the like) or a plurality of such devices and then the output (feature map) is passed to a cloud. A cloud is a collection of processing or computing systems that are located outside the device, which is operating the part of the neural network. The notion of collaborative intelligence has been extended to model training as well. In this case, data flows both ways: from the cloud to the mobile during back-propagation in training, and from the mobile to the cloud during forward passes in training, as well as inference.

Some works presented semantic image compression by encoding deep features and then reconstructing the input image from them. The compression based on uniform quantization was shown, followed by context-based adaptive arithmetic coding (CABAC) from H.264. In some scenarios, it may be more efficient, to transmit from the mobile part to the cloud an output of a hidden layer (a deep feature map), rather than sending compressed natural image data to the cloud and perform the object detection using reconstructed images. The efficient compression of feature maps benefits the image and video compression and reconstruction both for human perception and for machine vision. Entropy coding methods, e.g. arithmetic coding is a popular approach to compression of deep features (i.e. feature maps).

Nowadays, video content contributes to more than 80% internet traffic, and the percentage is expected to increase even further. Therefore, it is critical to build an efficient video compression system and generate higher quality frames at given bandwidth budget. In addition, most video related computer vision tasks such as video object detection or video object tracking are sensitive to the quality of compressed videos, and efficient video compression may bring benefits for other computer vision tasks. Meanwhile, the techniques in video compression are also helpful for action recognition and model compression. However, in the past decades, video compression algorithms rely on handcrafted modules, e.g., block based motion estimation and Discrete Cosine Transform (DCT), to reduce the redundancies in the video sequences, as mentioned above. Although each module is well designed, the whole compression system is not end-to-end optimized. It is desirable to further improve video compression performance by jointly optimizing the whole compression system.

End-to-End Image or Video Compression

Recently, deep neural network (DNN) based autoencoder for image compression has achieved comparable or even better performance than the traditional image codecs like JPEG, JPEG2000 or BPG. One possible explanation is that the DNN based image compression methods can exploit large scale end-to-end training and highly non-linear transform, which are not used in the traditional approaches. However, it is non-trivial to directly apply these techniques to build an end-to-end learning system for video compression. First, it remains an open problem to learn how to generate and compress the motion information tailored for video compression. Video compression methods heavily rely on motion information to reduce temporal redundancy in video sequences. A straightforward solution is to use the learning based optical flow to represent motion information. However, current learning based optical flow approaches aim at generating flow fields as accurate as possible. The precise optical flow is often not optimal for a particular video task. In addition, the data volume of optical flow increases significantly when compared with motion information in the traditional compression systems and directly applying the existing compression approaches in to compress optical flow values will significantly increase the number of bits required for storing motion information. Second, it is unclear how to build a DNN based video compression system by minimizing the rate-distortion based objective for both residual and motion information. Rate-distortion optimization (RDO) aims at achieving higher quality of reconstructed frame (i.e., less distortion) when the number of bits (or bit rate) for compression is given. RDO is important for video compression performance. In order to exploit the power of end-to-end training for learning based compression system, the RDO strategy is required to optimize the whole system.

In Guo Lu, Wanli Ouyang, Dong Xu, Xiaoyun Zhang, Chunlei Cai, Zhiyong Gao; "DVC: An End-to-end Deep Video Compression Framework". Proceedings of the IEEE/CVF Conference on Computer Vision and Pattern Recognition (CVPR), 2019, pp. 11006-11015, authors proposed the end-to-end deep video compression (DVC) model that jointly learns motion estimation, motion compression, and residual coding.

Figure 5:
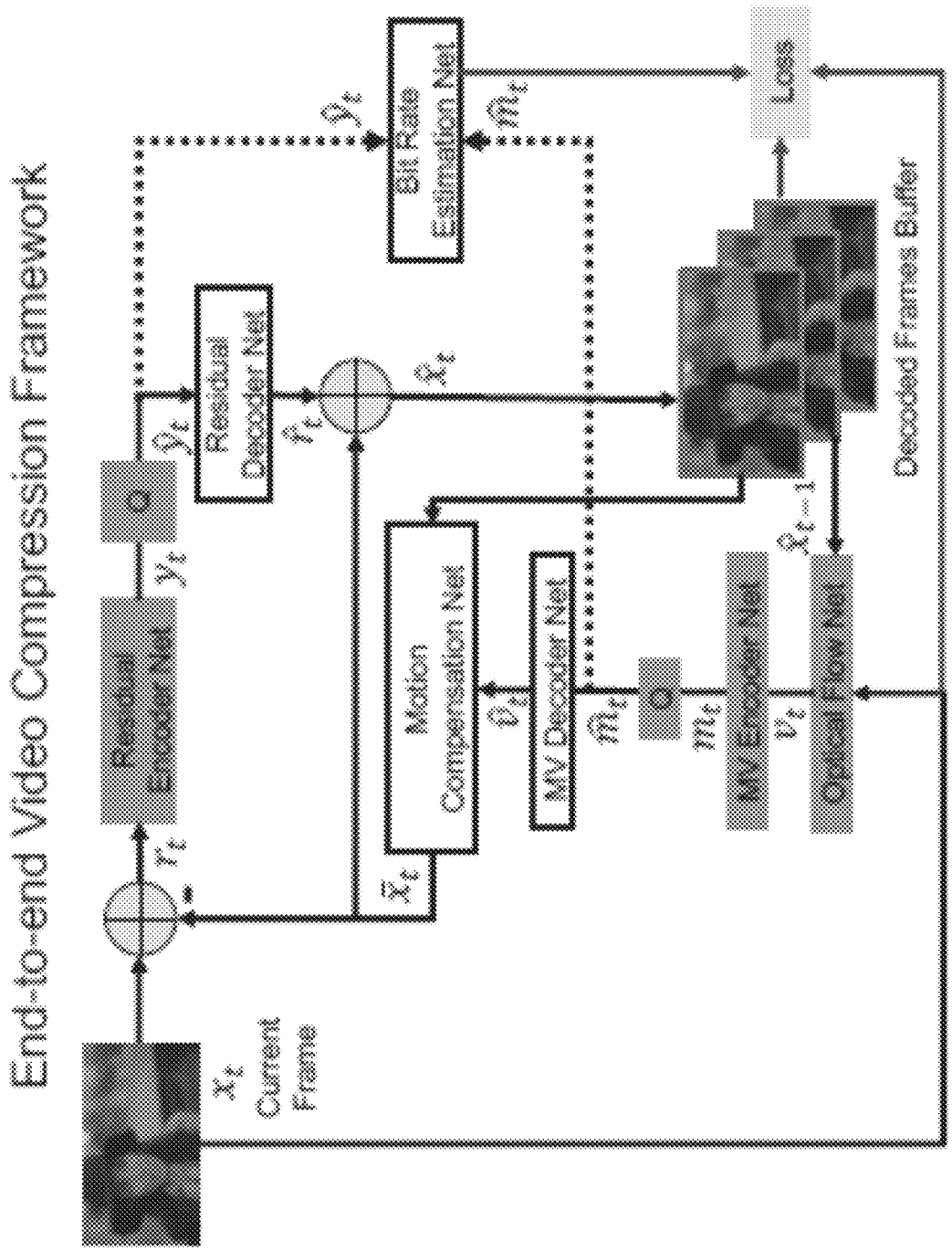
FIG. 5 is a block diagram illustrating a structure of end-to-end trainable video compression framework.
Figure 6:
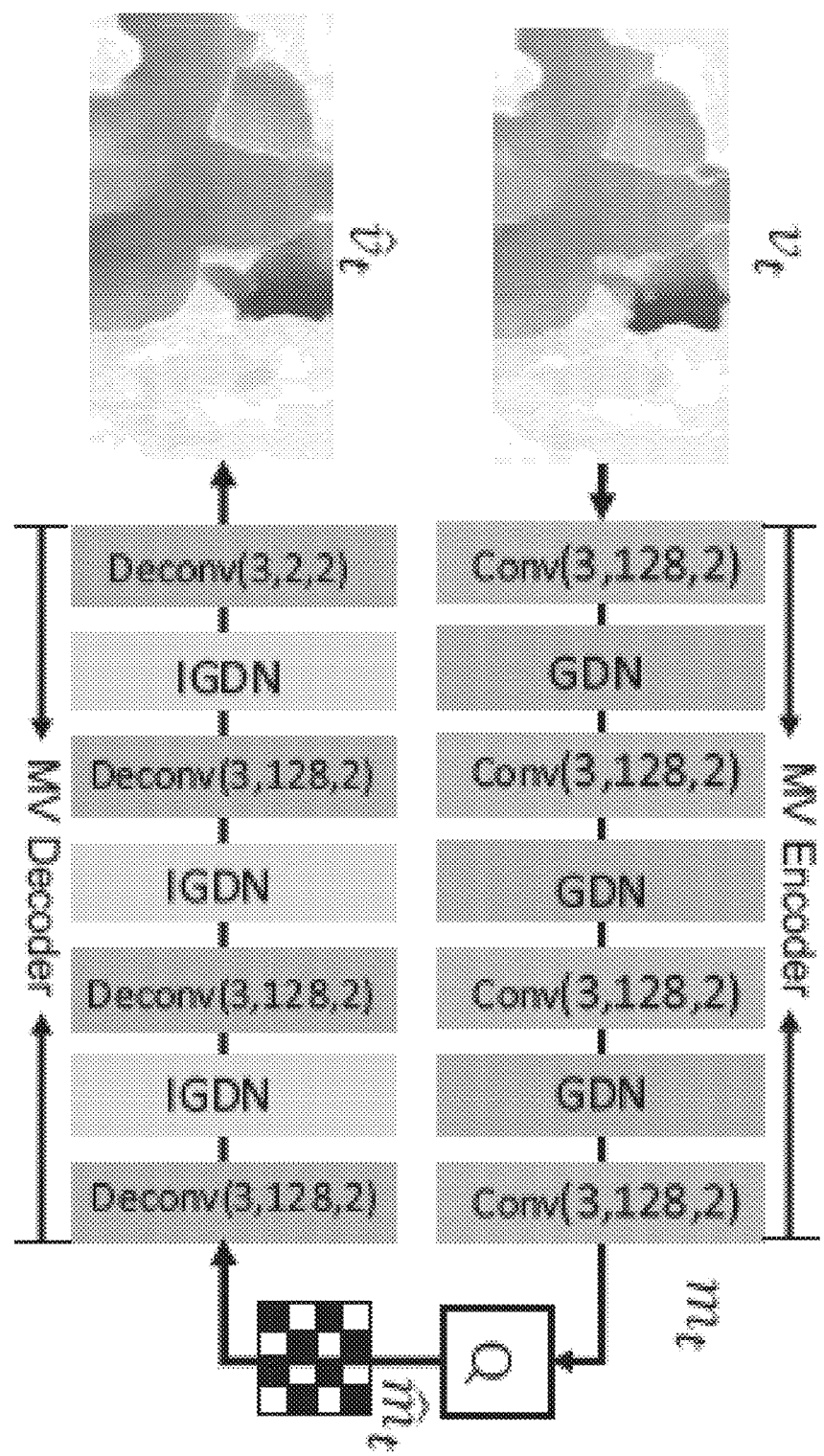
FIG. 6 is a block diagram illustrating a network for motion vectors (MV) compression.

Such encoder is illustrated in FIG. 5. In particular, FIG. 5 shows an overall structure of end-to-end trainable video compression framework. In order to compress motion information, a CNN was designated to transform the optical flow to the corresponding representations suitable for better compression. Specifically, an auto-encoder style network is used to compress the optical flow. The motion vectors (MV) compression network is shown in FIG. 6. The network architecture is somewhat similar to the ga/gs of FIG. 3. In particular, the optical flow is fed into a series of convolution operation and nonlinear transform including GDN and IGDN. The number of output channels for convolution (deconvolution) is 128 except for the last deconvolution layer, which is equal to 2. Given optical flow with the size of M×N×2, the MV encoder will generate the motion representation with the size of M/16×N/16×128. Then motion representation is quantized, entropy coded and sent to bitstream. The MV decoder receives the quantized representation and reconstruct motion information using MV encoder.

Figure 7:
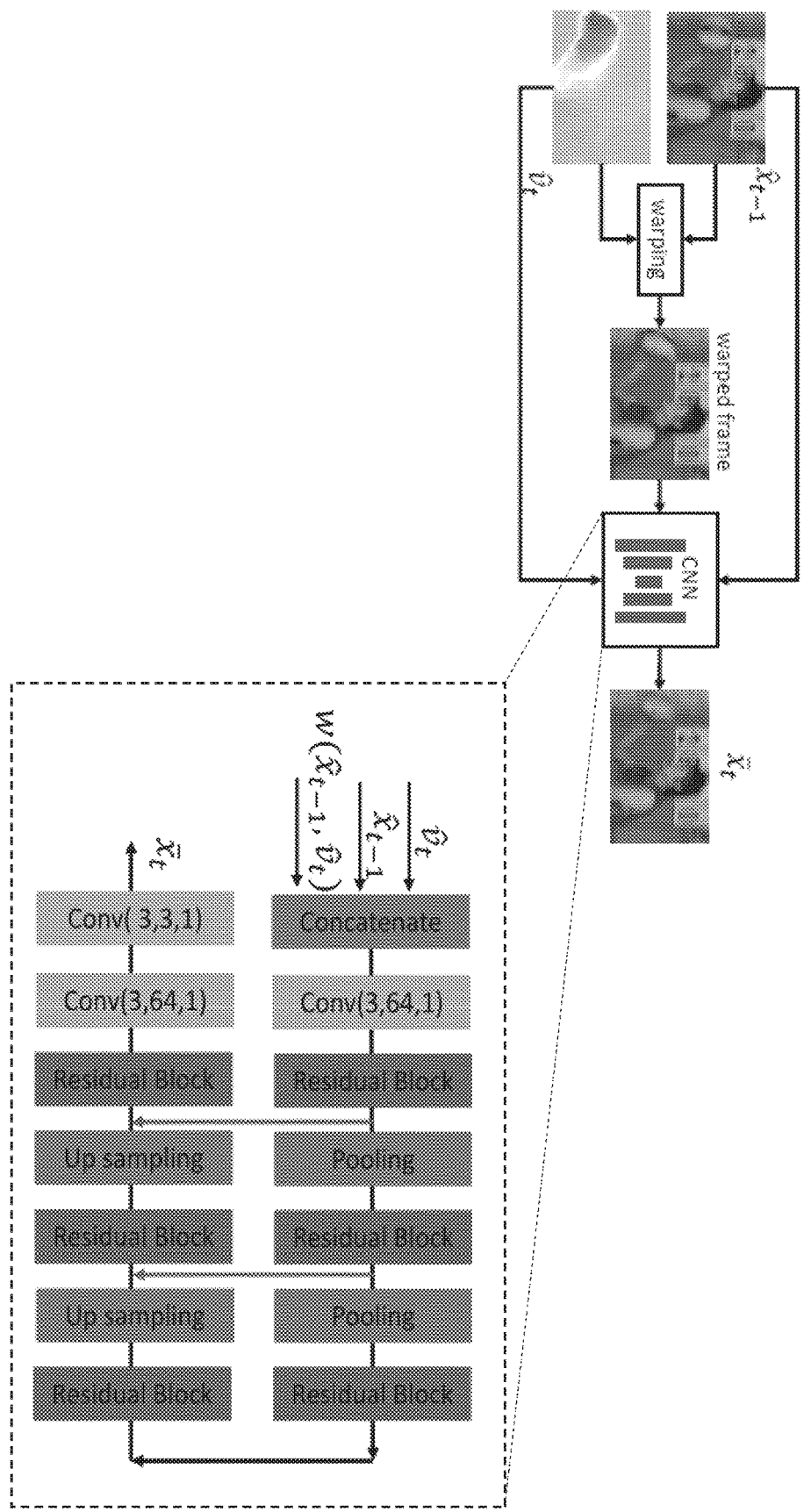
FIG. 7 is a block diagram illustrating a network for motion compensation.

FIG. 7 shows a structure of motion compensation part. Here using previous reconstructed frame $x_{t-1}$ and reconstructed motion information the warping unit generates the warped frame (normally, with help of interpolation filter such as bi-linear interpolation filter). Then a separate CNN with three inputs generates the predicted picture. The architecture of the motion compensation CNN is also shown in FIG. 7.

The residual information between the original frame and the predicted frame is encoded by the residual encoder network. A highly non-linear neural network is used to transform the residuals to the corresponding latent representation. Compared with discrete cosine transform in the traditional video compression system, this approach can better exploit the power of non-linear transform and achieve higher compression efficiency.

From above overview it can be seen that CNN based architecture can be applied both for image and video compression, considering different parts of video framework including motion estimation, motion compensation and residual coding. Entropy coding is popular method used for data compression, which is widely adopted by the industry and is also applicable for feature map compression either for human perception or for computer vision tasks.

Increasing Coding Efficiency

Channel information is not equally important for the final tasks. It was observed that some channel's information can be dropped e.g. not transmitted to decoder without significant harm to final image, or video reconstruction quality or object detection accuracy. At the same time the amount of bits saved due to dropping non important information may improve overall rate-distortion trade-off.

Moreover, the encoding and decoding latency is one of important parameters of compression system for its practical implementation. Due to nature of artificial neural networks, the operations within one layer can be performed in parallel and overall network latency is determined by amount of subsequentially connected layers, which is not that high usually. Taking advantage of modern graphic processing units (GPU) or network processing unit (NPU), which can support massive parallelism, an acceptable running time can be achieved. However, entropy coding methods such as arithmetic coding or range coding imply sequential operation on range interval calculation, normalization and probability interval matching. These operations can hardly be parallelized without sacrificing compression efficiency. Thus, the entropy coding may become a bottleneck, which limits the overall system latency. A reduction of the amount of data passed through entropy coding is desirable.

Some embodiments of the present disclosure may improve a compression efficiency. Further, they may speed up bypassing transmission of some feature map data from latent space of CNN based image and video codec. Based on such approaches, an increasing speed of entropy encoding and decoding process may be achieved, which may be considered significant for practical implementations.

In particular, transferring information of some feature map regions or channels may be skipped. In particular, those feature map data may be skipped, a lack of which is determined not to lead to significant degradation of reconstructed quality. Accordingly, compression efficiency may be improved. Still further, amount of data passed through entropy coding and decoding may be decreased, which may further decrease encoding and decoding time and reduce overall end-to-end compression system latency.

Figures 8, 9:
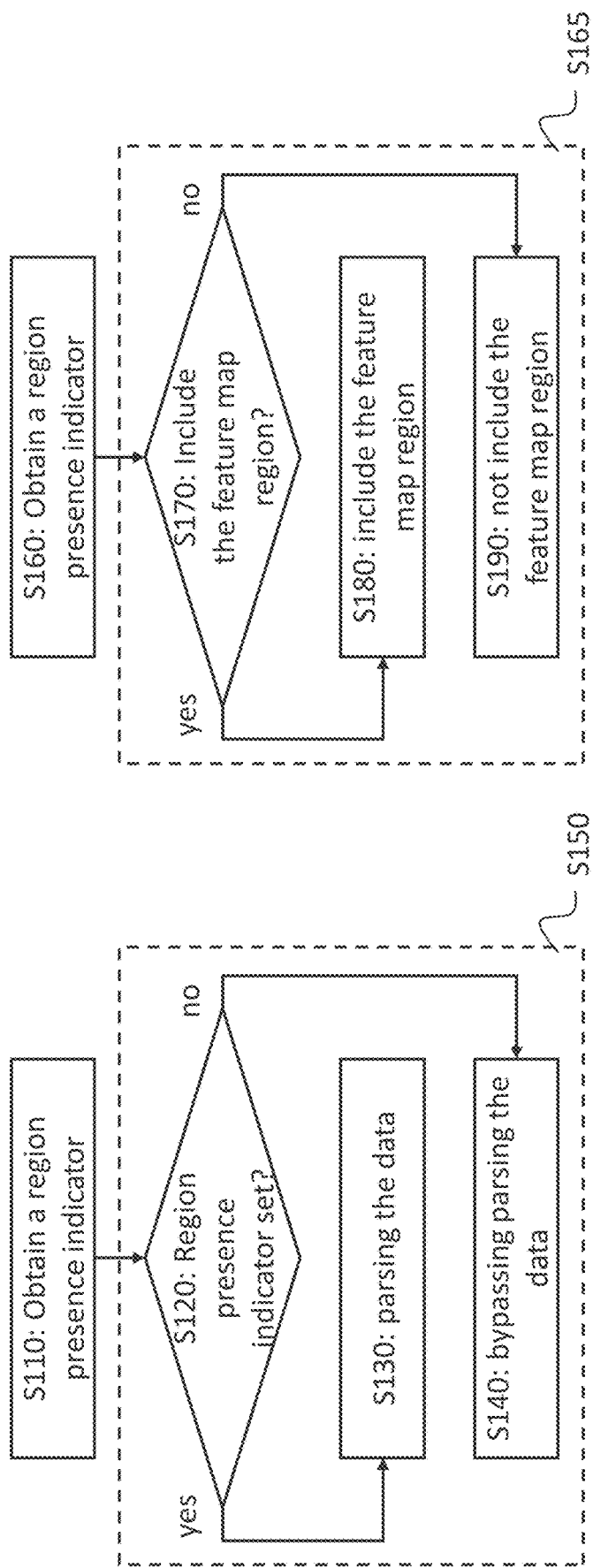
FIG. 8 is a flow chart illustrating an exemplary method for decoding feature map data for an image region.
FIG. 9 is a flow chart illustrating an exemplary method for encoding feature map data for an image region.

According to an embodiment, a method is provided for decoding a feature map for processing by a neural network based on a bitstream. The method is illustrated in FIG. 8. The method comprises a step S110 of obtaining, for a region of the feature map, a region presence indicator based on information from the bitstream. The obtaining step S110 is followed by a decoding step S150 of decoding the region. The decoding step S150 includes the step S130 of parsing data from the bitstream for decoding the region when the region presence indicator has a first value. Whether or not the region presence indicator has a first value can be determined in judging step S120. On the other hand, when (e.g. in step S120) the region presence indicator has a second value, the decoding S150 may include step S140 of bypassing parsing data from the bitstream for decoding the region.

The obtaining S110 of the region presence indicator may correspond to parsing the presence indicator from the bitstream. In other words, the bitstream may include the indicator. The obtaining may also include decoding of the presence indicator, e.g. by an entropy decoder. The region presence indicator may be a flag which can take one among the first value and the second value. It may be, for instance, coded by a single bit. However, the present disclosure is not limited thereto. In general, the obtaining step S110 may correspond to an indirect obtaining based on values of other parameters parsed from the bitstream.

The decoding S150 may refer to generalized processing of the bitstream, which may include one or more of the following: parsing information, entropy-decoding information, bypassing (skipping) parsing of information, deriving information used for further parsing based on one or more of already parsed elements of information, or the like.

According to an embodiment, a method is provided for encoding a feature map for processing by a neural network into a bitstream. The method is illustrated in FIG. 9 and may provide a bitstream portion, which can be readily decoded by the decoding method described with reference to FIG. 8. The method comprises a step S160 of obtaining a region presence indicator for region of the feature map. This the region of the feature map may be obtained from a feature map generated by one or more layers of a neural network.

The feature map may be stored in a memory or other storage. Moreover, the method includes a step S170 of deciding, based on the obtained region presence indicator, whether to indicate or not to indicate the region of the feature map in the bitstream. Accordingly, if it is decided in step S170 to indicate the region in the bitstream, then the bitstream shall include the region of the feature map. If it is decided in step S170 not to indicate the region in the bitstream, then the bitstream shall not include the region of the feature map. Steps S170-S190 may be considered as being a part of a general step S165 of generating a bitstream (also referred to as encoding).

In a possible implementation the region presence indicator is indicated in the bitstream. Accordingly, if it is decided in step S170 to indicate the region in the bitstream, then the bitstream shall include a region presence indicator having a first value and the region of the feature map. If it is decided in step S170 not to indicate the region in the bitstream, then the bitstream shall include the region presence indicator having a second value without the region of the feature map.

It is noted that the term "include the region presence indicator having a certain value" here practically refers to including the certain value into the bitstream, e.g. in a binarized and possibly entropy-coded form. The certain value is given meaning of the region presence indicator by way of convention, e.g. semantic defined by a standard.

Dealing with an Absent Feature Map Region

According to an exemplary implementation, when the region presence indicator has a second value, the decoding the region further includes setting of the region according to a predetermined rule. For example, the predetermined rule specifies the setting of the features of the region to a constant. However, it is noted that the present disclosure is not limited to the predetermined rule being a rule specifying that the features are to be set to a constant. Rather, the rule may define a way of determination/calculation of the features, for example based on previously decoded features or information from a bitstream.

Figure 10:
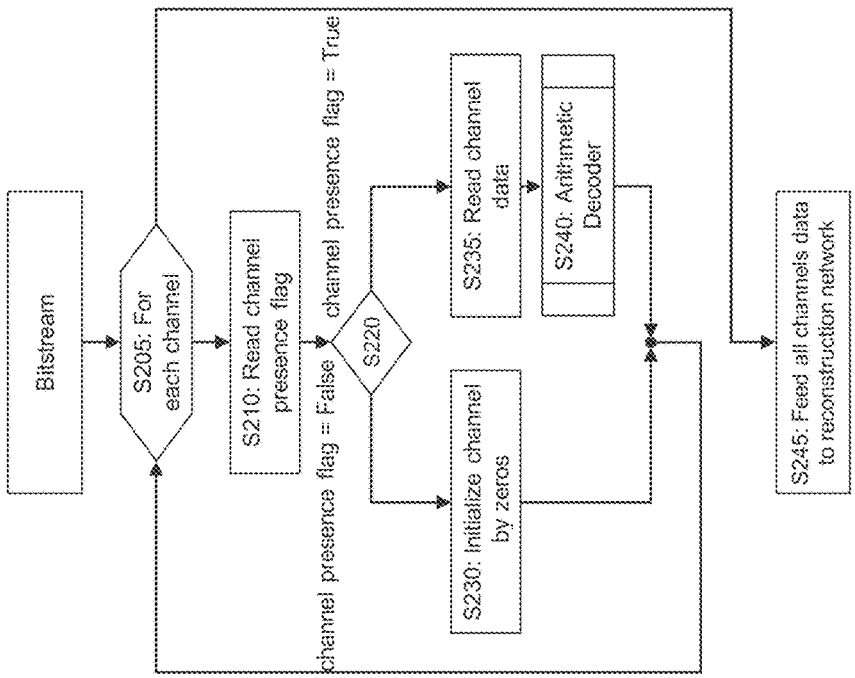
FIG. 10 is a flow chart illustrating an exemplary method for decoding feature map data for an image region including default value setting.

FIG. 10 illustrates a method for decoding the bitstream. In this example, the region of feature map corresponds to CNN channel. In particular, the image or video information decoding method comprises parsing a syntax element from the bitstream indicating whether a corresponding CNN channel information is present in the bitstream or not. The CNN channel information may comprise a feature map of corresponding channel or other information related to the specific channel. In the exemplary implementation shown in FIG. 10, a decoder iterates S205 over input channels of a generative model (or reconstruction network). In each iteration S205, a channel presence flag (corresponding to the region presence flag mentioned above) is read S210 from the bitstream. If the channel presence flag is equal to true, then the corresponding channel information is read S235 from the bitstream. The data may be further decoded S240 by an entropy decoder, such as an arithmetic decoder. Otherwise, if the channel presence flag is equal to false, the reading channel information is bypassed and the corresponding channel information is initialized S230 by a predefined rule, for instance by setting all the channel values to a constant. For example, the constant is zero. Steps S210-S240 are then repeated for each channel. Afterwards, in step S244, the reconstructed channels are input to the neural network (e.g. to the appropriate layer of the neural network, which may be one of the hidden layers or the output layer of the neural network. The neural network then processes the input channel information further.

In the table below an exemplary implementation of the bitstream syntax is provided:

| | Descriptor |
|---|---|
| paramters_parsing( ) {<br>...<br>  for( i = 0; i < channels_num; i++ ) {<br>    channel_presence_flag[ i ]<br>    for( y = 0; y < latent_space_height[ i ]; y++ )<br>    {<br>      for( x = 0; x < latent_space_width[ i ]; x++ )<br>      {<br>        if( channel_presence_flag[ i ] )<br>          y_cap[ i ][ y ][ x ] =<br>          decode_latent_value( i, x, y )<br>        else<br>          y_cap[ i ][ y ][ x ] = 0<br>      }<br>    }<br>  }<br>... | <br><br><br>ae(v) or<br>u(1)<br><br><br><br><br><br>ae(v)<br> |

Variable channels_num defines number of channels over which is iterated (cf. step S205 of FIG. 10). Variables latent_space_height and latent_space_width can be derived based on high-level syntax information about picture width and height and architecture of the generative model (e.g. the reconstruction network). Other implementations resulting to the same logic are possible. For example, the conditional check of channel_presence_flag can be performed outside the loop iterating latent space width and height. In that input channel values y_cap[i] can be initialized in a separate loop, other than channel data reading loop.

Alternatively, channel presence indicator may have opposite interpretation e.g. channel_skip_flag (or channel bypass flag), indicating that reading of corresponding channel information should be skipped. In other words, the channel (or in general region) indication may be a presence indication or an absence indication. Such indication may take one among two values, first value and second value. One of these values indicating presence and the other one of these values indicating absence of the channel (feature map) data. It is further noted that in FIG. 10, the channel indicator is signaled which indicates that an entire channel is present/absent. However, the present disclosure is not limited thereto, and the indicator may be signaled for a portion (region) of the feature map, or for a group of channels organized in groups in some predefined way.

One of technical advantages of this embodiment may be reducing of the signaling overhead by excluding transmitting of unnecessary or not important information or less important information for image or video reconstruction. Another technical benefit is speeding-up of entropy decoding process, which is known to be a bottleneck of image and video compression systems, by excluding processing of unnecessary or not important information by entropy decoding.

The decode_latent_value( ) sub-process (parsing process corresponding to the syntax portion) may comprise entropy decoding. The channel_presence_flag can be coded as unsigned integer one bin flag by using context-adaptive entropy coding (denoted as ae(v)) or without context-adaptive entropy coding (denoted as u(1)). Using of context-adaptive entropy coding allows to reduce signalling overhead introduced by channel_presence_flag and to further increase compression efficiency.

In the above syntax, if the channel_presence_flag indicates that the channel data is not signaled, then input channel values are set to a constant, which is here zero (y_cap[i][y][x]=0). However, the present disclosure is not limited to zero value of the constant. The constant may take a different value or may be even pre-set, e.g. by the encoder and then signaled in the bitstream. In other words, in some embodiments, the method further includes a step of decoding said constant from the bitstream.

Figure 11:
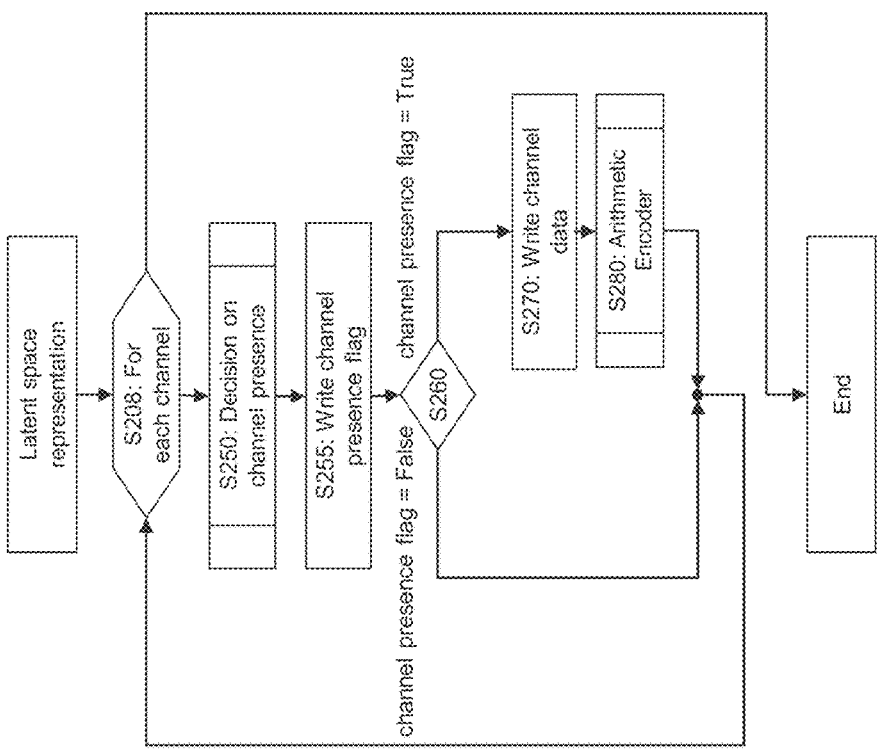
FIG. 11 is a flow chart illustrating an exemplary method for encoding feature map data for an image region.

Corresponding to the decoding method described with reference to FIG. 10, an encoding method may be provided as shown in FIG. 11. The encoding method may generate a bitstream obeying the syntax discussed above. Correspondingly, an image or video encoder may comprise unit to decide whether to transmit or bypass corresponding channel information to the receiving side. For each output channel of encoding model (which is supposed to be input channel of generative model) the encoder makes a decision about importance of the corresponding channel for the image or video reconstruction or a machine vision task.

Such encoding method of FIG. 11 includes loop over all channels. In each step S208, a channel is taken, and the decision about the presence of the channel is made in step S250. The encoder can make a decision based on some a-priori knowledge or metrics allowing evaluating channel importance.

For instance, the sum of absolute values of a feature map of the corresponding channel in latent representation can be used as a metric for taking decision on encoder side:

$$\text{ChannelPresenceFlag}_i = \Sigma_{x,y=0}^{w,h} \text{abs}(\hat{y}_i(x,y)) > \text{threshold},$$

where ChannelPresenceFlag$_i$ is the flag representing encoder's decision on presence of i-th CNN channel in the bitstream, w,h are the width and height of latent representation of the i-th channel $\hat{y}_i(x,y)$ correspondingly, and threshold is some predefined value, e.g. zero. In another implementation, the sum of absolute values can be normalized on amount of elements in the channel:

$$ChannelPresenceFlag_i = \frac{\sum_{x,y=0}^{w,h} \text{abs}(\hat{y}_i(x,y))}{w*h} > \text{threshold}.$$

In another possible implementation, a sum of squared values can be used instead of sum of absolute values. Another possible criterion can be variance of feature map of corresponding channel in latent representation defined as the sum of the squared distances of each feature map element in the channel from the mean value of feature map elements in the channel, divided by the number of feature map elements in the channel:

$$ChannelPresenceFlag_i =$$
$$\frac{\sum_{x,y=0}^{w,h}(\hat{y}_i(x,y)-\mu)*(\hat{y}_i(x,y)-\mu)}{w*h} > \text{threshold\_var},$$

where μ is mean value of feature map elements in the channel and threshold_var is threshold. The present disclosure is not limited to any particular decision algorithm or metric. Further alternative implementations are possible.

After the decision step S250, the determined channel presence flag is written S255 into the bitstream. Then, based on the value of the channel presence flag, it is decided in step S260 to write or not to write the channel data (region of feature map data) into the bitstream. In particular, if the channel presence flag is true, then in step 270, the channel data is written into the bitstream, which may further include encoding S280 of the channel data by an entropy encoder such as an arithmetic encoder. If, on the other hand, the channel presence flag is false, then in step 270, the channel data is not written into the bitstream, i.e. the writing is bypassed (or skipped).

Figure 12:
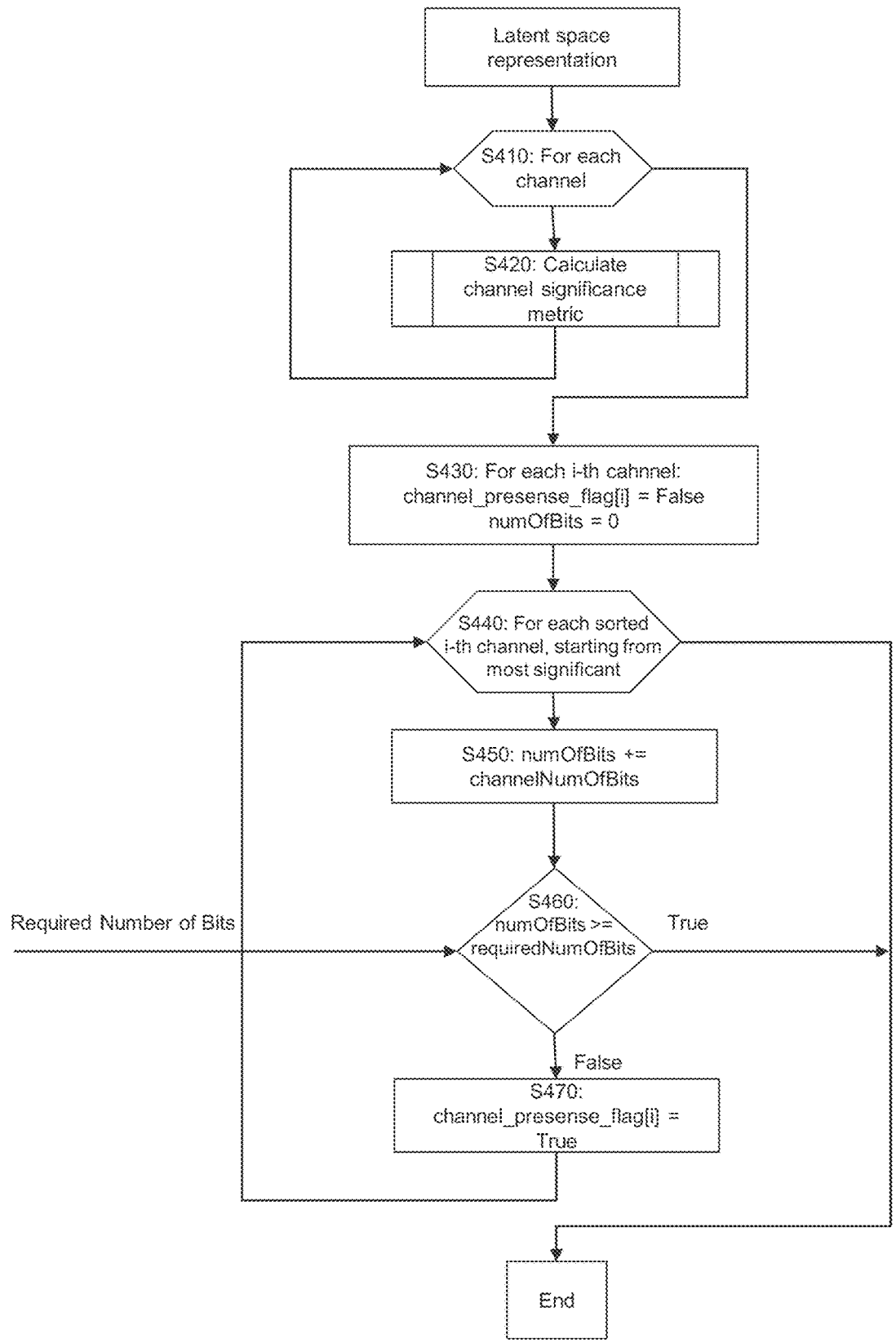
FIG. 12 is a flow diagram illustrating an exemplary method for encoding feature map data based on their significance and under a rate constraint.

FIG. 12 shows an exemplary implementation of an encoder side method for taking a decision about particular channel presence in bitstream based on relative importance of the channel for reconstructed picture quality. The steps of the encoding method are performed for each channel. In FIG. 12 the loop over the channels is illustrated by step S410 which sets the channel for which the following steps are performed.

As a first step S420, for each channel a significance metric is determined. The metric can be determined, for example, by calculating sum of absolute values of all feature map elements in the channel, or as variance of feature map elements in the channel. The value distribution of the feature map may be an indication for the impact the feature map has on the reconstructed data. Another possible metric to perform sorting can be estimation of amount of bits required to transmit the channel information (in other words amount of bits required to transmit feature map data of specific channel) which corresponds to the rate. Another possible metric to perform sorting can be contribution of particular channel into reconstructed picture quality evaluated e.g. in dB or other quality metric like multi-scale structural similarity index measure (MS-SSIM), or any other objective or perceptually weighted/designed metrics. The above mentioned and other metrics may be combined. There may be other performance criteria suitable e.g. for Machine Vision task like object detection accuracy, evaluated e.g. by comparison of all-channels reconstruction performance minus all-except particular channel reconstruction performance. In other words, some estimates of contribution of the channel data to the quality/accuracy of the machine vision task can be used as a sorting criteria.

In a next step, all channels are sorted or ranked according to the calculated significance metric, e.g. from most significant (index=0 or index=1 depending on start of counting index) to least significant.

In the following steps (S430-S470), having estimation of each channel's contribution into bitstream (amount of bits required to transmit channel feature map values) and desired target bitrate as an input parameter, the encoder makes a decision about putting particular channel information into the bitstream. In particular, in step S430, the number of bits numOfBits of the resulting bitstream portion is initialized to zero. Moreover, the channel presence flag is initialized to zero for each channel, indicating that the channel is not to be included into the bitstream. Then, a loop over channels starts in step S440. The loop scans over channels in the order from the most significant to the least significant. For each channel in the loop, in step S450, number of bits required to code the data of the channel channelNumOfBits is obtained, and the total number of bits numOfBits is incremented by the obtained number of bits required to code the data of the channel channelNumOfBits by: numOfBits+=channelNumOfBits (meaning numOfBits=numOfBits+channelNumOfBits).

In step S460 of the loop, the total number of bits numOfBits is compared to a required number of bits requiredNumOfBits. The requiredNumOfBits is a parameter, which may be set according to the desired rate. If the result of comparison numOfBits>=requiredNumOfBits is TRUE, it means that the total number of bits reached or exceeded the required number of bits, in which case the method ends. This means that for the current channel i, the channel presence flag remains zero as initialized in step S430, and the channel data is not included into the bitstream. If the result of comparison numOfBits>=requiredNumOfBits is FALSE in step S460, it means that the total number of bits has not reached the required number of bits when data of channel i were added to the bitstream. Thus, in step S470, the channel presence flag for the current channel i is set to one and the data of the channel is included into the bitstream.

In summary, the encoder calculates incremental sum of bits required for channels' transmission starting from most significant channel and sets channel_presence_flag[i] equal to TRUE. Once the total amount of bits reaches the required number of bits, the remaining least significant channels are decided to be not transmitted, and channel_presence_flag[i] is set equal to FALSE for these channels.

Alternatively, a desired reconstructed picture quality level (e.g. in dB or other metric like MS-SSIM) can be used as criterion to determine number of channels to transmit. Starting from most significant channel, encoder evaluates reconstructed quality by contribution of most significant channels, and once desired quality is achieved, the rest of the channels are decided not to be necessary and their corresponding channel_presence_flag[i] is set equal to FALSE. In other words, the iterations S440-S470 may be performed by accumulating a quality counter which increases with each channel i, and by stopping the iterations when the desired quality level is reached or exceeded by the addition of the current channel i. As is clear to those skilled in the art, bitrate and quality are only exemplary, and a combination of both may be used or further criteria, such as complexity may be added or used instead.

The method described with reference to FIG. 12 is only exemplary. Another alternative way to decide which channels to transmit is to use Rate-Distortion Optimization (RDO) procedure, which minimizes cost value calculated as:

Cost=Distortion+Lambda*Rate, or

Cost=Rate+Beta*Distortion, where Lambda and Beta are Lagrange multiplier of constrained optimization method. One of the technical benefits of described above solution is its ability to match to desired target bitrate of desired reconstructed quality, which is an important aspect of practical usage of compression system.

In the embodiments described with reference to FIGS. 10 and 11, the region of the feature map is the entire feature map. However, as will be shown later on, the present disclosure is not limited to such data granularity.

Side Information Signaling

As was described with reference to FIG. 3, the hyperprior proposed in Balle can be used to generate side information to be transmitted together with latent representation of input signal to obtain probability (or frequency) estimation values required for arithmetic decoder, which allows coding system to capture statistical properties specific to given input signal. As was further demonstrated by Zhou the probably estimation can be further improved by incorporating context based on already decoded symbols of latent representation. From FIG. 3 it can be seen that the side information z is based on output of convolution layer. In a general manner, the feature map may be itself considered to represent side information.

According to an embodiment of the present disclosure, a method is provided for decoding a feature map for processing by a neural network from a bitstream. The method is illustrated in FIG. 13 and comprises a step S310 of obtaining, from the bitstream, a side information indicator, which indicates whether side information is present in bitstream. The method further includes decoding S350 the feature map. The decoding S350 of the feature map further comprises a step S320, in which the value of the side information indicator is judged and acted upon. In particular, when the side information indicator has a fifth value, the method includes a step S330 of parsing, from the bitstream, the side information for decoding the feature map. Otherwise, when the side information indicator has a sixth value, the method further comprises bypassing S340 the parsing, from the bitstream, the side information for decoding the feature map. The fifth value indicates that the bitstream includes side information, whereas the sixth value indicates that the bitstream does not include side information for a certain portion (e.g. a region) of the feature map or for the entire feature map or the like.

Since hyperprior model may contain autoregressive context modelling based on already decoded symbols the transmission of side information may not be necessary, and hyperprior network can efficiently model distribution based on context only. At the same time, efficiency of context modelling strongly depend on statistic properties of input image or video content. Some content may be well predictable, but some may not. For the sake of flexibility it is beneficial to have an option of side information transmission and utilization which can be determined by encoder based on statistic properties of input content. This will further increase the possibility of the compression system to be adaptive to the input content properties.

Corresponding to decoder processes of FIGS. 13, an embodiment of the bitstream may comprise syntax element side_information_available, which controls the presence of the side information (z_cap) in bitstream. If side information is not available (e.g. decided by encoder as not required to obtain symbol probabilities for arithmetic coding) the decoder skips reading the side information values and initializes ẑ with some values, e.g. zeros before sending ẑ to generative part ($g_s$) of hyperprior. This allows to further optimize the signaling. An exemplary bitstream is shown below.

| | Descriptor |
|---|---|
| paramters_parsing( ) {<br>  ...<br>  side_information_available<br>  if( side_information_available)<br>    for( i = 0; i < channels_num; i++ ) {<br>      for( y = 0; y < latent_space_height[ i ]; y++ )<br>      {<br>        for( x = 0; x < latent_space_width[ i ]; x++ )<br>        {<br>          z_cap[ i ][ y ][ x ] =<br>          decode_latent_value( i, x, y )<br>        }<br>      }<br>    }<br>  else<br>    for( y = 0; y < latent_space_height[ i ]; y++ ) {<br>      for( x = 0; x < latent_space_width[ i ]; x++ ){<br>        z_cap[ i ][ y ][ x ] = 0<br>      }<br>    } | ae(v) or<br>u(1)<br><br><br><br><br><br>ae(v) |

Correspondingly to the decoding method, according to an embodiment, a method is provided for encoding a feature map for processing by a neural network into a bitstream. The method is illustrated in FIG. 14 and may comprise a step S360 of obtaining the feature map (or at least a region of the feature map). The method further includes a step of encoding S365 which may comprise the step S370 to decide whether to indicate side information concerning the feature map in the bitstream. If the decision is positive, then the method may further include inserting S380 into the bitstream a side information indicator indicating a third value (e.g. corresponding to the fifth value mentioned above, so that the encoder an decoder may understand each other or be a part of the same system) and the side information. If the decision is positive, then the method may further include inserting S390 into the bitstream the side information indicator indicating a fourth value (e.g. corresponding to the sixth value mentioned above, so that the encoder and decoder may understand each other or be a part of the same system) without the side information. The side information may correspond to a region of the feature map, or to the entire feature map.

It is noted that the side information may correspond to the side information as described with reference to the autoencoder of FIG. 3. For example, the decoding method may further comprise an entropy decoding, wherein the entropy decoding is based on a decoded feature map processed by the neural network. Correspondingly, the encoding method may further comprise entropy encoding based on the encoded feature map processed by the neural network. In particular, the feature map may correspond to the feature map from hyperprior $h_a/h_s$ as shown in FIG. 3. The side information based on the feature map may correspond to the distribution of standard deviations summarized in z. z may be quantized, further compressed (e.g. entropy-coded), and transmitted as the side information. The encoder (as well as the decoder) uses the quantized vector $\hat{z}$ to estimate $\hat{\sigma}$, the spatial distribution of the standard deviations which is actually used for obtaining the probability values (or frequency values, number of occurrences) for the arithmetic coding (or another kind of entropy coding, in general), and uses it to encode the quantized image representation $\hat{y}$ (or latent representation). The decoder first recovers $\hat{z}$ from the compressed signal and decodes the latent representation correspondingly. As was described above, the distribution modelling network can be further enhanced by context modelling based on already decoded symbols of latent representation. In some cases, transmitting of z may not be required and the input of the generative part of hyperprior network ($h_s$) can be initialized by the value(s) according to the rule, e.g. by constant.

It is noted that the encoder and decoder of FIG. 3 are only examples. In general, the side information may carry another information (different from $\hat{z}$). For example, the probability model for the entropy coding may be signaled directly, or derived from other parameters signaled in the side information. The entropy coding does not need to be arithmetic coding, it may be another kind of entropy or variable length coding, which may be, e.g. context adaptive and controlled by side information.

In an exemplary implementation, when the side information indicator has the sixth value, the decoding method includes setting of the side information to a predetermined side information value. For example, the predetermined side information value is zero. The decoding method may further comprise a step of decoding said predetermined side information value from the bitstream.

Correspondingly, in the encoding method in an exemplary implementation, when the side information indicator has the fourth value, the encoding method may apply for encoding parameter(s) derived based on a predetermined side information value such as zero. The encoding method may further comprise a step of encoding said predetermined side information value to the bitstream. In other words, the bitstream may carry the predetermined side information, for example once for a plurality of regions of feature maps or for the entire feature map or a plurality of feature maps. In other words, the predetermined value (which may be a constant) can be signaled less frequently than the side information indicator. However, this is not necessarily the case, and in some embodiments, the predetermined value may be signaled individually per channel (part of feature map data) or per channel region or the like.

The present disclosure is not limited to signaling the predetermined value, which may be specified by a standard instead, or derived from some other parameter(s) included in the bitstream. Moreover, instead of signaling the predetermined value, an information may be signaled which indicates a rule according to which the predetermined information is to be determined.

The described method is thus also applicable to optimize transmission of latent representation $\hat{z}$ of side information. As was mentioned above, the side information $\hat{z}$ (FIG. 3) is based on output of convolution layer comprising several output channels. In a general manner, the feature map may be itself considered to represent side information. Therefore, the method described above and illustrated by FIG. 10 is also applicable for optimization the signaling of side information and can be combined with side information presence indicator. Below is exemplary syntax table illustrating how these two methods can be combined.

| | Descriptor |
|---|---|
| paramters_parsing( ) { | |
| ... | |
|   side_information_available | ae(v) or u(1) |
|   if( side_information_available) | |
|     for( i = 0; i < side_infromation_channels_num; i+ + ) { | |
|       side_infromation_channel_presence_flag[ i ] | ae(v) or u(1) |
|       for( y = 0; y < side_infromation_channel_height[ i ]; y+ + ) | |
|       { | |
|         for( x = 0; x side_infromation_channel_width[ i ]; x+ + ) | |
|         { | |
|           if( side_infromation_channel_presence_flag[ i ] ) | |
|             z_cap[ i ][ y ][ x ] = decode_latent_value( i, x, y ) | ae(v) |
|           else | |
|             z_cap[ i ][ y ][ x ] = 0 | |
|         } | |
|       } | |
|     } | |
|   else | |
|     for( y = 0; y < side_infromation_channel_height[ i ]; y+ + ) { | |
|       for( x = 0; x < side_infromation_channel_width[ i ]; x+ + ){ | |
|         z_cap[ i ][ y ][ x ] = 0 | |
|       } | |
|     } | |

The method for parsing the bitstream may comprise obtaining from the bitstream a side information presence indicator (side_information_available). The method may further include parsing the side information (z_cap) from the bitstream when the side information presence indicator has a third value (e.g. side_information_available is TRUE), and bypassing parsing the side information from the bitstream completely when the side information presence indicator has a fourth value (e.g. side_information_available is FALSE). Moreover, side information indicated in the bitstream may include at least one of the region presence indicator (e.g. side_information_channel_presence_flag shown in the syntax above and described with reference to FIGS. 8 to 11), and information (z_cap) for being processed by a neural network to obtain an estimated probability model for use in an entropy decoding of the region. Depending on the value of the region presence indicator (side_information_channel_presence_flag), the feature map data (z_cap) may be included in the bitstream.

In other words, in this example, a method similar to what was described for latent space y_cap is applied to side information z_cap, which may be also a feature map containing channels. z_cap is decoded by decode_latent_value. It may utilize same process for decoding as y_cap, but not necessarily.

The corresponding encoding method and decoding method may include steps as described with reference to FIGS. 8 to 14, in combination.

Furthermore, the encoder may decide which constant value should be used to initialize values in latent representation of hyperprior. In that case the value (side_information_init_value) is transmitted in the bitstream as exemplified in the following syntax.

| | Descriptor |
|---|---|
| paramters_parsing( ) { | |
| ... | |
|   side_information_available | ae(v) or u(1) |
|   if( side_information_available) | |
|     for( i = 0; i < side_infromation_channels_num; i++ ) { | |
|       side_infromation_channel_presence_flag[ i ] | ae(v) or u(1) |
|       for( y = 0; y < side_infromation_channel_height[ i ]; y++ ) | |
|       { | |
|         for( x = 0; x < side_infromation_channel_width[ i ]; x++ ) | |
|         { | |
|           if( side_infromation_channel_presence_flag[ i ] ) | |
|             z_cap[ i ][ y ][ x ] = decode_latent_value( i, x, y ) | ae(v) |
|           else | |
|             z_cap[ i ][ y ][ x ] = 0 | |
|         } | |
|       } | |
|     } | |
|   else { | |
|     side_information_init_value | ae(v) |
|     for( y = 0; y < side_infromation_channel_height[ I ]; y++) { | |
|       for( x = 0; x < side_infromation_channel_width[ I ]; x++ ){ | |
|         z_cap[ I ][ y ][ x ] = side_information_init_value | |
|       } | |
|     } | |
|   } | |
| } | |

In other words, in some embodiments, the side information presence indicator has the fourth value, the method includes setting of the side information to a predetermined side information value at the decoder (may be performed also at the encoder, if the side information is used in the encoding). In the above exemplified syntax, the feature map values (z_cap) are set to zero (or to another value predetermined or transmitted in the bitstream as side_information_init_value syntax element, in that case, it should be parsed in advance prior assignment), in case the side_information_channel_presence_flag is FALSE. However, the constant zero is only exemplary. As already discussed in the above embodiments, the feature map data may be set to a predetermined feature map data which may be predefined by a standard, signaled in the bitstream (e.g. as side_information_init_value syntax element from example above, it that case, should be parsed in advance prior assignment), or derived according to a pre-defined or signaled rule.

In some embodiments, the region presence indicator is a flag capable of taking one of only two values formed by the first value and the second value. In some embodiments, the side information presence indicator is a flag capable of taking one of only two values formed by the third value and the fourth value. In some embodiments, the side information presence indicator is a flag capable of taking one of only two values formed by the fifth value and the sixth value. These embodiments may enable an efficient signaling using only one bit.

Skip transferring of some less important of deep features or feature maps may provide for an improved efficiency in terms of rate and complexity of encoding and decoding. The skipping may be channel-wise or per region of a channel or the like. The present disclosure is not limited to any particular granularity of skipping.

It should be further understood that the above-described methods are applicable to any feature map to be transmitted and obtained from the bitstream, which are supposed to be input to a generative model (or a reconstruction network). The generative model can be used e.g. for image reconstruction, motion information reconstruction, residual information reconstruction, obtaining probability values (or frequency values) for arithmetic coding (e.g. by hyperprior as described above), object detection and recognition or for further applications.

Sorting Order

Another embodiment of this disclosure is ordering of the channels according to their relative importance. In some exemplary implementations, carrying information about the order in the bitstream is possible, simplifies the signalling, and enables bitrate scalability feature. In other words, in this embodiment, the channels importance sorting is applied and the sorting order is known at both encoder and decoder sides, either by being transmitted in the bitstream or by referring to predetermined information.

In particular, a method for decoding feature map data (channel data) may comprise a step of obtaining a significance order, which indicates significance of a plurality of channels (part of feature map data) of a particular layer. The term channel significance here refers to a measure of importance of a channel for a quality of the task performed by the neural network. For example, if the task is video coding, then the significance may be a measure (metric) to measure reconstructed quality and/or resulting rate of the encoded video. It the task is machine vision such as object recognition, the significance may measure contribution of the channel to the recognition accuracy or the like. The obtaining of the significance order may be performed by any means in general. For instance, the significance order may be signaled explicitly in the bitstream or pre-defined in a standard or other convention, or derived implicitly, e.g. based on other signaled parameters.

The method may further include obtaining a last significant channel indicator and obtaining the region presence indicator based on the last significant channel indicator. The last significant channel indicator indicates the last significant channel among the channels of a particular layer or network part or network. The term "last" is to be understood in the context of the significance order. According to some embodiments, such last significant channel indication can also be interpreted as a least significant channel indicator. The last significant channel is the channel among the channels ordered according to their significance, after which the channels with lower significance follow, which are considered as not important for the neural network task. For example, if channels 1 to M are ordered in a descending order according to their significance (from most significant to least significant), then channel k is a last significant channel if channels k+1 to M are not considered as important (significant) for the neural network task. Such channels k+1 to M then, e.g., do not need to be included into the bitstream. The last significant channel indicator in this case may be used to indicate the absence of these channels k+1 to M from the bitstream so that their encoding/decoding may be bypassed. Data related to channels 1 to k is then conveyed in the bitstream so that their encoding/decoding is performed.

Figure 15:
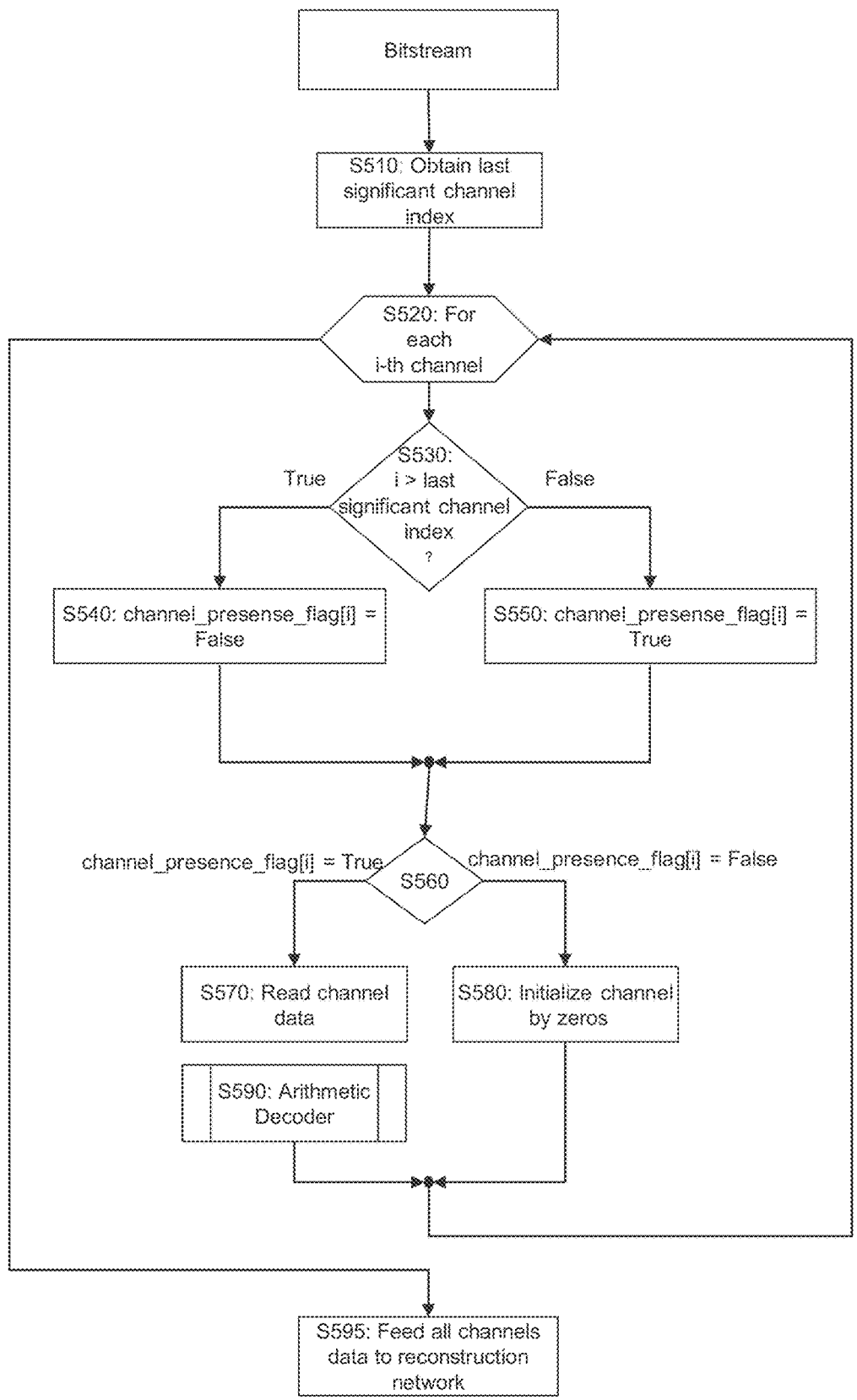
FIG. 15 is a flow chart illustrating an exemplary method for decoding of feature data based on a bitstream including a last significant channel indicator.

In one exemplary implementation, the sorting order is predefined during the design stage and known at the decoder side (as well as the encoder side) without necessity to be transmitted. The index of last significant coefficient is inserted into the bitstream at the encoder. FIG. 15 illustrates an example of a method at the decoder. The index of the last significant coefficient is obtained in step S510 from the bitstream at the decoder. The last significant channel index can be signaled in the bitstream in a direct form, i.e. a syntax element last_significant_channel_idx can be included in the bitstream (possibly entropy-coded). Alternative approaches and indirect signaling will be discussed below.

In step S520, a loop over all channels of a neural network layer or a plurality of layers is performed. A current channel is channel in a current iteration i, i.e. an i-th channel. Then, for each i-th channel decoder determines channel_presence_flag[i] by comparing S530 the index i with the last significant channel index. If i is above last significant index, the channel_presence_flag[i] is set equal to FALSE in step S540. Otherwise the channel_presence_flag[i] is set equal to TRUE in step S550. It is noted that in this embodiment, relating to indication of the last significant channel, the channel presence flag is not a flag that is actually included in the bitstream. Rather, the channel presence flag in this case is merely an internal variable which is derived from the signaled last significant channel index as shown above in steps S520-S550.

A corresponding exemplary syntax table illustrating both the bitstream generating and parsing process is presented below:

| | Descriptor |
|---|---|
| paramters_parsing( ) { | |
| ... | |
|    last_significant_channel_idx | ae(v) |
|    for( i = 0; i < channels_num; i++ ) { | |
|      if( i > last_significant_channel_idx ) | |

-continued

| | Descriptor |
|---|---|
|        channel_presence_flag[ i ] = False | |
|      else | |
|        channel_presence_flag[ i ] = True | |
|      for( y = 0; y < latent_space_height[ i ]; y++ ) { | |
|        for( x = 0; x < latent_space_width[ i ]; x++ ) { | |
|          if( channel_presence_flag[ i ] ) | |
|            y_cap[ i ][ y ][ x ] = | ae(v) |
|            decode_latent_value( i, x, y ) | |
|          else | |
|            y_cap[ i ][ y ][ x ] = 0 | |
|        } | |
|      } | |
|    } | |
|   } | |
| ... | |

Then during channel information (data) parsing stage, in step S560, the decoder uses the derived channel_presence_flag[i] to decide whether to parse channel information from the bitstream (if channel_presence_flag[i]=TRUE) in step S570 or whether to skip (bypass) the parsing (if channel_presence_flag[i]=False) in step S580 instead. As mentioned in preceding embodiments, the bypassing may include initializing in step S580 the channel information with a predefined value, such as zeros. The flowchart of FIG. 15 showing the derivation of the channel presence flag is for explanatory purposes and represents only an example. In general, step S530 may directly decide whether to proceed with step S570 or step S580 without the intermediate derivation of the channel presence flag. In other words, the channel presence flag is only implicitly derived, and depending on implementation may be stored if it is beneficial for further usage by other parts of parsing or semantic interpretation process. This is applies also for the above-mentioned syntax.

In this example, the decoding is performed by decoding from the bitstream, channels sorted within the bitstream according to the significance order from most significant until the last significant channel. The channel information (data) may be entropy coded, in which case the method described above may include step S590 of entropy decoding the channel data. After collecting all channels, in step S595, the channels are fed to the corresponding layer of the neural network.

However, the present disclosure is not limited to the case in which the significance order is derived or known at both encoder and decoder side. According to an exemplary implementation, the obtaining of the significance order comprises decoding of an indication of the significance order from the bitstream.

In particular, in an exemplary implementation, the decoder obtains the significance order from the bitstream by parsing corresponding syntax elements. The significance order allows to establish correspondence between each significance index and the channel design index. Here, under channel design index the index according to which the channels are indexed in the model design is understood. For example, the channel design order may be order in which the channels of one layer are numbered according to a predefined convention independent of the content of the channels during the neural network processing.

Figure 18:
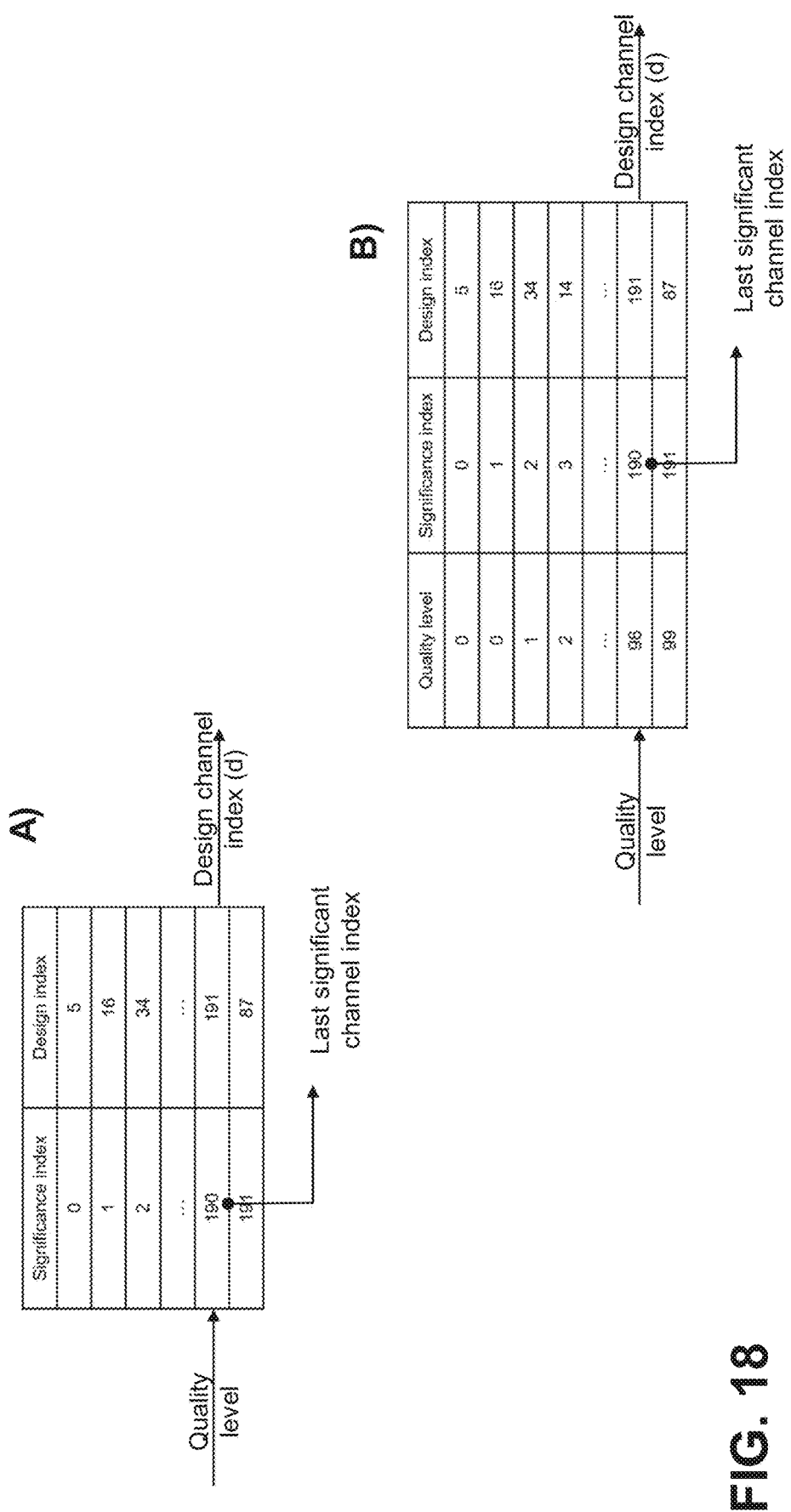
FIG. 18 is a schematic drawing illustrating an explicit relation between the order of significance and the design order of the channels as well as a quality parameter.

The example of significance order information including significance index and corresponding design index is given in FIG. 18, part A). As can be seen in the figure, design index with values 0 to 191 denotes channels, for example channels of a specific layer in the neural network. The assignment of the index to the channels is referred to as the significance order in the specific case that the indexing is performed according to predetermined significance as described above. In FIG. 18, part A), the least significant channel index is 190, meaning that data of 191 channels 0 to 190 are signaled in the bitstream, while the data of the 192-th channel with index 191 are not signaled.

Figure 17:
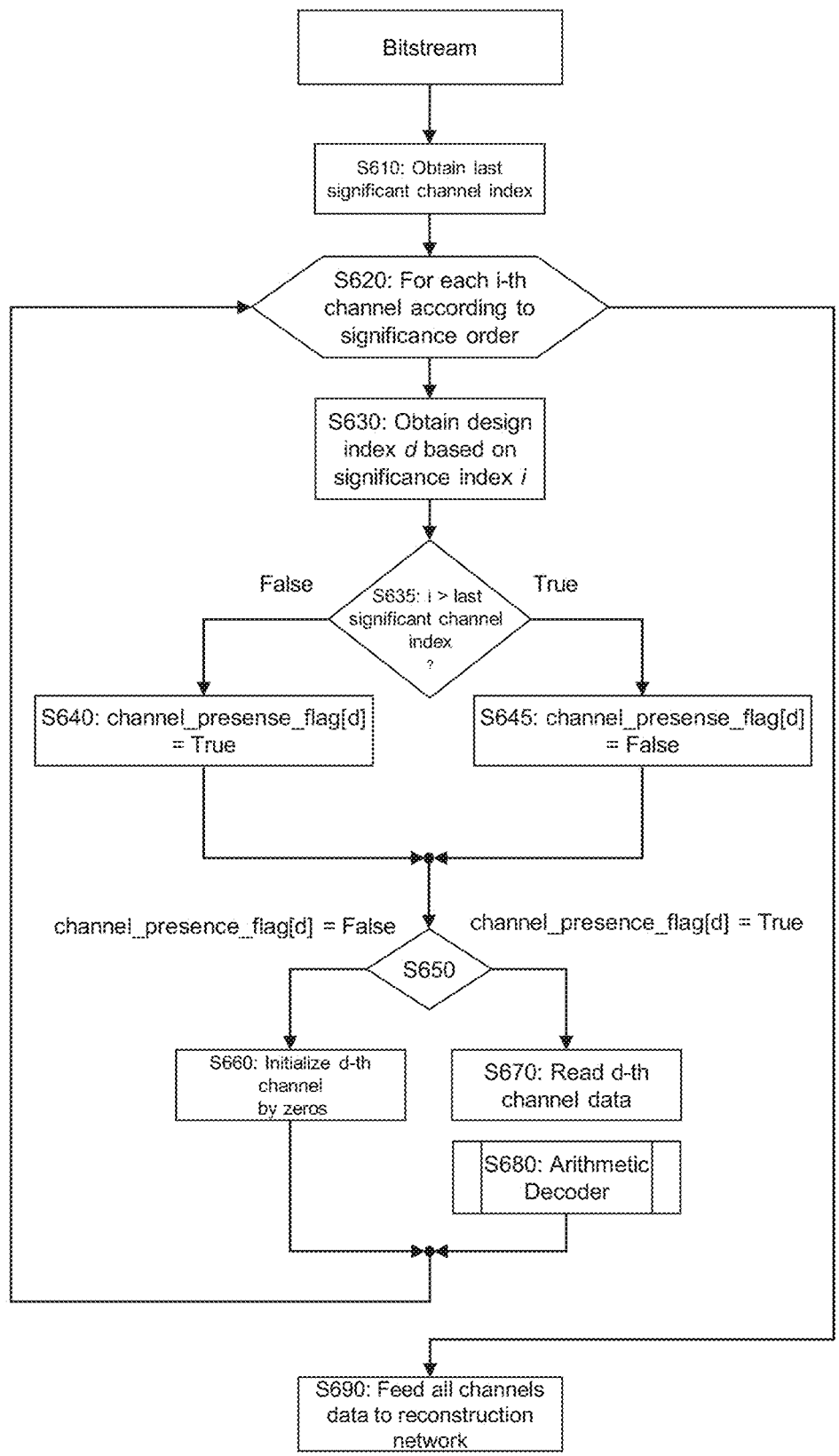
FIG. 17 is a flow chart illustrating an exemplary method for decoding of feature data based on a bitstream including a last significant channel indicator and the significance order.

Similarly, FIG. 17 illustrates a method in which, in step S610, the last significant channel indicator is obtained from the bitstream. Then, step S620 represents loop over the channels. For each i-th channel, in accordance to significance order obtained from the bitstream, the decoder determines S630 the design index d and determines the corresponding channel_presence_flag[d] by comparing S635 the index i with the last significant channel index. If i is above last significant index, the channel_presence_flag[d] is set equal to FALSE in step S645. Otherwise, the channel_presence_flag[d] is set equal to TRUE in step S640. Then, during channel information parsing stage, the decoder uses channel_presence_flag[d] to define (e.g. in the decision step S650) whether to parse channel information from bitstream (if channel_presence_flag[d]=TRUE) in step S670 or initialize the channel information with a predefined value, e.g. zeros (if channel_presence_flag[d]=FALSE) in step S660. Moreover, in step S680, the channel information may be further decoded by an entropy decoder such as arithmetic decoder or the like. Finally, in step S690, the decoded channel information of all channels is provided to the corresponding neural network layer.

An exemplary syntax table illustrating the bitstream generating and parsing process for the embodiment in which the significance order is signaled in the bitstream is presented below:

| | Descriptor |
|---|---|
| paramters_parsing( ) { | |
| ... | |
|    obtain_significance_order( significance_order ) | |
|    last_significant_channel_idx | ae(v) |
|    for( i = 0; i < channels_num; i++ ) { | |
|      d = significance_order[i] | |
|      if( i > last_significant_channel_idx ) | |
|        channel_presence_flag[ d ] = False | |
|      else | |
|        channel_presence_flag[ d ] = True | |
|      for( y = 0; y < latent_space_height[ d ]; y++ ) { | |
|        for( x = 0; x < latent_space_width[ d ]; x++ ) { | |
|          if( channel_presence_flag[ d ] ) | |
|            y_cap[ d ][ y ][ x ] = | ae(v) |
|            decode_latent_value( d, x, y ) | |
|          else | |
|            y_cap[ d ][ y ][ x ] = 0 | |
|        } | |
|      } | |
|    } | |
| } | |
| ... | |

The exemplary syntax of the significance order obtaining element is as follows:

| | Descriptor |
|---|---|
| obtain_significance_order ( significance_order ) { | |
|   for( i = 0; i < channels_num; i++ ) { | |
|     design_channel_idx | ae(v) |
|     significance_order[ i ] = design_channel_idx | |
|   } | |
| } | |

As can be seen from the syntax of the obtain_significance_order( ), the significance order is obtained by iterating over a channel index i and assigning to each channel i the design channel index design_channel_idx, which has the i-th highest significance. The syntax may be seen also as a list of design channel indexes which are ordered according to the significance of the corresponding respective channels. However, it is noted that this syntax is only exemplary and not limiting the ways in which the significance order may be conveyed between the encoder and the decoder.

One of the technical benefits of this approach (signaling the last significant channel indicator) is content adaptivity. Indeed, different channels of CNN can represent different features of natural images or videos. For the sake of generality, during design and training stage, the CNN can be targeted to cover broader variability of possible input signals. In some embodiments, the encoder has a flexibility to identify and optimize the amount of information for signaling, e.g. by using one of the methods as described above. It should be noted that the significance order information (indicator) can be transmitted with different level of granularity, e.g. once per picture, once per part of picture, once per sequence or group of pictures. The granularity may be pre-set or pre-defined by a standard. Alternatively, the encoder may have a flexibility to decide when and how often to signal significance order information based on content properties. For instance, once a new scene is detected in the sequence, it may be beneficial to send or update significance order information due to changed statistic properties.

In some embodiments, at the decoder the obtaining of the significance order comprises deriving the significance order based on previously decoded information regarding the source data from which the feature map has been generated. In particular, the decoder may determine the significance order using supplementary information about type of the encoded content transmitted in the bitstream. For example, the supplementary information may distinguish between professionally generated content, user generated content, camera-captured or computer-generated content, video game or the like. Alternatively or in addition, the supplementary information may distinguish different chroma sampling rate types, such as YUV420, YUV422 or YUV444. Further source describing information may be used in addition or alternatively.

According to an exemplary implementation, the obtaining of the significance order comprises deriving the significance order based on previously decoded information regarding the type of source data from which the feature map has been generated.

In any of the above-mentioned embodiments and implementations, the encoded bitstream may be organized in a way providing some bitrate scalability support. This may be achieved, e.g. in that the CNN channel information is placed in the bitstream according to channel's relative importance, most important channel goes first, least important goes last. The relative channel importance defining the channel order in the bitstream can be defined during design stage, as described above, and may be known to both encoder and decoder so that it does not require to be transmitted in the bitstream. Alternatively, the significance order information can be defined or adjusted during the encoding process and may be included into the bitstream. The latter option provides somewhat more flexibility and adaption to specific features of the content, which may enable a better compression efficiency.

According to an exemplary implementation, the indication of a last significant channel corresponds to a quality indicator decoded from the bitstream and indicating quality of the coded feature map resulting from compression of the region of the feature map. The last significant channel index can be signaled in an indirect form, e.g. by using a quality indicator transmitted in the bitstream and a look-up table, which defines a correspondence between the quality levels and channels used to reconstruct a picture with the desired quality level. For example, FIG. 16, parts A and B) shows such look-up table, in which each quality level is associated with a design index of the corresponding last significant channel. In other words, for an input (desired) quality level, the look-up table provides last significant channel index. Accordingly, the last significant channel indication does not need to be signaled in the bitstream, in case the quality level of the bitstream is signaled or derivable at the decoder side.

It should be noted that amount of quality gradations may not correspond to the amount of channels in the model. For instance in the given example in (FIG. 16, part B)), the amount of quality levels is 100 (from 0 to 99) and amount of channels is 192 (from 0 to 191). E.g. in the given example for quality level 0 the last significant channel index is 1, for quality level 98 the last significant channel index is 190.

FIG. 18 illustrates further examples of the look-up table. As mentioned above, e.g. with reference to FIG. 17, the last significant channel index can be signaled in the bitstream in a direct form, or indirect form e.g. by using quality indicator transmitted in bitstream and the look-up table, which defines a correspondence between the quality level and channels used to reconstruct a picture with desired quality level. Also in FIG. 18, the amount of quality levels is 100 (from 0 to 99) and amount of channels is 192 (from 0 to 191). In that case the last significant channel is defined as last channel in the significance order corresponded to a specified (desired) quality level. E.g. in given example for quality level 0 the last significant channel index is 1, for quality level 98 the last significant channel index is 190. In FIG. 18, part B), the relation between the quality level, the significance index and the design index is shown. As can be seen, the significance index may differ substantially from the design index.

In general, the indication of a last significant channel corresponds to index of the last significant channel within the significance order. In other words, M channels are ordered and indexed in the significance order from 1 to M.

Figure 16:
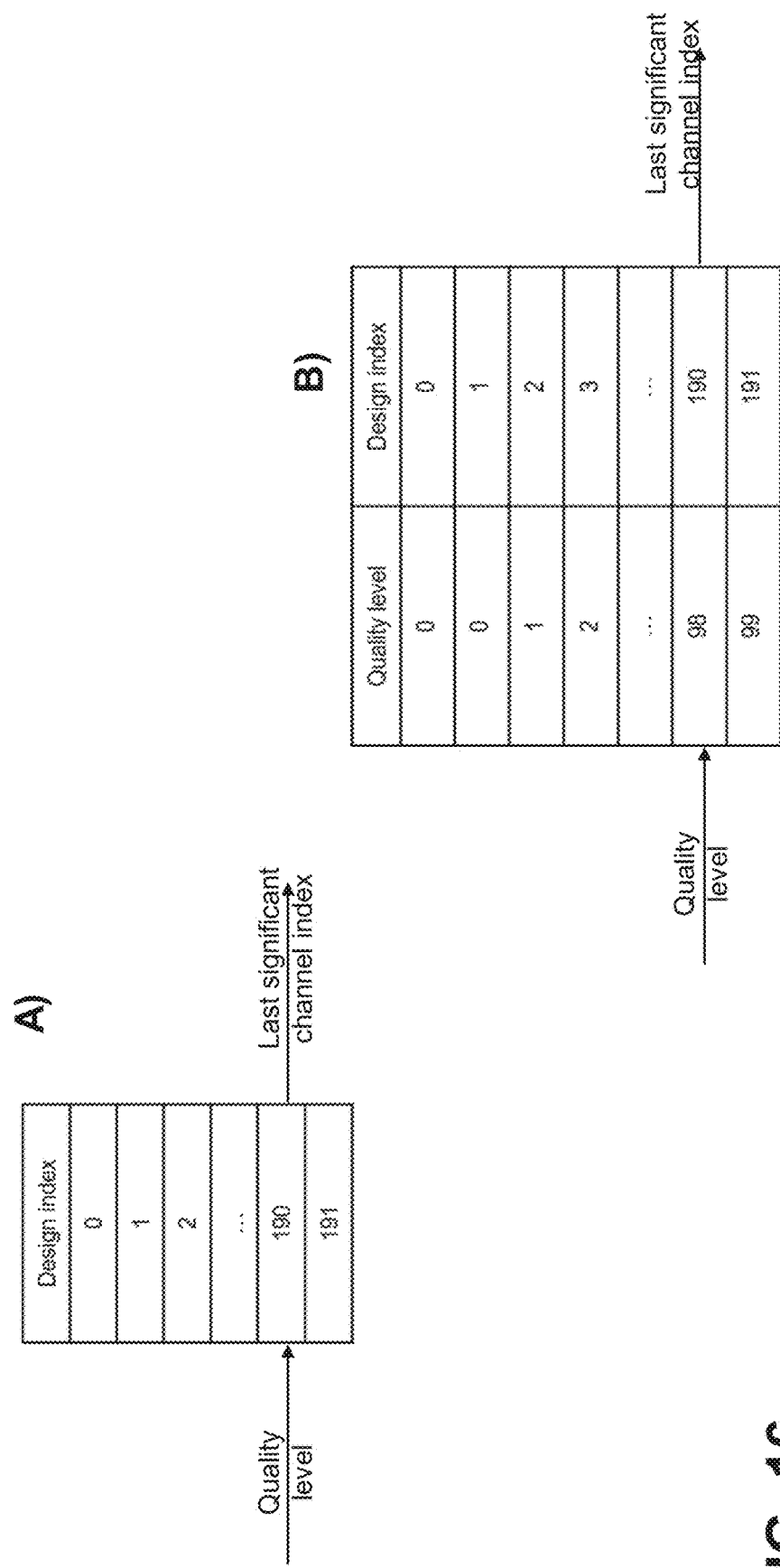
FIG. 16 is a schematic drawing illustrating implicit relation between the quality level and the design order of the channels as well as a quality parameter.

For example, in applications including image or video coding, there may be quality settings selected at the encoder (e.g. by a user or an application or the like). Such quality setting (indicator) may then be associated with a particular value of the last significant channel as shown in FIGS. 16 and 18. For example, the higher the desired image/video quality after reconstruction, the more channels would be signaled, i.e. the higher would be the last significant channel index (among indices of all channels ordered according to their significance in descending order). It is noted that these are only examples and the channel ordering may be performed in ascending order or the ascending/descending ordering may even be selectable and signaled.

Figure 19:
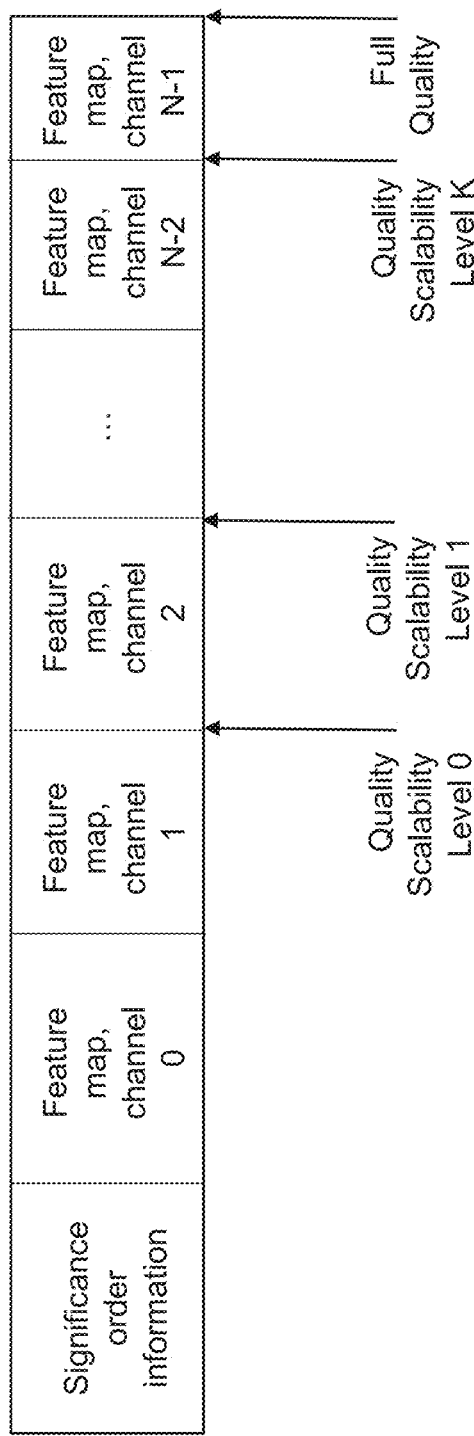
FIG. 19 is a schematic drawing illustrating a bitstream structure comprising channel information stored in order of its importance, as well as quality scalability levels.

Depending of desired level of granularity defined e.g. by application requirements, the scalability levels can be defined at each CNN channels or by grouping several channels into one scalability level as depicted on FIG. 19. This provides additional flexibility to better fit the application-specific tasks allowing to reduce the bitrate without re-encoding by dropping least important feature map channels corresponded to scalability levels.

Another criteria for ordering of the channels could be channel's similarity. This similarity can for example be estimated as amount of bits required to code the channel's information. Similar amount of bits required to represent the channel information can be considered as the similar level of channel's informativity. The amount of information can be used as a criteria for sorting the channels (from largest to smallest amount of bits or from smallest to largest) to put similar channels successively in the bitstream. This brings additional compression efficiency benefit in case of using context adaptive arithmetic coding (CABAC) due to stabilizing the probability model, which is updated along with symbol decoding. That provides more accurate probability estimation by the model, which increases compression efficiency.

Presence of a Part of the Feature Map

The signaling of the region presence indicator and/or the side information presence indicator may be performed for a region of a feature map. In some embodiments, the region is a channel of the feature map. Feature maps generated by convolutional layers may preserve (at least partially) the spatial relationship between feature map values similarly to the spatial relationship of input picture samples. Thus, the feature map channel may have regions of different importance for reconstruction quality, e.g. flat and non-flat regions containing object edges. Splitting feature map data into units allows to capture this structure of regions and utilize it for the benefit of compression efficiency, e.g. by skipping transmission of flat regions' feature values.

According to an exemplary implementation, the channel information comprising channel feature map has one or more indicators indicating whether a particular spatial region of the channel is present in the bitstream. In other words, the CNN region is an arbitrary region of a CNN channel, and bitstream further comprises information for arbitrary region definition. To specify regions, known methods for partitioning of a two-dimensional space can be used. For instance, a quadtree partition or other hierarchical tree partition methods may be applied. Quadtree partitioning is a partitioning method that allows to partition a two-dimensional space by recursively subdividing it into four quadrants or regions.

For example, the decoding method (such as the method according to any of the above-mentioned embodiments and exemplary implementations) may further comprise a step of decoding, from the bitstream, a region splitting information indicating splitting of the region of a feature map into units, and, depending on the splitting information, decoding (parsing from the bitstream) or not decoding (bypassing the parsing) unit presence indication indicating whether feature map data is to be parsed from the bitstream of not for decoding a unit of the region.

Correspondingly, the encoding method judges whether a region of a feature map should be further split into units. If affirmative, a splitting information indicating splitting of the region of a feature map into units is inserted into the bitstream. Otherwise, the splitting information indicating not-splitting of the region of a feature map into units is inserted into the bitstream. It is noted that the splitting information may be a flag which may be further entropy encoded. However, the present disclosure is not limited thereto and the splitting information may also jointly signal parameters of the splitting in case the splitting is applied.

If the splitting is applied, the encoder may further decide whether or not a particular unit is present in the bitstream. Correspondingly, a unit presence indication indicating whether feature map data corresponding to the unit is included in the bitstream is provided. It is noted that the unit presence indicator can be considered as a special case of the region presence indicator described above, and the description above applies for this embodiment, too.

In some embodiments, the region splitting information for the region includes a flag indicating whether or not the bitstream comprises unit information specifying dimensions and/or position of the units of the region. The decoding method comprises decoding from the bitstream the unit presence indication per unit of the region. Depending on the value of the unit presence indication for a unit, the decoding method includes parsing or not parsing from the bitstream feature map data for the unit.

In some embodiments, the unit information specifies hierarchic splitting of the region including at least one of quad-tree, binary-tree, ternary-tree, or triangular splitting.

A quadtree is a tree data structure in which each internal node has exactly four children. Quadtrees are most often used to partition a two-dimensional space by recursively subdividing it into four quadrants or regions. The data associated with a leaf cell varies by application, but the leaf cell represents a "unit of interesting spatial information". In the quadtree partition method the subdivided regions are squares, each of them may be further split into four children. A binary-tree and a ternary-tree method may also include units of rectangular shape, having two or three children for each internal node correspondingly. Furthermore, arbitrary split shapes can be achieved by using mask or geometrical rules e.g. to obtain triangular unit shapes. This data structure is named a partition tree. The partition method may comprise a combination of different trees like quad-, binary-, and/or ternary-trees in one tree structure. Having different unit shapes and split rules allows to better capture the spatial structure of feature map data, and signal them in the bitstream in a most efficient way. All forms of partition trees share some common features: they decompose space into adaptable cells; each cell (or bucket) has a maximum capacity; when maximum capacity is reached, the bucket splits; the tree directory follows the spatial decomposition of the partition tree.

Figure 20:
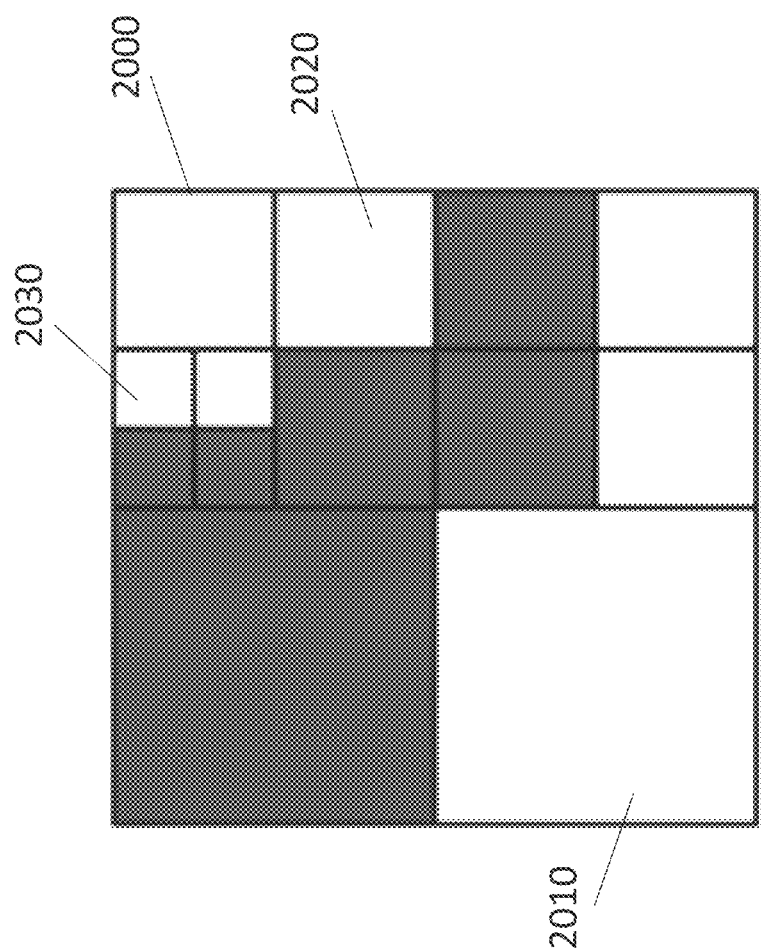
FIG. 20 is a schematic drawing illustrating feature map units partitioned by a quadtree method as well as units containing feature map data.

FIG. 20 is a schematic drawing illustrating a quad-tree partitioning of a block (unit of a 2-dimensional image or feature map) 2000. Each block may be but does not have to be spilt in each step of hierarchic splitting to four. In the first step, the block 2000 is split into four equal block, one of which is 2010. In the second step, two of the four blocks (those on the right hand side in this example) are further partitioned, each of them again into four equally sized blocks, including block 2020. In the third step, one of the eight blocks is further into four equally sized blocks, including block 2030.

It is worth to be noted that other partition methods like binary tree and ternary tree partitioning can be used to achieve the same purpose of arbitrary regions definition and parsing of corresponding presence flags. Below shown is a syntax table illustrating the possible implementation of syntax and the corresponding parsing process (and the corresponding bitstream generating process). For each CNN channels firstly parse_quad_tree_presence function is called, which reads information about arbitrary regions definition (split_qt_flag), fills information about regions size (width, height) and position (x, y), parses the presence_flag corresponding to each arbitrary region of the channel.

It should be noted that other variations of implementation leading to the same results are possible, For instance, parsing of region presence flags can be combined with channel information parsing in one iteration of parsing loop or region splitting information can be shared within group of channels of all channels to reduce signaling overhead on partition information. In other words, the region splitting information may specify splitting which is (to be) applies to spitting of a plurality (two or more or all) channels (regions) of the feature map.

| | Descriptor |
|---|---|
| paramters_parsing( ) {<br>  ...<br>  for( i = 0; i < channels_num; i++ ) {<br>    channel_regions_info[ i ].num_regions = 0<br>    parse_quad_tree_presence( 0,0,<br>    cahnnel_width, channel_height,<br>  channel_regions_info[ i ] )<br>    for( n = 0; n < channel_regions_info[<br>    i ].num_regions; n++ ) {<br>      for( y = channel_regions_info[ i ][ n ].y;<br>      y < channel_regions_info[ i<br>  ][ n ].height; y++ ) {<br>        for( x = channel_regions_info[ i ][ n ].x;<br>        x < channel_regions_info[<br>  i ][ n ].width; x++ ) {<br>          if( channel_regions_info[<br>          i ][ n ].presence_flag )<br>            y_cap[ i ][ y ][ x ] =<br>            decode_latent_value( i, x, y )<br>          else<br>            y_cap[ i ][ y ][ x ] = 0<br>        }<br>      }<br>    }<br>  }<br>  ... | <br><br><br><br><br><br><br><br><br><br><br><br><br><br><br><br>ae(v) |

In the syntax table below an implementation of parsing region splitting information is provided. The quadtree method is used as an example.

| | Descriptor |
|---|---|
| parse_quad_tree_presence( x0, y0, width, height, channel_regions_info) {<br>  if (x0 + width <= channel_width && y0 + height <= channel_height )<br>    split_qt_flag[ x0 ][ y0 ]<br>  if ( split_qt_flag[ x0 ][ y0 ] ) {<br>    x1 = x0 + ( size >> 1 )<br>    y1 = y0 + ( size >> 1 )<br>    coding_quadtree( x0, y0, width >> 1, height >> 1 )<br>    coding_quadtree( x1, y0, width >> 1, height >> 1 )<br>    coding_quadtree( x0, y1, width >> 1, height >> 1 ) | <br><br>ae(v) |

```
        coding_quadtree( x1, y1, width >> 1, height >> 1 )
    } else {
        channel_regions_info[channel_regions_info.num_regions].x = x0
        channel_regions_info[channel_regions_info.num_regions].y = y0
        channel_regions_info[channel_regions_info.num_regions].width =
width
        channel_regions_info[channel_regions_info.num_regions].height =
height
        channel_regions_info[channel_regions_info.num_regions].presence_fl    ae(v) or u(1)
ag
        channel_regions_info.num_regions += 1
    }
}
```

The following syntax table illustrates an example of sharing region splitting information (channel_regions_info) within a group of channels, which also can be all channels of the feature map.

```
                                                                Descriptor
paramters_parsing( ) {
    ...
    channel_regions_info.num_regions = 0
    parse_quad_tree_presence( 0,0,
        cahnnel_width, channel_height,
        channel_regions_info )
    for( i = 0; i < group_channels_num; i++ ) {
        for( n = 0; n < channel_regions_info.num_regions;
            n++ ) {
            for( y = channel_regions_info[ n ].y;
                y < channel_regions_info[ n
].height; y++ ) {
                for( x = channel_regions_info[ n ].x;
                    x < channel_regions_info[ n
].width; x++ ) {
                    if( channel_regions_info[ n ].presence_flag )
                        y_cap[ i ][ y ][ x ] =                  ae(v)
                        decode_latent_value( i, x, y )
                    else
                        y_cap[ i ][ y ][ x ] = 0
                }
            }
        }
    }
...
```

The presence information may be hierarchically organized. For example, if channel_presence_flag for a certain channel (described in some of the above-mentioned examples and embodiments) is equal to FALSE (indicating that all channel related information is omitted) in the bitstream, no further parsing of channel related information is performed for the channel. If channel_presence_flag is equal to TRUE, then decoder parses regions presence information corresponding to the specific channel and then retrieves region-wise channel information from the bitstream which may relate to the units of the channel. This is illustrated by the exemplary syntax shown below.

```
                                                                Descriptor
paramters_parsing( ) {
    ...
    for( i = 0; i < channels_num; i++ ) {
        channel_presence_flag[ i ]                              ae(v) or u(1)
        if ( channel_presence_flag[ i ] ) {
            channel_regions_info[ i ].num_regions = 0
```

```
                                                                Descriptor
            parse_quad_tree_presence( 0,0,
                cahnnel_width, channel_height,
        channel_regions_info[ i ] )
            for( n = 0; n < channel_regions_info[
                i ].num_regions; n++ ) {
                for( y = channel_regions_info[ i ][
                    n ].y; y < channel_regions_info[
        i ][ n ].height; y++ ) {
                    for( x = channel_regions_info[ i ][ n ].x; x <
        channel_regions_info[ i ][ n ].width; x++ ) {
                        if( channel_regions_info[
                            i ][ n ].presence_flag )
                            y_cap[ I ][ y ][ x ] =              ae(v)
                            decode_latent_value( i, x, y )
                        Else
                            y_cap[ I ][ y ][ x ] = 0
                    }
                }
            } else {
                for( y = 0; y < channel_height; y++ ) {
                    for( x = 0; x < channel_width; x++ ) {
                        y_cap[ i ][ y ][ x ] = 0
                    }
                }
            }
    }
...
```

Alternatively, or in combination with the preceding embodiments, additional syntax element may be used to indicate whether arbitrary regions presence signalling mechanism should be enabled. In particular, an enabling flag may be use to signal whether or not the channel partitioning is enabled (allowed).

```
                                                                Descriptor
paramters_parsing( ) {
    ...
    for( i = 0; i < channels_num; i++ ) {
        channel_presence_flag[ i ]                              ae(v) or u(1)
        if ( channel_presence_flag[ i ] ) {
            enable_channel_regions_flag[ i ]                    ae(v) or u(1)
            if (enable_channel_regions_flag[ i ]){
                channel_regions_info[ i ].num_regions = 0
                parse_quad_tree_presence( 0,0,
                    channel_width, channel_height,
        channel_regions_info[ i ] )
                for( n = 0; n < channel_regions_info[
                    i ].num_regions; n++ ) {
                    for( y = channel_regions_info[ i ][ n ].y; y <
        channel_regions_info[ i ][ n ].height; y++ ) {
                        for( x = channel_regions_info[
                            i ][ n ].x; x <
```

-continued

| | Descriptor |
|---|---|
| ```
channel_regions_info[ i ][ n ].width; x+ + ) {
            if( channel_regions_info[
              i ][ n ].presence_flag )
                y_cap[ i ][ y ][ x ] =
                  decode_latent_value( i, x, y )
                else
                  y_cap[ i ][ y ][ x ] = 0
          }
        }
      } else {
        for( y = 0; y < channel_height; y+ + ) {
          for( x = 0; x < channel_width; x+ + ) {
            y_cap[ i ][ y ][ x ] =
              decode_latent_value( i, x, y )
          }
        }
      }
    } else {
      for( y = 0; y < channel_height; y+ + ) {
        for( x = 0; x < channel_width; x+ + ) {
          y_cap[ i ][ y ][ x ] = 0
        }
      }
    }
  }
}
``` | ae(v)<br><br><br><br><br><br><br><br><br><br>ae(v) |

The element enable_channel_regions_flag[i] is signaled for each channel i if the channel is present in the bitstream (which is controlled by channel_presence_flag[i] flag), and indicates whether the channel partitioning into units is enabled. If the partitioning is enabled, the decoder parses region splitting information from the bitstream as well as presence flags corresponding to the split units by calling parse_quad_tree_presence( ) function. Once unit presence flags (channel_regions_info[i][n].presence_flag) are obtained, the decoder iterates over feature map elements of the split unit. If the unit presence flag is equal to TRUE, the decoder parses feature map value (decode_latent_value(i, x, y)). Otherwise, the the feature map value y_cap[i][y][x] is set equal to a constant, such as zero in this given example.

Application of Transformation

According to this embodiment, the (CNN) channel feature map representing channel information is transformed before it is signalled in the bitstream. The bitstream further comprises syntax element(s) defining the position of last significant transformed channel feature map coefficient. The transformation (also referred to as transform herein) can be any suitable transform which may, e.g., result in some energy compaction. After completing the forward transform of the feature map data, the encoder performs zig-zag scan for the last non-zero coefficient starting from top-left corner of a transformed coefficient matrix (the top-left corner is a start at which x=0, y=0). In another possible implementation, the encoder may decide to drop some non-zero coefficients, considering them as least important. The position (x, y) of the last significant coefficient is signalled within the bitstream.

On the receiving side, for example, the decoder parses the corresponding syntax element(s) to define a position of the last significant transformed coefficient of feature map of the corresponding channels. Once the position is defined the decoder parses the transformed feature map data belonging to region started from top-left corner (x=0, y=0), and finishes at the last significant coefficient position (x=last_significant_x, y=last_significant_y). The rest of the transformed feature map data is initialized by a constant value, e.g. zero. When a transformed coefficient of corresponding CNN channels are known, the inverse transformation may be performed. Based on this, a channel feature map data may be obtained. Such process may be completed for all input channels. Then, the feature map data may be fed to the reconstruction network representing the generative model.

Figure 21:
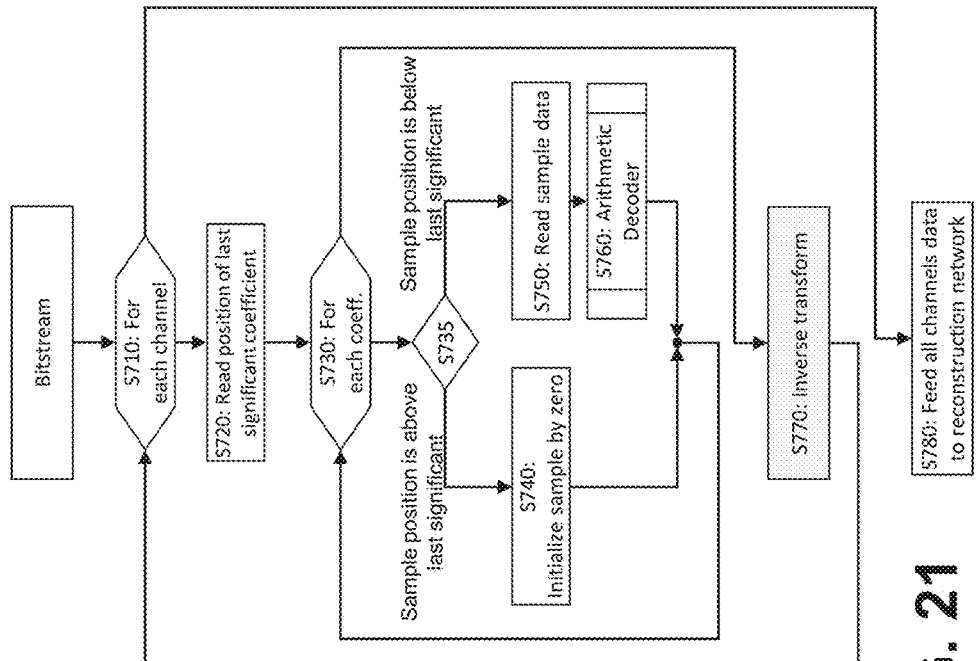
FIG. 21 is a flow chart illustrating an exemplary method for decoding of feature data, including decoding of last significant coefficient position.

In general, the decoding of the region from the bitstream is illustrated in FIG. 21 with region being a channel. In particular, in step S710, the channel is fetched among all channels to be processed. Step S710 corresponds to the loop over the channels to be processed. The decoding further included extracting S720 from the bitstream a last significant coefficient indicator indicating position of the last coefficient among coefficients of the region (here, exemplarily a channel). Step S730 corresponds to a loop over coefficients. In particular, the loop goes over each of the coefficients from the most significant coefficients up to the last significant coefficient. In the loop, the method implements decoding (including parsing S750 and, possibly, entropy decoding S760) of the significant coefficients from the bitstream (for the region of the S710 loop) and setting S740 the coefficients following the last significant coefficient indicator according to a predefined rule. In the exemplary flowchart of FIG. 21, the predefined rule is setting the coefficients following the last significant coefficient in the significance order to zero. However, as described for the term "predefined rule" previously, the rule may also define setting of the coefficients to a different value, or may define that the value to be set is to be acquired from a bitstream or by a certain method (such as derivation from previously used values), or the like. In general, the present embodiment is not limited to any particular predefined rule.

In terms of the method steps, in step S735, it is tested (judged, checked) whether the current coefficient (coefficient given by the step of the loop S730) is a significant coefficient or a non-significant coefficient. Here, the significant coefficients are coefficients with sample position below and equal to the last significant coefficient. The non-significant coefficients are coefficients above (exceeding) the last significant coefficient. In this example, the significance order is assumed to correspond to the sample order after transformation. This generally assumes that the DC and low-frequency coefficients are more significant than the higher frequency coefficients. The sample positions are positions (index) of the transformed coefficients resulting from 1D transformation of the region feature map (possibly scanned to be 1D beforehand). It is noted that the present disclosure is not limited to the application of 1D transformation or to any particular data format. The significance order of coefficients may be defined in a different manner—e.g. in a standard or by a convention, or even provided within the bitstream or the like.

After obtaining all coefficients (after finishing the loop S730), the decoding method includes obtaining S770 of the feature data of the region by an inverse transformation of the coefficients of the region. As shown in FIG. 21, when the data for all channels is decoded, the decoding method may further include a step S780 to feed the data of all channels to the reconstruction network.

According to an exemplary implementation, the inverse transformation is an inverse discrete cosine transformation, inverse discrete sine transformation, or an inverse transformation obtained by modifying the inverse discrete cosine transformation or inverse discrete sine transformation, or a convolutional neural network transform. For example, the convolutional neural network layer can be considered as transform and being trained with last significant coefficient signaling method as described above would lead to energy compaction as desired. Furthermore, the last layer of analysis part of an autoencoder (generating latent space representation y) and the first layer of generative part of autoencoder (accepting quantized latent representation) can be considered as forward and inverse transform correspondingly. Thus having last significant coefficient signaling method as described above in between during feature map coding stage would lead to desired energy compaction of forward convolutional layer transform obtained during joint training. The present disclosure is not limited to these kinds of transformation. Rather, other transformations such as KLT, Fourier, Hadamard, or other orthogonal and possibly unitary transformation may be used.

Below shown is a syntax table illustrating the parsing process when the transformation is applied to the feature map data of a 2-dimensional channel, with dimensions being denoted by indexes x and y. It is noted that the present disclosure is not limited to any particular dimensionality of the feature map data. Transformation may be applies after scanning or after assigning to the data a position within some predefined significance order.

|  | Descriptor |
|---|---|
| paramters_parsing( ) { <br> ... <br>   for( i = 0; i < channels_num; i++ ) { <br>     last_significant_x[ i ] <br>     last_significant_y[ i ] <br>     for( y = 0; y < channel_height[ i ]; y++ ) <br>     { <br>       for( x = 0; x < channel_width[ i ]; x++ ) <br>       { <br>         if( x <= last_significant_x[ i ] && y <= last_significant_y[ i ] ) <br>           y_cap[ i ][ y ][ x ] = <br>           decode_latent_value( i, x, y ) <br>         else <br>           y_cap[ i ][ y ][ x ] =0 <br>       } <br>     } <br> ... | <br><br><br><br>ae(v)<br>ae(v)<br><br><br><br><br><br><br>ae(v) |

In the example above, the last significant coefficient position is represented by two numbers corresponding to x and y coordinate of last significant coefficient position in a 2D feature map (or a region thereof). In another possible implementation, the last significant coefficient position can be represented in the syntax by a single number corresponding to the order of the zig-zag scan of the 2D feature map (region thereof).

Figure 22:
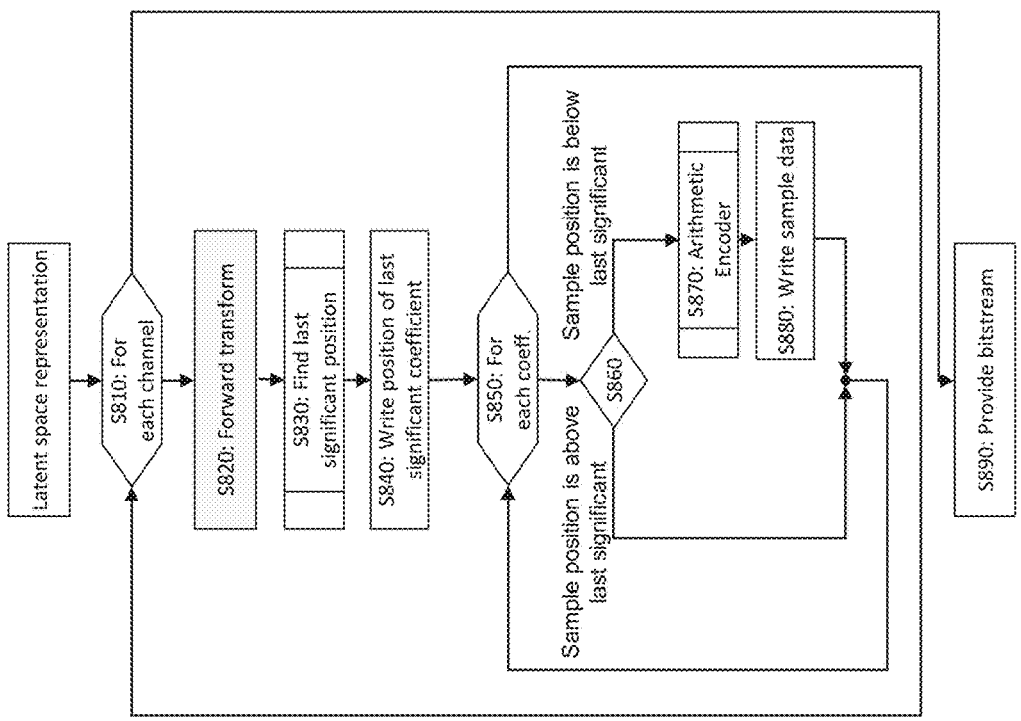
FIG. 22 is a flow chart illustrating an exemplary method for encoding of feature data, including coding of last significant coefficient position.

FIG. 22 shows a flow chart illustrating an exemplary method, which may be performed at the encoder side. It is noted that the encoding of FIG. 22 is compatible with the decoding of FIG. 21, so that the bitstream generated by the encoding method of FIG. 22 can be parsed/decoded by the decoding method of FIG. 21.

The encoding method includes a loop S810 over the channels of a feature map (data output by a layer of the machine learning model, e.g. neural network). In step S820, data of the current channel (channel at the current step of the loop S810) are transformed by a forward transformation. As mentioned above, the forward transformation may include here the scanning of the channel features into a 1D sample sequence and then transforming it with a 1D transformation to obtain a 1D sequence of coefficients. Such 1D sequence of coefficients may be considered to follow a significance order. As mentioned above, this example is not limiting. The transformation may have more dimensions and the scanning and/or significance orders may differ.

In step S830, the last significant position is determined. The determination of the last significant position may be performed based on the desired reconstruction quality and/or rate. For example, similarly to the method shown with reference to FIG. 12, the quality and/or the rate for coefficients may be accumulated and as soon as the quality and/or the rate or a combination of both exceeds the desired threshold, the current coefficient is considered as last significant coefficient. However, other approaches are possible. In step S840, the position (an indication thereof) of the last significant coefficient determined in step S830 is inserted into the bitstream. Before the inserting into the bitstream, the indication of the position may be encoded by an entropy coding such as arithmetic coding or another variable length coding method. Step S850 represents a loop over each transformed coefficient. In case the coefficient position is lower than or same as the position of the last significant coefficient, the current coefficient is inserted into the bitstream in step S880 (possibly encoded with an arithmetic encoder in step S870). After encoding coefficients of all channels, the bitstream may be fed (or sent) to the reconstruction network.

As is clear to those skilled in the art, this embodiment may be combined with any of the above-mentioned embodiments. In other words, the last significant coefficient indication may be signalled alongside with the last significant channel. The signalling may be performed for regions smaller (e.g. obtained by partitioning) than the channel, or larger. Side information may also be provided. In general, the above mentioned embodiments may be combined in order to provide more flexibility.

Moreover, as already mentioned, the present disclosure also provides devices which are configured to perform the steps of the methods described above. FIG. 23 shows a device 2300 for decoding a feature map for processing by a neural network based on a bitstream. The device comprises a region presence indicator obtaining module 2310 configured to obtain, for a region of the feature map, a region presence indicator based on information from the bitstream. Moreover, the device 2300 may further include a decoding module configured to decode the region including: parsing data from the bitstream for decoding the region when the region presence indicator has a first value, and bypassing parsing data from the bitstream for decoding the region when the region presence indicator has a second value.

Moreover, FIG. 24 shows a device 2400 for decoding a feature map for processing by a neural network from a bitstream. The device comprises a side information indicator 2410 obtaining module configured to obtain, from the bitstream, a side information indicator concerning the feature map; and a decoding module 2420 configured to decode the feature map including: when the side information indicator has a fifth value, parsing, from the bitstream, the side information for decoding the feature map, and when the side information indicator has a sixth value, bypassing parsing, from the bitstream, the side information for decoding the feature map.

Corresponding to the abovementioned decoding device 2300, a device is shown in FIG. 23, for encoding 2350 a feature map for processing by a neural network into a bitstream. The device comprises a feature map region presence indicator obtaining module 2360 configured to obtain the region presence indicator for a region of a feature map. Moreover, the device comprises an encoding control module 2370 configured to, based on the obtained feature map region presence indicator, decide whether to indicate and indicating in the bitstream: when a region presence indicator has a first value, a region of the feature map; or when the region presence indicator has a second value, bypass indicating the region of the feature map.

Corresponding to the abovementioned decoding device 2400, a device 2450 is shown in FIG. 24 for encoding a feature map for processing by a neural network into a bitstream. The device may comprise: a feature map obtaining module 2460 configured to obtain the feature map. Moreover, the device 2450 may further include an encoding control module 2470 configured to decide whether to indicate side information concerning the feature map and indicating in the bitstream: either a side information indicator indicating a third value and the side information; or the side information indicator indicating a fourth value without the side information.

It is noted that these devices may be further configured to perform any of the additional features including exemplary implementations mentioned above. For example, a device is provided for decoding a feature map for processing by a neural network based on a bitstream, the device comprising a processing circuitry configured to perform steps of any of the decoding methods discussed above. Similarly, a device is provided for encoding a feature map for processing by a neural network into a bitstream, the device comprising a processing circuitry configured to perform steps of any of the encoding methods discussed above.

Further devices may be provided, which make use of the devices 2300, 2350, 2400, and/or 2450. For instance a device for image or video encoding may include the encoding device 2400 and/or 2450. In addition, it may include the decoding device 2300 or/or 2350. A device for image or video decoding may include the decoding device 2300 and/or 2350.

In summary, in some embodiments of the present disclosure, a decoder (video or image or feature map) may comprise an artificial neural network configured to obtain feature map data from a bitstream. The decoder may be configured to read a region presence flag from the bitstream; read a feature map data corresponding to a region if the region presence flag is TRUE; initialize the region of a feature map data with a predefined value (where a predefined value is exemplary 0) if the region presence flag is FALSE; and feed an artificial neural network with the data based on obtained feature map data. The artificial neural network may be a convolutional neural network. The region may be the channel output of the convolutional neural network. Alternatively or in addition, the region may be a part of channel output of convolutional neural network, and the bitstream may further comprise information for region definition (position, shape, size). In other words, the region parameters may be defined in the bitstream. The artificial neural network does not have to be a CNN. In general, the neural network may be a fully connected neural network.

The decoder may be further configured to read (extract from the bitstream) the feature map data by entropy decoding, such as Huffman (de)coding, Range coding, Arithmetic coding, Asymmetric numeral systems (ANS) or other kind of entropy of variable length codes. The region presence flag may be coded as a context coded bin with the corresponding probability update.

Some Exemplary Implementations in Hardware and Software

Figure 25:
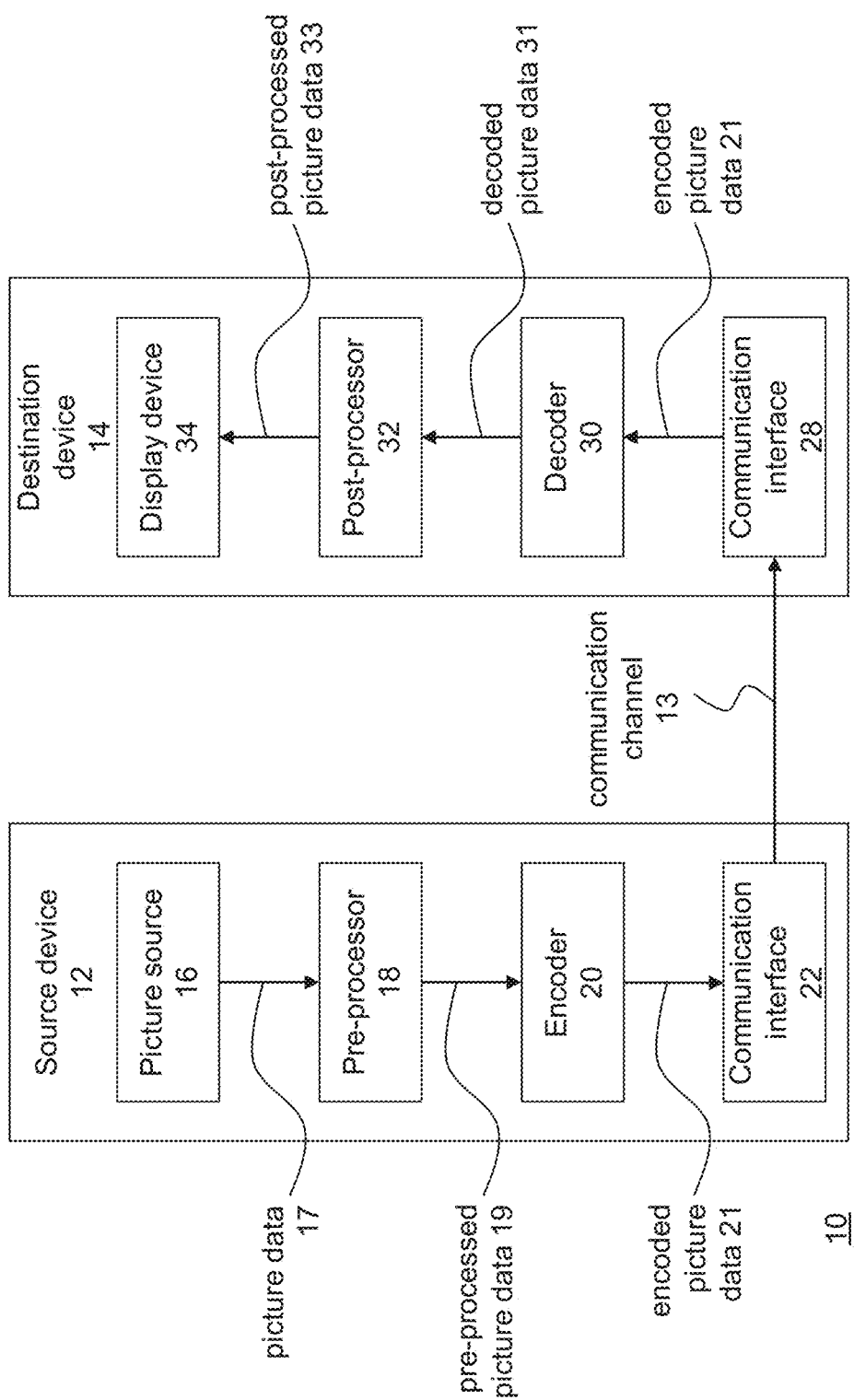
FIG. 25 is a block diagram showing an example of a video coding system configured to implement embodiments.

The corresponding system which may deploy the above-mentioned encoder-decoder processing chain is illustrated in FIG. 25. FIG. 25 is a schematic block diagram illustrating an example coding system, e.g. a video, image, audio, and/or other coding system (or short coding system) that may utilize techniques of this present disclosure. Video encoder 20 (or short encoder 20) and video decoder 30 (or short decoder 30) of video coding system 10 represent examples of devices that may be configured to perform techniques in accordance with various examples described herein. For example, the video coding and decoding may employ neural network such as the one shown in FIGS. 1 to 7 which may be distributed and which may apply the above-mentioned bitstream parsing and/or bitstream generation to convey feature maps between the distributed computation nodes (two or more).

As shown in FIG. 25, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component. It is noted that the pre-processing may also employ a neural network (such as in any of FIGS. 1 to 7) which uses the presence indicator signaling.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 25 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission. The decoder 30 is configured to receive the encoded picture data 21 and provide decoded picture data 31 or a decoded picture 31 (e.g., employing a neural network based on one or more of FIGS. 1 to 7).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 25 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 25 may vary depending on the actual device and application.

Figure 26:
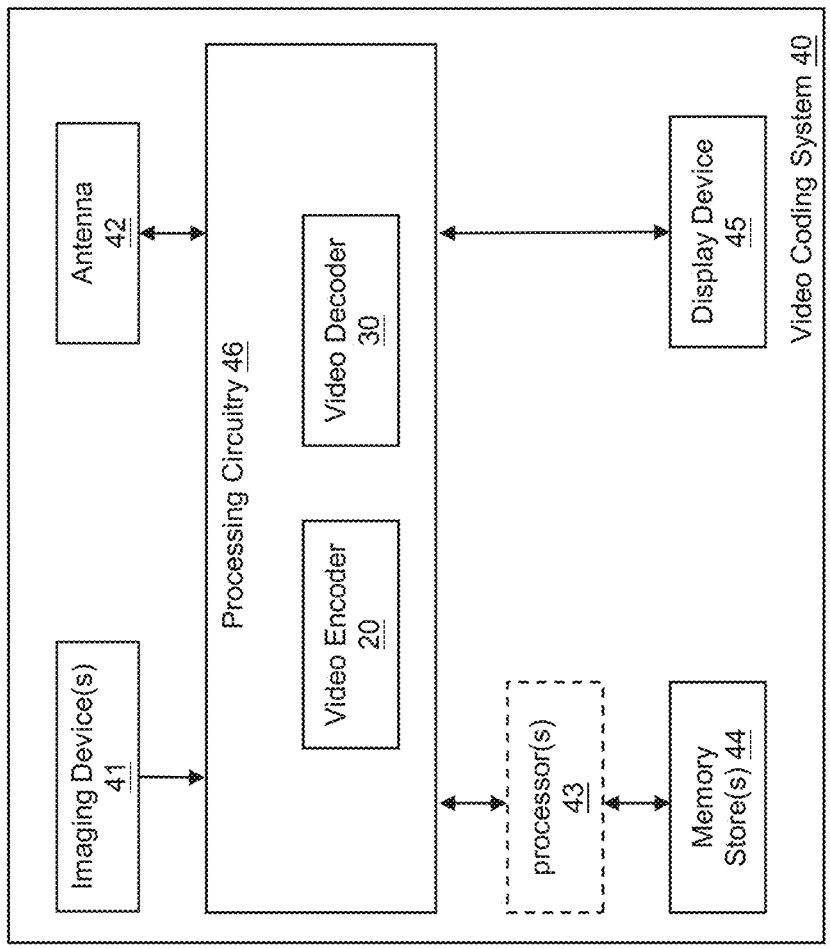
FIG. 26 is a block diagram showing another example of a video coding system configured to implement embodiments.

The encoder 20 (e.g. a video encoder 20) or the decoder 30 (e.g. a video decoder 30) or both encoder 20 and decoder 30 may be implemented via processing circuitry, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules including the neural network such as the one shown in any of FIGS. 1 to 7 or its parts. The decoder 30 may be implemented via processing circuitry 46 to embody the various modules as discussed with respect to FIGS. 1 to 7 and/or any other decoder system or subsystem described herein. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 26.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 25 is merely an example and the techniques of the present disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 27:
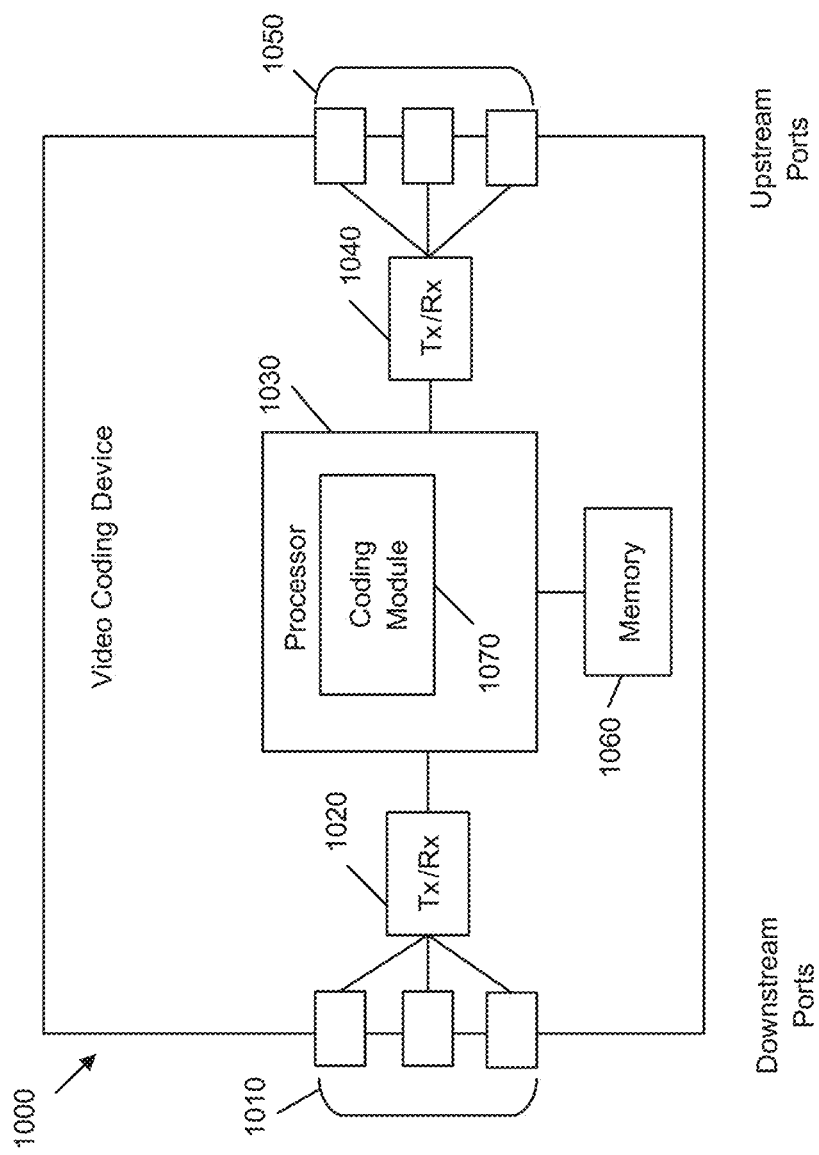
FIG. 27 is a block diagram illustrating an example of an encoding apparatus or a decoding apparatus.

FIG. 27 is a schematic diagram of a video coding device 1000 according to an embodiment of the disclosure. The video coding device 1000 is suitable for implementing the disclosed embodiments as described herein. In an embodiment, the video coding device 1000 may be a decoder such as video decoder 30 of FIG. 25 or an encoder such as video encoder 20 of FIG. 25.

The video coding device 1000 comprises ingress ports 1010 (or input ports 1010) and receiver units (Rx) 1020 for receiving data; a processor, logic unit, or central processing unit (CPU) 1030 to process the data; transmitter units (Tx) 1040 and egress ports 1050 (or output ports 1050) for transmitting the data; and a memory 1060 for storing the data. The video coding device 1000 may also comprise optical-to-electrical (OE) components and electrical-to-optical (EO) components coupled to the ingress ports 1010, the receiver units 1020, the transmitter units 1040, and the egress ports 1050 for egress or ingress of optical or electrical signals.

The processor 1030 is implemented by hardware and software. The processor 1030 may be implemented as one or more CPU chips, cores (e.g., as a multi-core processor), FPGAs, ASICs, and DSPs. The processor 1030 is in communication with the ingress ports 1010, receiver units 1020, transmitter units 1040, egress ports 1050, and memory 1060. The processor 1030 comprises a coding module 1070. The coding module 1070 implements the disclosed embodiments described above. For instance, the coding module 1070 implements, processes, prepares, or provides the various coding operations. The inclusion of the coding module 1070 therefore provides a substantial improvement to the functionality of the video coding device 1000 and effects a transformation of the video coding device 1000 to a different state. Alternatively, the coding module 1070 is implemented as instructions stored in the memory 1060 and executed by the processor 1030.

The memory 1060 may comprise one or more disks, tape drives, and solid-state drives and may be used as an overflow data storage device, to store programs when such programs are selected for execution, and to store instructions and data that are read during program execution. The memory 1060 may be, for example, volatile and/or non-volatile and may be a read-only memory (ROM), random access memory (RAM), ternary content-addressable memory (TCAM), and/or static random-access memory (SRAM).

Figure 28:
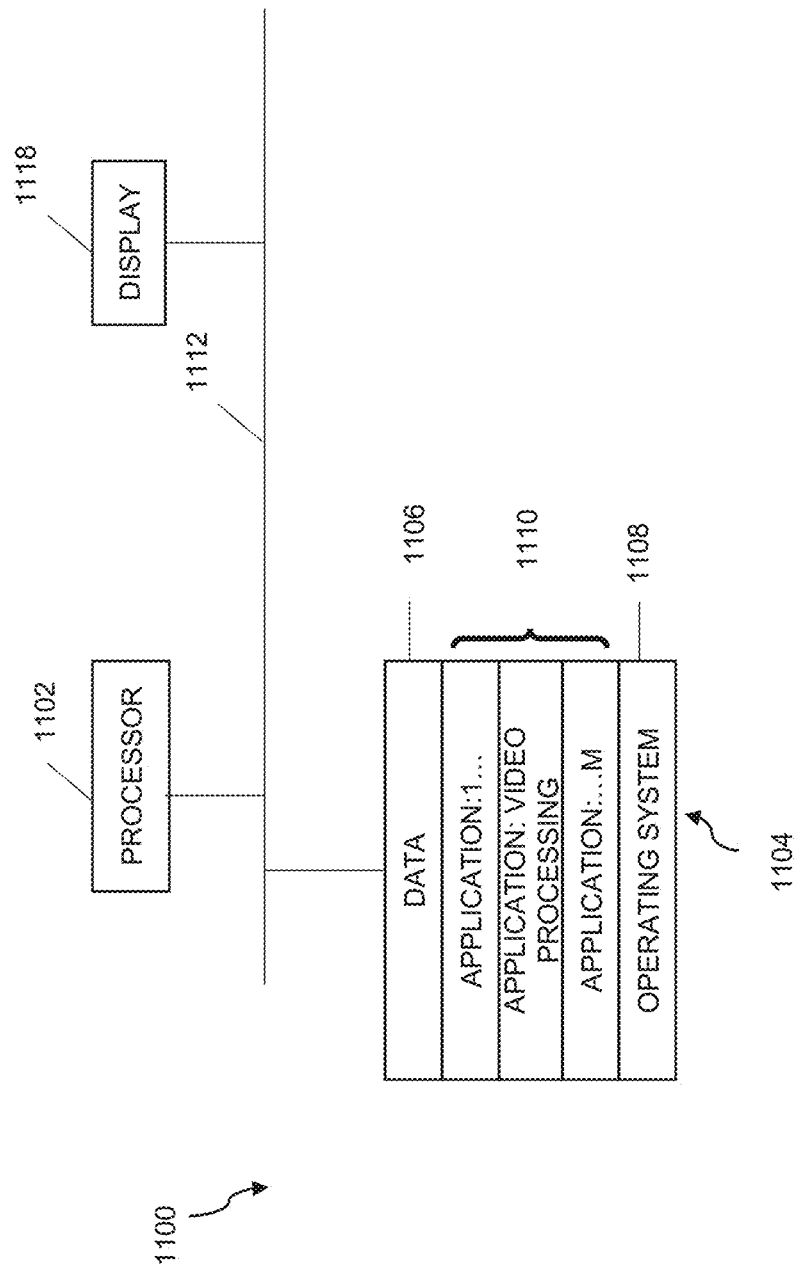
FIG. 28 is a block diagram illustrating another example of an encoding apparatus or a decoding apparatus.

FIG. 28 is a simplified block diagram of an apparatus 800 that may be used as either or both of the source device 12 and the destination device 14 from FIG. 25 according to an exemplary embodiment.

A processor 1102 in the apparatus 1100 can be a central processing unit. Alternatively, the processor 1102 can be any other type of device, or multiple devices, capable of manipulating or processing information now-existing or hereafter developed. Although the disclosed implementations can be practiced with a single processor as shown, e.g., the processor 1102, advantages in speed and efficiency can be achieved using more than one processor.

A memory 1104 in the apparatus 1100 can be a read only memory (ROM) device or a random access memory (RAM) device in an implementation. Any other suitable type of storage device can be used as the memory 1104. The memory 1104 can include code and data 1106 that is accessed by the processor 1102 using a bus 1112. The memory 1104 can further include an operating system 1108 and application programs 1110, the application programs 1110 including at least one program that permits the processor 1102 to perform the methods described here. For example, the application programs 1110 can include applications 1 through N, which further include a video coding application that performs the methods described here.

The apparatus 1100 can also include one or more output devices, such as a display 1118. The display 1118 may be, in one example, a touch sensitive display that combines a display with a touch sensitive element that is operable to sense touch inputs. The display 1118 can be coupled to the processor 1102 via the bus 1112.

Although depicted here as a single bus, the bus 1112 of the apparatus 1100 can be composed of multiple buses. Further, a secondary storage can be directly coupled to the other components of the apparatus 1100 or can be accessed via a network and can comprise a single integrated unit such as a memory card or multiple units such as multiple memory cards. The apparatus 1100 can thus be implemented in a wide variety of configurations.

Some Mathematical Operators and Symbols

The mathematical operators in the exemplary syntax description used in this application are similar to those used to describe syntax in existing codecs. Numbering and counting conventions generally begin from 0, e.g., "the first" is equivalent to the 0-th, "the second" is equivalent to the 1-th, etc.

The following arithmetic operators are defined as follows:
+ Addition
− Subtraction (as a two-argument operator) or negation (as a unary prefix operator)
* Multiplication, including matrix multiplication
/ Integer division with truncation of the result toward zero. For example, 7/4 and −7/−4 are truncated to 1 and −7/4 and 7/−4 are truncated to −1.
x % y Modulus. Remainder of x divided by y, defined only for integers x and y with x>=0 and y>0.

The following logical operators are defined as follows:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value. The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

The following notation is used to specify a range of values:

x=y . . . z x takes on integer values starting from y to z, inclusive, with x, y, and z being integer numbers and z being greater than y.

When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

Operation precedence from highest (at top of table) to lowest (at bottom of table)

operations (with operands x, y, and z)

"x++", "x− −"

"!x", "−x" (as a unary prefix operator)

$x^y$

"x∗y", "x/y", "x÷y", "$\frac{x}{y}$", "x % y"

"x + y", "x − y" (as a two-argument operator),

"$\sum_{i=x}^{y} f(i)$"

"x << y", "x >> y"
"x < y", "x <= y", "x > y", "x >= y"
"x == y", "x != y"
"x & y"
"x | y"
"x && y"
"x | | y"
"x ? y : z"
"x..y"
"x = y", "x += y", "x −= y"

In the text, a statement of logical operations as would be described mathematically in the following form:

```
if( condition 0 )
    statement 0
else if( condition 1 )
    statement 1
...
```

```
else /* informative remark on remaining condition */
    statement n
``` may be described in the following manner:
... as follows / ... the following applies:
- If condition 0, statement 0
- Otherwise, if condition 1, statement 1
- ...
- Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:
... as follows / ... the following applies:
- If all of the following conditions are true, statement 0:
  - condition 0a
  - condition 0b
- Otherwise, if one or more of the following conditions are true, statement 1:
  - condition 1a
  - condition 1b
- ...
- Otherwise, statement n In the text, a statement of logical operations as would be described mathematically in the following form:

```
if( condition 0 )
    statement 0
if( condition 1 )
    statement 1
``` may be described in the following manner:
    When condition 0, statement 0
    When condition 1, statement 1

Summarizing, the present disclosure relates to an efficient signaling of feature map information for a system employing a neural network. In particular, at the decoder side, a presence indicator is parsed from a bitstream or derived based on information parsed from the bitstream. Based on the value of the parsed presence indicator, further data related to a feature map region are parsed or the parsing is bypassed. The presence indicator may be, for instance a region presence indicator indicating whether feature map data is included in the bitstream, or may be a side information presence indicator indicating whether a side information related to the feature map data is included in the bitstream. Similarly, an encoding method, as well as encoding and decoding devices are provided.

What is claimed is:

1. A method for decoding, based on a bitstream, a feature map for processing by a neural network, the method comprising:
   obtaining, for a region of the feature map, a region presence indicator based on information from the bitstream; and
   decoding the region, wherein decoding the region includes:
      parsing data from the bitstream for decoding the region based on the region presence indicator having a first value, or
      bypassing parsing data from the bitstream for decoding the region based on the region presence indicator having a second value.

2. The method according to claim 1, wherein, based on the region presence indicator having a second value, the decoding the region further includes setting of the region according to a predetermined rule.

3. The method according to claim 2, wherein the predetermined rule specifies the setting of the features of the region to a constant.

4. The method according to claim 3, wherein the constant is zero.

5. The method according to claim 3, further comprising decoding the constant from the bitstream.

6. The method according to claim 1, wherein the bitstream includes the region presence indicator.

7. The method according to claim 1, further comprising obtaining side information from the bitstream,
   wherein the obtaining the region presence indicator based on information from the bitstream comprises obtaining the region presence indicator based on the side information.

8. The method according to claim 7, further comprising:
   obtaining a side information presence indicator from the bitstream; and
   parsing the side information from the bitstream based on the side information presence indicator having a third value or bypassing parsing the side information from the bitstream based on the side information presence indicator having a fourth value,
   wherein the side information includes the region presence indicator and/or information for being processed by a neural network to obtain an estimated probability model for use in an entropy decoding of the region.

9. The method according to claim 8, further comprising setting, based on the side information presence indicator having the fourth value, the side information to a predetermined side information value.

10. The method according to claim 1, wherein the region presence indicator is a flag capable of taking one of only two values formed by the first value and the second value.

11. The method according to claim 1, wherein the region is a channel of the feature map.

12. The method according to claim 11, further comprising:
   obtaining a significance order that indicates significance of a plurality of channels of the feature map,
   obtaining a last significant channel indicator, and
   obtaining the region presence indicator based on the last significant channel indicator.

13. The method according to claim 12, wherein the last significant channel indicator corresponds to a quality indicator decoded from the bitstream and indicating quality of the coded feature map resulting from compression of the region of the feature map.

14. The method according to claim 12, wherein the last significant channel indicator corresponds to an index of the last significant channel within the significance order.

15. The method according to claim 12, wherein the obtaining the significance order comprises decoding an indication of the significance order from the bitstream.

16. The method according to claim 12, wherein the obtaining the significance order comprises deriving the significance order based on previously decoded information regarding source data from which the feature map has been generated.

17. The method according to claim 12, wherein the obtaining the significance order comprises deriving the significance order based on previously decoded information regarding a type of source data from which the feature map has been generated.

18. The method according to claim 12, further comprising decoding, from the bitstream, channels sorted within the bitstream according to the significance order from a most significant channel to a least significant channel.

19. The method according to claim 1, further comprising:
   decoding, from the bitstream, region splitting information indicating a splitting of the region of the feature map into units, and
   based on the region splitting information, obtaining a unit presence indicator that indicates whether or not feature map data is to be parsed from the bitstream for decoding a unit of the region.

20. The method according to claim 19, wherein the region splitting information for the region includes a flag indicating whether or not the bitstream comprises unit information specifying dimensions and/or position of the units of the region, the method further comprising:
   obtaining, based on information from the bitstream, a respective unit presence indicator for each respective unit of the region; or
   based on a value of the respective unit presence indicator for a respective unit, parsing or not parsing from the bitstream feature map data for the respective unit.

21. The method according to claim 20, wherein the unit information specifies hierarchic splitting of the region including at least one of quad-tree, binary-tree, ternary-tree, or triangular splitting.

22. The method according to claim 19, wherein the bitstream includes the unit presence indicator.

23. The method according to claim 1, wherein the decoding of the region includes:
   extracting, from the bitstream, a last significant coefficient indicator that indicates a position of a last coefficient among coefficients of the region,
   decoding significant coefficients of the region from the bitstream,
   setting the coefficients following the last significant coefficient indicator according to a predefined rule, and
   obtaining feature data of the region by inverse transformation of the coefficients of the region.

24. The method according to claim 23, wherein the inverse transformation is one of: an inverse discrete cosine transformation, an inverse discrete sine transformation, an inverse transformation obtained by modifying the inverse discrete cosine transformation or inverse discrete sine transformation, or a convolutional neural network transform.

25. The method according to claim 1, further comprising decoding from the bitstream a side information presence flag that indicates whether or not the bitstream includes any side information for the feature map, the side information including information to be processed by a neural network to obtain an estimated probability model for use in an entropy decoding of the feature map.

26. The method according to claim 1, wherein the obtaining the region presence indicator includes decoding by a context adaptive entropy decoder.

27. A method for computer vision, the method comprising:
performing the method according to claim 1 for decoding, from the bitstream, the feature map for processing by the neural network; and
performing a computer vision task comprising processing the decoded feature map with the neural network.

28. A computer program stored on a non-transitory processor readable medium comprising processor executable code that, when executed by one or more processors, causes the one or more processors to perform the method according to claim 1.

29. A device for decoding a feature map for processing by a neural network based on a bitstream, the device comprising a processing circuitry configured to perform the method according to claim 1.

30. The method according to claim 1, wherein the region of the feature map corresponds to a spatially contiguous subset of an image.

31. The method of claim 30, wherein the value of the region presence indicator is determined based on an importance of the region of the feature map to a reconstruction quality of the image.

32. The method of claim 31, wherein the region presence indicator has the first value when the region of the feature map is non-flat, and
wherein the region presence indicator has the second value when the region of the feature map is flat.

33. The method of claim 30, wherein the value of the region presence indicator is determined based on a number of bits required to transit the region of the feature map.

34. The method according to claim 30, wherein the value of the region presence indicator is determined by rate-distortion optimization (RDO).

35. The method according to claim 1, wherein the feature map is an output of one or more convolutional layers of a convolutional neural network.

36. A method for decoding an image, the method comprising:
performing the method according to claim 1 for decoding, from the bitstream, the feature map for processing by the neural network; and
processing the decoded feature map with the neural network to obtain the decoded image.

37. The method according to claim 36, wherein the feature map represents: coded image data and/or coded side information for decoding the image data.

38. The method according to claim 36, wherein the computer vision task is object detection, object classification, and/or object recognition.

39. A method for encoding, into a bitstream, a feature map for processing by a neural network, the method comprising:
obtaining, for a region of the feature map, a region presence indicator; and
implementing, based on the obtained region presence indicator, a decision to perform:
encoding, based on the region presence indicator having a first value, the region of the feature map into the bitstream; or
bypassing encoding, based on the region presence indicator having a second value, of the region of the feature map into the bitstream.

40. The method according to claim 39, wherein the region presence indicator is indicated in the bitstream.

41. The method according to claim 39, wherein the deciding includes evaluating values of the features of the region.

42. The method according to claim 39, wherein implementing the decision is based on an impact of the region on a quality of a result of the neural network processing.

43. The method according to claim 39, wherein implementing the decision comprises:
determining, incrementally, a sum of bits required for transmission of the feature map, starting from bits of most significant regions and continuing to bits of regions with decreasing significance until the sum exceeds a pre-configured threshold,
encoding regions for which the sum did not exceed the pre-configured threshold and the region presence indicator having the first value for the encoded regions, and
encoding the region presence indicator having the second value for non encoded regions.

44. A device for encoding a feature map for processing by a neural network into a bitstream, the device comprising a processing circuitry configured to perform the method according to claim 39.

45. A computer program stored on a non-transitory processor readable medium comprising processor executable code that, when executed by one or more processors, causes the one or more processors to perform the method according to claim 39.

46. A device for decoding, based on a bitstream, a feature map for processing by a neural network, the device comprising:
processing circuitry, the processing circuitry comprising:
a region presence indicator obtaining module configured to obtain, for a region of the feature map, a region presence indicator based on information from the bitstream,
a decoding module configured to decode the region by:
parsing, based on the region presence indicator having a first value, data from the bitstream for decoding the region, and
bypassing parsing, based on the region presence indicator having a second value, of data from the bitstream for decoding the region.

47. A device for encoding, into a bitstream, a feature map for processing by a neural network, the device comprising:
processing circuitry, the processing circuitry comprising:
a feature map region presence indicator obtaining module configured to obtain the feature map region presence indicator,
an encoding control module configured to implement a decision, based on the obtained feature map region presence indicator, to:
encode, based on the feature map region presence indicator having a first value, the region of the feature map into the bitstream;
bypass encoding, based on the feature map region presence indicator having a second value, of the region of the feature map into the bitstream.

* * * * *